(12) United States Patent
Chen et al.

(10) Patent No.: US 11,450,926 B2
(45) Date of Patent: Sep. 20, 2022

(54) SOLID ELECTROLYTE SEPARATOR BONDING AGENT

(71) Applicant: QUANTUMSCAPE BATTERY, INC., San Jose, CA (US)

(72) Inventors: Zhebo Chen, San Jose, CA (US); Niall Donnelly, San Jose, CA (US); Tim Holme, San Jose, CA (US); Deepika Singh, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 15 days.

(21) Appl. No.: 16/786,837

(22) Filed: Feb. 10, 2020

(65) Prior Publication Data

US 2020/0176743 A1    Jun. 4, 2020

Related U.S. Application Data

(63) Continuation of application No. 15/595,755, filed on May 15, 2017, now abandoned.
(Continued)

(51) Int. Cl.
*H01M 50/46* (2021.01)
*H01M 10/0562* (2010.01)
(Continued)

(52) U.S. Cl.
CPC ......... *H01M 50/461* (2021.01); *H01M 4/137* (2013.01); *H01M 4/1399* (2013.01);
(Continued)

(58) Field of Classification Search
CPC .......................................... H01M 10/056–0569
See application file for complete search history.

(56) References Cited

U.S. PATENT DOCUMENTS

| 4,259,061 A | 3/1981 | Dubetsky |
| 4,492,783 A | 1/1985 | Tanaka et al. |

(Continued)

FOREIGN PATENT DOCUMENTS

| CN | 101076915 A | 11/2007 |
| CN | 101518164   | 8/2009  |

(Continued)

OTHER PUBLICATIONS

Inada et al., "Development of Lithium-Stuffed Garnet-Type Oxide Solid Electrolytes with High Ionic Conductivity for Application to All-Solid-State Batteries", Frontiers in Energy Research, vol. 4, article 26, Jul. 2016, pp. 1-12.

(Continued)

*Primary Examiner* — Jonathan Crepeau
(74) *Attorney, Agent, or Firm* — Squire Patton Boggs (US) LLP

(57) ABSTRACT

Set forth herein are electrochemical cells which include a negative electrode current collector, a lithium metal negative electrode, an oxide electrolyte membrane, a bonding agent layer, a positive electrode, and a positive electrode current collector. The bonding agent layer advantageously lowers the interfacial impedance of the oxide electrolyte at least at the positive electrode interface and also optionally acts as an adhesive between the solid electrolyte separator and the positive electrode interface. Also set forth herein are methods of making these bonding agent layers including, but not limited to, methods of preparing and depositing precursor solutions which form these bonding agent layers. Set forth herein, additionally, are methods of using these electrochemical cells.

14 Claims, 14 Drawing Sheets

Related U.S. Application Data

(60) Provisional application No. 62/448,294, filed on Jan. 19, 2017, provisional application No. 62/336,474, filed on May 13, 2016.

(51) Int. Cl.

| | | |
|---|---|---|
| *H01M 4/38* | (2006.01) | |
| *H01M 50/411* | (2021.01) | |
| *H01M 10/0565* | (2010.01) | |
| *H01M 4/137* | (2010.01) | |
| *H01M 4/1399* | (2010.01) | |
| *H01M 10/04* | (2006.01) | |
| *H01M 10/052* | (2010.01) | |
| *H01M 10/0583* | (2010.01) | |
| *H01M 4/02* | (2006.01) | |

(52) U.S. Cl.
CPC ....... *H01M 4/382* (2013.01); *H01M 10/0468* (2013.01); *H01M 10/052* (2013.01); *H01M 10/0562* (2013.01); *H01M 10/0583* (2013.01); *H01M 50/411* (2021.01); *H01M 10/0565* (2013.01); *H01M 2004/027* (2013.01); *H01M 2300/0071* (2013.01)

(56) References Cited

U.S. PATENT DOCUMENTS

| | | | |
|---|---|---|---|
| 5,014,763 | A | 5/1991 | Frank |
| 5,130,067 | A | 7/1992 | Flaitz et al. |
| 5,256,242 | A | 10/1993 | Imaeda et al. |
| 5,279,994 | A | 1/1994 | Kerkar |
| 5,296,318 | A | 3/1994 | Gozdz et al. |
| 5,298,288 | A | 3/1994 | Curry et al. |
| 5,456,000 | A | 10/1995 | Gozdz et al. |
| 5,460,904 | A | 10/1995 | Gozdz et al. |
| 5,538,814 | A | 7/1996 | Kamauchi et al. |
| 5,620,637 | A | 4/1997 | Kaga et al. |
| 5,856,045 | A | 1/1999 | Fauteux et al. |
| 5,874,162 | A | 2/1999 | Bastian et al. |
| 5,922,493 | A | 7/1999 | Humphrey, Jr. et al. |
| 6,277,524 | B1 | 8/2001 | Kanno |
| 6,306,535 | B1 | 10/2001 | Tomimatsu et al. |
| 6,322,923 | B1 | 11/2001 | Spotnitz et al. |
| 6,432,585 | B1 | 8/2002 | Kawakami et al. |
| 6,447,712 | B1 | 9/2002 | Dogan et al. |
| 6,656,641 | B1 | 12/2003 | Kumar |
| 6,822,065 | B1 | 11/2004 | Sanchez et al. |
| 6,852,138 | B1 | 2/2005 | Topsoe et al. |
| 6,863,862 | B2 | 3/2005 | Rasouli et al. |
| 6,924,065 | B2 | 8/2005 | Noh |
| 7,108,827 | B1 | 9/2006 | Hata et al. |
| 7,396,614 | B2 | 7/2008 | Jouanneau et al. |
| 7,608,362 | B2 | 10/2009 | Chpi et al. |
| 7,736,810 | B2 | 6/2010 | Noh |
| 7,794,557 | B2 | 9/2010 | Hui et al. |
| 7,842,420 | B2 | 11/2010 | Wixom et al. |
| 7,892,676 | B2 | 2/2011 | Yang et al. |
| 7,901,658 | B2 | 3/2011 | Weppner et al. |
| 7,923,149 | B2 | 4/2011 | Hwang et al. |
| 7,923,154 | B2 | 4/2011 | Audemer et al. |
| 7,939,198 | B2 | 5/2011 | Mukherjee et al. |
| 7,972,899 | B2 | 7/2011 | Oladeji |
| 8,092,941 | B2 | 1/2012 | Weppner et al. |
| 8,268,488 | B2 | 9/2012 | Neudecker |
| 8,283,843 | B2 | 10/2012 | Pan et al. |
| 8,309,258 | B2 | 11/2012 | Kanamura et al. |
| 8,329,605 | B2 | 12/2012 | Bernard-Granger et al. |
| 8,431,287 | B2 | 4/2013 | Teramoto |
| 8,465,556 | B2 | 6/2013 | Oladeji |
| 8,658,317 | B2 | 2/2014 | Weppner et al. |
| 8,697,292 | B2 | 4/2014 | Kanno et al. |
| 8,828,580 | B2 | 9/2014 | Visco et al. |
| 8,865,355 | B2 | 10/2014 | Iriyama et al. |
| 8,877,388 | B1 | 11/2014 | Ihlefeld et al. |
| 8,940,446 | B1 | 1/2015 | Holme et al. |
| 9,034,526 | B2 | 5/2015 | Teshima et al. |
| 9,093,717 | B2 | 7/2015 | Sakamoto et al. |
| 9,350,047 | B2 | 5/2016 | Yoshida et al. |
| 9,548,512 | B2 | 1/2017 | Liang et al. |
| 9,666,870 | B2 | 5/2017 | Oladeji et al. |
| 10,505,222 | B2 | 12/2019 | Carignan et al. |
| 2002/0106447 | A1 | 8/2002 | Lindstrom et al. |
| 2003/0049499 | A1 | 3/2003 | Murakawa et al. |
| 2003/0072870 | A1 | 4/2003 | Brandle et al. |
| 2003/0148179 | A1 | 8/2003 | Uyama et al. |
| 2003/0180616 | A1 | 9/2003 | Johnson et al. |
| 2003/0211397 | A1 | 11/2003 | La Ferla et al. |
| 2004/0191617 | A1 | 9/2004 | Visco et al. |
| 2005/0016839 | A1 | 1/2005 | Horne et al. |
| 2005/0221163 | A1 | 10/2005 | Yang et al. |
| 2006/0120160 | A1 | 6/2006 | Park et al. |
| 2006/0197245 | A1 | 9/2006 | Cheng et al. |
| 2007/0015061 | A1 | 1/2007 | Klaassen |
| 2007/0020385 | A1 | 1/2007 | Naoi et al. |
| 2007/0148553 | A1 | 6/2007 | Weppner et al. |
| 2007/0231704 | A1 | 10/2007 | Inda |
| 2009/0068563 | A1 | 3/2009 | Kanda et al. |
| 2009/0092747 | A1 | 4/2009 | Zhamu et al. |
| 2009/0197172 | A1 | 8/2009 | Inda |
| 2009/0226790 | A1 | 9/2009 | Kanamura et al. |
| 2009/0301769 | A1 | 12/2009 | Seppa et al. |
| 2009/0311567 | A1 | 12/2009 | Visco et al. |
| 2009/0317724 | A1 | 12/2009 | Kumar et al. |
| 2010/0047696 | A1 | 2/2010 | Yoshida et al. |
| 2010/0203383 | A1 | 8/2010 | Weppner et al. |
| 2010/0263987 | A1 | 10/2010 | Meyer et al. |
| 2011/0045355 | A1 | 2/2011 | Ichikawa et al. |
| 2011/0052972 | A1 | 3/2011 | Sohn |
| 2011/0053000 | A1 | 3/2011 | Kanamura et al. |
| 2011/0053001 | A1 | 3/2011 | Babic et al. |
| 2011/0053002 | A1 | 3/2011 | Yamamura et al. |
| 2011/0133136 | A1 | 6/2011 | Weppner et al. |
| 2011/0168327 | A1 | 7/2011 | Oladeji |
| 2011/0171398 | A1 | 7/2011 | Oladeji |
| 2011/0177398 | A1 | 7/2011 | Affinito et al. |
| 2011/0223487 | A1 | 9/2011 | Johnson et al. |
| 2011/0244337 | A1 | 10/2011 | Ohta et al. |
| 2011/0262796 | A1 | 10/2011 | Shimooka et al. |
| 2012/0263987 | A1 | 5/2012 | Buckley et al. |
| 2012/0196189 | A1 | 8/2012 | Babic et al. |
| 2012/0208054 | A1 | 8/2012 | Shirasawa et al. |
| 2012/0237834 | A1 | 9/2012 | Ogasa |
| 2012/0251822 | A1 | 10/2012 | Mao et al. |
| 2012/0276439 | A1 | 11/2012 | Fujita et al. |
| 2013/0004814 | A1 | 1/2013 | Ohashi et al. |
| 2013/0056998 | A1 | 3/2013 | Chincarini et al. |
| 2013/0065135 | A1 | 3/2013 | Takeda et al. |
| 2013/0085055 | A1 | 4/2013 | Raj et al. |
| 2013/0108802 | A1 | 5/2013 | Oladeji |
| 2013/0122380 | A1 | 5/2013 | Visco et al. |
| 2013/0189562 | A1 | 7/2013 | Dolle et al. |
| 2013/0216783 | A1 | 8/2013 | Duan et al. |
| 2013/0260257 | A1 | 10/2013 | Choi |
| 2013/0281175 | A1 | 10/2013 | MacDonald et al. |
| 2013/0288875 | A1 | 10/2013 | Miyagawa et al. |
| 2013/0344416 | A1 | 12/2013 | Sakamoto et al. |
| 2014/0170480 | A1 | 1/2014 | Oladeji |
| 2014/0057153 | A1 | 2/2014 | Visco et al. |
| 2014/0057182 | A1 | 2/2014 | DeJonghe et al. |
| 2014/0072870 | A1 | 3/2014 | Otsuka et al. |
| 2014/0093785 | A1 | 4/2014 | Sugiura et al. |
| 2014/0099538 | A1 | 4/2014 | Johnson et al. |
| 2014/0120409 | A1 | 5/2014 | Ouchi et al. |
| 2014/0120421 | A1 | 5/2014 | Ouchi et al. |
| 2014/0134483 | A1 | 5/2014 | Ouchi et al. |
| 2014/0162113 | A1* | 6/2014 | Ohta ............... H01M 10/0562 429/162 |
| 2014/0170465 | A1 | 6/2014 | Visco et al. |
| 2014/0170468 | A1 | 6/2014 | Sasaoka |
| 2014/0170504 | A1 | 6/2014 | Baek et al. |
| 2014/0186720 | A1 | 7/2014 | Kintaka |
| 2014/0193695 | A1 | 7/2014 | Hoshina et al. |
| 2014/0205910 | A1 | 7/2014 | Weppner et al. |

(56) References Cited

U.S. PATENT DOCUMENTS

| | | |
|---|---|---|
| 2014/0234725 A1 | 8/2014 | Ogawa et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0057824 A1 | 2/2015 | Gheerardyn et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0171398 A1 | 6/2015 | Roumi |
| 2015/0180001 A1 | 6/2015 | Johnson et al. |
| 2015/0200420 A1 | 7/2015 | Holme et al. |
| 2015/0236373 A1 | 8/2015 | Ohtomo et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2015/0333376 A1 | 11/2015 | Gaben |
| 2016/0056500 A1 | 2/2016 | Holme et al. |
| 2016/0087321 A1 | 3/2016 | Wöhrle et al. |
| 2016/0111751 A1 | 4/2016 | Badding et al. |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0244665 A1 | 8/2016 | Vosgroene et al. |
| 2016/0293988 A1 | 10/2016 | Sakamoto et al. |
| 2016/0308244 A1 | 10/2016 | Badding et al. |
| 2016/0380301 A1 | 12/2016 | Kosaka et al. |
| 2017/0005367 A1 | 1/2017 | Van Berkel et al. |
| 2017/0054139 A1 | 2/2017 | Kerkamm |
| 2017/0162901 A1 | 6/2017 | Chen et al. |
| 2017/0214048 A1 | 7/2017 | Qian et al. |
| 2017/0229731 A1 | 8/2017 | Visco et al. |
| 2017/0309943 A1 | 10/2017 | Angell et al. |
| 2018/0261887 A1 | 9/2018 | Idikurt et al. |
| 2020/0067126 A1 | 2/2020 | Han et al. |

FOREIGN PATENT DOCUMENTS

| | | |
|---|---|---|
| CN | 102010183 | 4/2011 |
| CN | 102280659 A | 12/2011 |
| CN | 103117413 | 5/2013 |
| EP | 3 439 096 A1 | 2/2019 |
| JP | 10214638 A | 8/1998 |
| JP | 2000-128629 | 5/2000 |
| JP | 2004-63261 A | 2/2004 |
| JP | 2006-8488 | 1/2006 |
| JP | 2012-38425 | 2/2012 |
| JP | 2012-224520 A | 11/2012 |
| JP | 2012-243743 | 12/2012 |
| JP | 2013-107779 | 6/2013 |
| JP | 2013-134852 | 7/2013 |
| JP | 2013-214421 | 10/2013 |
| JP | 2015-215998 | 12/2015 |
| JP | 2016-134302 | 7/2016 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2016/044324 A1 | 3/2016 |
| WO | WO 2016/069749 | 5/2016 |
| WO | WO 2016/126610 | 8/2016 |
| WO | WO 2017/171187 A1 | 10/2017 |
| WO | WO 2017/181266 | 10/2017 |
| WO | WO 2018/075972 A1 | 4/2018 |
| WO | WO 2019/108698 A1 | 6/2019 |
| WO | WO 2019/236904 A1 | 12/2019 |
| WO | WO 2019/241745 A1 | 12/2019 |

OTHER PUBLICATIONS

Takahashi et al., "All-solid-state lithium battery with $LiBH_4$ solid electrolyte", Journal of Power Sources, 2013, vol. 226, pp. 61-64.

Ding et al., "Dendrite-Free Lithium Deposition via Self-Healing Electrostatic Shield Mechanism", J. Am. Chem. Soc., 2013, vol. 135, pp. 4450-4456, dx.doi.org/10.1021/ja312241y.

Louli et al., "Diagnosing and correcting anode-free cell failure via electrolyte and morphological analysis", Nature Energy, https://doi.org/10.1038/s41560-020-0668-8; 10 pages.

Niu et al., "High-energy lithium metal pouch cells with limited anode swelling and long stable cycles", Nature Energy, Jul. 2019, vol. 4, pp. 551-559, https://doi.org/10.1038/s41560-019-0390-6.

Zhu et al., "Design principles for self-forming interfaces enabling stable lithium-metal anodes", PNAS Latest Articles, www.pnas.org/cgi/doi/10.1073/pnas.2001923117; 9 pages.

L.B. Kong et al., Chapter 2, Transparent Ceramics, Topics in Mining, Metallurgy and Materials Engineering, DOI 10.1007/978-3-319-18956-7_2; pp. 29-90.

Taylor et al., "Characterizing the Stability and Kinetics of Hybrid Oxide-Sulfide Solid Electrolyte Cells", IOPscience, 2016, Meet. Abstr: MA2016-01, 264; https://doi.org/10.1149/MA2016-01/2/264.

Will et al., "Fabrication of thin electrolytes for second-generation solid oxide fuel cells," Solid State Ionics, 2000, vol. 131, pp. 79-96.

International Search Report and Written Opinion dated Apr. 15, 2016 in PCT/US2016/015209, 14 pages.

International Search Report and Written Opinion dated Dec. 1, 2016 in PCT/US2016/043428, 11 pages.

International Search Report and Written Opinion dated Mar. 10, 2015 in PCT/US2014/059578, 16 pages.

International Search Report and Written Opinion dated Mar. 23, 2015 in PCT/US2014/059575, 18 pages.

International search report and written opinion of PCT/US2018/062915 dated Feb. 28, 2019, 11 pages.

English translation of Office Action of Chinese application No. 201480055387.9 dated Dec. 22, 2016; 7 pages.

English translation of Office Action of Chinese application No. 201480055386.4 dated Jan. 4, 2017; 9 pages.

Extended European Search Report dated Feb. 22, 2017 for European application No. 14864783.7; 9 pages.

Office Action dated May 8, 2015 in U.S. Appl. No. 14/531,929, 12 pages.

Office Action of Japanese application No. 2016-520586 dated Nov. 28, 2017 together with an English translation; 8 pages.

Second Office Action of Chinese Application No. 201480055386.4 dated Nov. 1, 2017 together with an English translation, 10 pages.

Agrawal et al., "Solid polymer electrolytes: materials designing and all-solid-state battery applications: an overview", Journal of Physics D: Applied Physics 41, 2008, 223001, 18 pages.

Ahmad et al., "Concentration and mobility of mobile $Li^+$ ions in $Li_6BaLa_2Ta_2O_{12}$ and $Li_5La_3Ta_2O_{12}$ garnet lithium ion conductors," J Mater Sci: Mater Electron, 2015, vol. 26, pp. 8136-8142.

Ahmad, Mohamad M., "Lithium ionic conduction and relaxation dynamics of spark plasma sintered $Li_5La_3Ta_2O_{12}$ garnet nanoceramics," Ahmad Nanoscale Research Letters, 2015, 10:58, DOI 10.1186/s11671-015-0777-7; 10 pages.

Ahn et al., "Local impedance spectroscopic and microstructural analyses of Al-in-diffused $Li_7La_3Zr_2O_{12}$," Journal of Power Sources, 2014, vol. 254, pp. 287-292.

Aleman et al., "Definitions of Terms Relating to the Structure and Processing of Sols, Gels, Networks, and Inorganic-Organic Hybrid Materials", Pure Appl. Chem., 2007, vol. 79, No. 10, pp. 1801-1829.

Allen et al., "Effect of substitution (Ta, Al, Ga) on the conductivity of $Li_7La_3Zr_2O_{12}$", issued on Journal of Power Sources 2012, vol. 206, pp. 315-319.

Arora et al., "Battery Separators", Chemical Reviews, 2004, vol. 104, pp. 4419-4462.

Baek et al., "Garnet related lithium ion conductor processed by spark plasma sintering for all solid state batteries," Journal of Power Sources, 2014, vol. 249, pp. 197-206.

(56) References Cited

OTHER PUBLICATIONS

Baggetto et al., "High Energy Density All-Solid-State Batteries: A Challenging Concept Towards 3D Integration", Advanced Functional Materials, 2008, vol. 18, pp. 1057-1066.

Bernuy-Lopez et al., "Atmosphere Controlled Processing of Ga-Substituted Garnets for High Li-Ion Conductivity Ceramics," Chem. Mater. 2014, vol. 26, pp. 3610-3617.

Bonderer et al., "Free-Standing Ultrathin Ceramic Foils", Journal of the American Ceramic Society, 2010, vol. 93, No. 11, pp. 3624-3631.

Bruce et al.,"Li—$O_2$ and Li—S batteries with high energy storage", Nature Materials, Jan. 2012, vol. 11, pp. 19-29.

Buschmann et al. "Lithium metal electrode kinetics and ionic conductivity of the solid lithium ion conductors $Li_7La_3Zr_2O_{12}$ and $Li_7La_3Zr_2Ta_xO_{12}$ with garnet-type strucutre", Journal of Power Sources, 2012, vol. 206, pp. 236-244.

Buschmann et al., "Structure and dynamics of the fast lithium ion conductor: $Li_7La_3Zr_2O_{12}$", Phys. Chem. Chem. Phys., 2011, vol. 13, pp. 19378-19392.

Cao et al., "Effect of Sb—Ba codoping on the ionic conductivity of $Li_7La_3Zr_2O_{12}$ ceramic", Ceramics International, 2015, vol. 41, pp. 6232-6236.

Chen et al., "Origin of High Li+ Conduction in Doped $Li_7La_3Zr_2O_{12}$ Garnets," Chemistry of Materials, 2015, vol. 27, pp. 5491-5494.

Chen et al., "Sol-gel derived Li—La—Zr—O thin films as solid electrolytes for lithium-ion batteries", Journal of Materials Chemistry A, 2014, vol. 2, pp. 13277-13282.

Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.

Cheng et al., "Effect of Surface Microstructure on Electrochemical Performance of Garnet Solid Electrolytes", ACS Appl. Mater. Interfaces, 2015, vol. 7, pp. 2073-2081.

Cheng et al., "Interrelationships among Grain Size, Surface Composition Air Stability, and Interfacial Resistance of Al-Substituted $Li_7La_3Zr_2O_{12}$ Solid Electrolytes," ACS Appl. Mater. Interfaces, 2015, vol. 7, pp. 17649-17655.

Cheng et al., "The origin of high electrolyte-electrode interfacial resistances in lithium cells containing garnet type solid electrolytes," Phys. Chem. Chem. Phys., 2014, vol. 16, pp. 18294-18300.

Cheng et al., "Effect of microstructure and surface impurity segregation on the electrical and electrochemical properties of dense Al-substituted $Li_7La_3Zr_2O_{12}$," J. Mater. Chem., 2014, 10 pages.

David et al., "Microstructure and Li-Ion Conductivity of Hot-Pressed Cubic $Li_7La_3Zr_2O_{12}$", J. Am. Cerami. Soc., 2015, pp. 1-6.

Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.

Dhivya et al., "Effect of Simultaneous Substitution of Y and Ta on the Stabilization of Cubic Phase, Microstructure, and $Li^+$ Conductivity of $Li_7La_3Zr_2O_{12}$ Lithium Garnet," ACS Appl. Mater. Interfaces, 2014, vol. 6, pp. 17606-17615.

Dhivya et al., "$Li^+$ transport properties of W substituted $Li_7La_3Zr_2O_{12}$ cubic lithium garnets," AIP Advances, 2013, vol. 3, No. 082115, 22 pages.

Djenadic, Ruzica et al., "Nebulized spray pyrolysis of Al-doped $Li_7La_3Zr_2O_{12}$ solid electrolyte for battery applications," Solid State Ionics, 2014, vol. 263, pp. 49-56.

Dong et al., "Electrochemical perofmrance and lithium-ion insertion/extraction mechanism studies of the novel $Li_2ZrO_3$ anode materials," Electrochimica Acta, 2015, vol. 161, pp. 219-225.

Duvel, Andre, et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry, 2012, vol. 116, pp. 15192-15202.

Ferrese et al., "Lithium Redistribution in Lithium-Metal Batteries", Journal of the Electrochemical Society, vol. 159, 2012, pp. A1615-A1623.

Fries, R. et al., "Fabrication and properties of an anisotropic PZT/Polymer 0-3 composite," J. Mater. Sci.: Mater. in Electronics, 1994, vol. 5, pp. 238-243.

Geiger, Charles, A., et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Gorte et al., "Anodes for Direct Oxidation of Dry Hydrocarbons in a Solid-Oxide Fuel Cell", Advanced Materials, 2000, vol. 12, No. 19, pp. 1465-1469.

Gu et al., "Effects of penta-and trivalent dopants on structures and conductivity $Li_7La_3Zr_2O_{12}$ ," Solid State Ionics, 2015, vol. 274, pp. 100-105.

Han et a., "Experimental visualization of lithium conduction pathways in garnet-type $Li_7La_3Zr_2O_{12}$," Chem. Commun., 2012, vol. 48, pp. 9840-9842.

Hayashi et al., "All-solid-state rechargeable lithium battens with $Li_2S$ as a positive electrode material", J. Power Sources, vol. 183, 2008, pp. 422-426.

Hayashi et al., "New Phases in $La_2O_3$—$Li_2O$—$Ta_2O_5$ System," Mat. Res. Bull. 1986, vol. 21, No. 3, pp. 289-293.

Herrmann et al., "Micro-sgregations in liquid phase sintered silicon carbide ceramics," Journal of the European Ceramic Society, 2010, vol. 30, pp. 1495-1501.

Hitz et al., "Highly Li-Stuffed Garnet-Type $Li_{7+x}La_3Zr_{2-x}Y_xO_{12}$," Journal of the Electrochemical Society, 2013, vol. 160, No. 8, pp. A1248-A1255.

Hyooma et al.,"Crystal Structures of $La_3Li_5M_2O_{12}$ (M=Nb, Ta)," Mat. Res. Bull. 1988, vol. 23, No. 10, pp. 1399-1407.

Ishiguro et al., "Stability of Nb-Doped Cubic $Li_7La_3Zr_2O_2$ with Lithium Metal," Journal of the Electrochemical Society, 2013, vol. 160, No. 10, pp. A1690-A1693.

Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 2014, vol. 248, pp. 943-950.

Jalm et al., "Effects of Gallium doping in Garnet-Type $Li_7La_3Zr_2O_{12}$ Solid Electrolytes," Chemistry of Materials, 2015, vol. 27, pp. 2821-2831.

Jalem, Randy et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.

Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace.13578.

Janani, Narayanasamy et al., "Influence of sintering additives on densification and $Li^+$ conductivity of Al doped $Li_7La_3Zr_2O_{12}$ lithium garnet," RSC Adv. 2014, vol. 4, pp. 51228-51238.

Jin et al., "Al-doped $Li_7La_3Zr_2O_2$ synthesized by a polymerized complex method," Journal of Power Sources, 2011, vol. 196, pp. 8683-8687.

Jung, Yun-Chae et al., "Ceramic separators based on Li þ -conducting inorganic electrolyte for high-performance lithium-ion batteries with enhanced safety," Journal of Power Sources, 2015, vol. 293, pp. 675-683.

Kanamura et al., "Three dimensionally ordered composite solid materials for all solid-state rechargeable lithium batteries", Journal of Power Sources, vol. 146, Jun. 2005, pp. 86-89.

Kang et al., "First-Principles Study of Chemical Stability of Lithium Oxide Garnets $Li_7La_3M_2O_{12}$ (M = Zr, Sn, or Hf)," The Journal of Physical Chemistry C, 2014, vol. 118 (31), pp. 17402-17406.

Kato, Takehisa et al., "Preparation of thick-film electrode-solid electrolyte composites on $Li_7La_3Zr_2O_{12}$ and their electrochemical properties," Journal of Power Sources, 303, 2016, pp. 65-72.

(56) References Cited

OTHER PUBLICATIONS

Katsui et al., "Preparation of cubic and tetragonal $Li_7La_3Zr_2O_{12}$ flim by metal organic chemical vapor deposition," Thin Solid Films, vol. 584, Jun. 2015, pp. 130-134.

KC, Santosh et al., "Point defects in garnet-type solid electrolyte (c-$Li_7La_3Zr_2O_{12}$) for Li-ion batteries," Solid State Ionics, 2014, vol. 261, pp. 100-105.

Kerman et al., "Complex oxide nanomembranes for energy conversion and storage: A review ", Journal of Materials Research, vol. 29, No. 3, Feb. 14, 2014, pp. 320-337.

Kihira, Yuki et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.

Kim et al., "Epitaxial growth and lithium ion conductivity of lithium-oxide garnet for an all solid-state battery electrolyte†", Dalton Transactions, 2013, vol. 42, pp. 13112-13117.

Kim et al., "The Effect of Relative Density on the Mechanical Properties of Hot-Pressed Cubic $Li_7La_3Zr_2O_{12}$," J. Am. Ceram. Soc., 2016, pp. 1-8.; DOI: 10.1111/jace.14084.

Kim, Ki Hyun et al., "Characterization of the interface between LiCoO2 and $Li_7La_3Zr_2O_{12}$ in an all-solid-state rechargeable lithium battery," Journal of Power Sources, 196, 2011, pp. 764-767.

Kitaura et al., "Fabrication of electrode-electrolyte interfaces in all-solid-state rechargeable lithium batteries by using a supercooled liquid state of the glassy electrolytes", Journal of Materials Chemistry, vol. 21, No. 1, 2011, pp. 118-124.

Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.

Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.

Kokal et al., "Sol-gel synthesis and lithium ion conductivity of $Li_7La_3Zr_2O_{12}$ with garnet-related type structure," Solid State Ionics, 2011, vol. 185, pp. 42-46.

Kong et al., "Transparent Ceramics, Topics in Mining," Springer International Publishing Switzerland, 2015, pp. 29-91.

Kotobuki, Masashi et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.

Kotobuki, Masashi et al., "Fabrication of all-solid-state lithium battery with lithium metal anode using $Al_2O_3$-added $Li_7La_3Zr_2O_{12}$ solid electrolyte," Journal of Power Sources, 196, 2011, pp. 7750-7754.

Kotobuki, Masashi, et al., "Compatibility of Li2La3Zr2012 Solid Electrolyte to All-Solid-State Battery Using Li Metal Anode," Journal of the Electrochemical Society, 2010, vol. 157, No. 10, pp. A1076-A1079.

Lai, Wei et al., "Ultrahigh-Energy-Density Microbatteries Enabled by New Electrode Architecture and Micropackaging Design," Adv. Mater. 2010, vol. 22, E139-E144.

Lallemant et al., "Transparent polycrystalline alumina obtained by SPS: Green bodies processing effect," Journal of the European Ceramic Society, 2012, vol. 32, pp. 2909-2915.

Langer et al., "Syntheis of single phase cubic Al-substituted $Li_7La_3Zr_2O_{12}$ by solid state lithiation of mixed hydroxides," Journal of Alloys and Compounds, 2015, vol. 645, pp. 64-69.

Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.

Lee et al., "High lithium ion conductivity of $Li_2La_3Zr_2O_{12}$ synthesized by solid state reaction," Solid State Ionics, 2014, vol. 258, pp. 13-17.

Li et al., "Optimizing Li conductivity in a garnet framework," J. Mater. Chem., 2012, vol. 22, pp. 15357-15361.

Li et al., "The reaction of $Li_{6.5}La_3Zr_{1.5}Ta_{0.5}O_{12}$ with water," Solid State Ionics, 2015, vol. 269, pp. 57-61.

Li et al., "W-Doped $Li_7La_3Zr_2O_{12}$ Ceramic Electrolytes for Solid State Li-ion Batteries," Electrochimica Acta, 2015, vol. 180, pp. 37-42.

Liu et al., "High Ion Conductivity in Garnet-type F-doped $Li_7La_3Zr_2O_{12}$," Journal of Inorganic Materials, Sep. 2015, vol. 30, No. 9, pp. 995-1001.

Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.

Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.

Matsuda et al., "Phase formation of a garnet-type lithium-ion conductor $Li_{7-3x}Al_xLa_3Zr_2O_{12}$," Solid State Ionics, 2015, vol. 277, pp. 23-29.

Matsui et al., "Phase stability of a garnet-type lithium ion conductor $Li_7La_3Zr_2O_{12}$," The Royal Society of Chemistry, Dalton Transactions, 2014, vol. 43, pp. 1019-1024.

Matsui et al., "Phase transformation of the garnet structured lithium ion conductor: $Li_7La_3Zr_2O_{12}$", Solid State Ionics, 2014, vol. 262, pp. 155-159.

McCloskey et al., "On the Mechanism of Nonaqueous $Li-O_2$ Electrochemistry on C and Its Kinetic Overpotentials: Some Implications for Li-Air Batteries", J. Phys. Chemistry C, 2012, vol. 116, pp. 23897-23905.

McKeen, Fluorinated Coatings and Finishes Handbook—The Definitive User's Guide and Databook, 2006, William Andrew Publishing/Plastics Design Library, Chapter 10, pp. 135-146.

Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \le x \le 0.375$, $0 \le y \le 1$) Superionic Conductor: A First Principles Investigation," Chem. Mater. 2013, vol. 25, pp. 3048-3055.

Miara et al., "First-Principles Studies on Cation Dopants and Electrolyte|Cathode Interphases for Lithium Garnets," Chemestry of Materials, 2015, vol. 27, pp. 4040-4047.

Minami et al., "Crystallization Process for Superionic $Li_7P_3S_{11}$ Glass-Ceramic Electrolytes", Journal of the American Ceramic Society, 2011, vol. 94, pp. 1779-1783.

Mitterdorfer et al., "Fabrication of thin electrolytes for second-generation solid oxide fuel cells," Solid State Ionics, 2000, vol. 131, pp. 79-96.

Miyauchi et al., "New Amorphous Thin Films of Lithium Ion Conductive Solid Electrolyte," Solid State Ionics 9 & 10, 1983, pp. 1469-1472.

Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.

Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.

Mukhopadhyay et al., "Structure and Stoichiometry in Supervalent Doped $Li_7La_3Zr_2O_{12}$," Chem. Mater., 2015, vol. 27, pp. 3658-3665.

Murugan et al., "Schnelle Lithiumionenleitung in granatartigem $Li_7La_3Zr_2O_{12}$", Angew. Chem., 2007, vol. 119, pp. 7925-7928, with an English translation, "Fast Lithium Ion Conduction in Garnet-Type $Li_7La_3Zr_2O_{12}$," Angew. Chem. Int. Ed., 2007, 46, pp. 7778-7781.

Narayanan et al., "Dopant Concentration-Porosity-Li-Ion Conductivity Relationship in Garnet-Type $Li_{5+2x}La_3Ta_{2-x}Y_xO_{12}$ ($0.05 \le x \le 0.75$) and Their Stability in Water and 1 M LiCl," Inorganic Chemistry, 2015, vol. 54, pp. 6968-6977.

Nemori et al., "Stability of garnet-type solid electrolyte $Li_xLa_3A_{2-y}B_yO_{12}$ (A=Nb or Ta, B = Sc or Zr)," Solid State Ionics, 2015, vol. 282, pp. 7-12.

Neudecker et al., "'Lithium-Free' Thin-Film Battery with In Situ Plated Li Anode", Journal of the Electrochemical Society, 2000, vol. 147, No. 2, pp. 517-523.

Ni et al., "Room temperature elastic moduli and Vickers hardness of hot-pressed LLZO cubic garnet," J. Mater. Sci., 2012, vol. 47, pp. 7979-7985.

(56) References Cited

OTHER PUBLICATIONS

Nyman et al., "Alternative Approach to Increasing Li Mobility in Li—La—Nb/Ta Garnet Electrolytes," Chem. Mater., 2010, vol. 22, No. 19, pp. 5401-5410.

Ohta et al., "Co-sinterable lithium garnet-type oxide electrolyte with cathode for all-solid-state lithium ion battery," Journal of Power Sources, 2014, vol. 265, pp. 40-44.

Ohta et al., "High lithium ionic conductivity in the garnet-type oxide $Li_{7-x}La_3(Zr_{2-x},Nb_x)O_{12}(X=0-2)$," Journal of Power Sources, 2011, vol. 196, pp. 3342-3345.

Ohta et al., "All-solid-state lithium ion battery using garnet-type oxide and Li3BO3 solid electrolytes fabricated by screen-printing," Journal of Power Sources, 2013, vol. 238, pp. 53-56.

Ohta et al., "Electrochemical performance of an all-solid-state lithium ion battery with garnet-type oxide electrolyte," Journal of Power Sources, 2012, vol. 202, pp. 332-335.

Onodera et al., "Flux Growth of Idiomorphic Garnet-Type Solid Electrolyte Crystals for All-Solid-State Lithium-Ion Rechargeable Batteries," 2012, The Electrochemical Society, Abstract #1198, 1 page.

Parashar et al., "Ethyl silicate binders for high performance coatings", 2001, Progress in Organic Coatings, 2001, vol. 42, pp. 1-14.

Park et al., "Effects of crystallinity and impurities on the electrical conductivity of Li—La—Zr—O thin films", Thin Solid Films, 2015, vol. 576, pp. 55-60.

Peng et al., "A Reversible and Higher-Rate Li—$O_2$ Battery", Science, Aug. 3, 2012, vol. 337, pp. 563-567.

Pierson, H.O., Handbook of "Carbon, Graphite, Diamond and Fullerenes"—Properties, Processing and Applications, 1993, William Andrew Publishing/Noyes, Chapters, Section 5.1, pp. 43-69.

Puech et al., "Elaboration and characterization of a free standing LiSICON membrane for aqueous lithiumeair battery," Journal of Power Sources, 214, 2012, pp. 330-336.

Quartarone et al., "Electrolytes for solid-state lithium rechargeable batteries: recent advances and perspectives", Chemical Society Reviews, vol. 40, 2011, pp. 2525-2540.

Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.

Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.

Rangasamy et al., "A High Conducting Oxide-Sulfide Composite Lithium Superionic Conductor," J. Mater. Chem. A, published 2014, vol. 2, pp. 4111-4116.

Rangasamy, E., et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.

Rangasamy, E., et al., "The role of Al and Li concentration on the formation of cubic garnet solid electrolyte of nominal composition $Li_7La_3Zr_2O_{12}$," Solid State Ionics, 2012, vol. 206, pp. 28-32.

Rao et al.,"In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.

Raskovalov et al., "Structure and transport properties of $L1_7La_3Zr_{2-0.75x}Al_xO_{12}$ supersonic solid electrolytes," Journal of Power Sources, 2013, vol. 238, pp. 48-52.

Reed, James S., Principles of Ceramics Processing, 2nd Edition, John Wiley & Sons, Inc., New York, pp. 60-61.

Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.

Ren et al., "Direct observation of lithium dendrites inside garnet-type lithium-ion solid electrolyte," Electrochemistry Communications, 2015, vol. 57, pp. 27-30.

Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.

Rettenwander et al., "Site Occupation of Ga and Al in Stabilized Cubic $Li_{7-3(x+y)}Ga_xAl_yLa_3Zr_2O_{12}$ Garnets as Deduced from $^{27}Al$ and $^{71}Ga$ MAS NMR at Ultrahigh Magnetic Fields," Chemistry of Materials, 2015, vol. 27, pp. 3135-3142.

Rettenwander et al., "Synthesis, Crystal Chemistry, and Electrochemical Properties of $Li_{7-2x}La_3Zr_{2-x}Mo_xO_{12}$ (x = 0.1-0.4): Stabilization of the Cubic Garnet Polymorph via Substitution of $Zr^{4+}$ by $Mo^{6+}$," Inorganic Chemistry, 2015, vol. 54, pp. 10440-10449.

Rettenwander et al., "DFT study of the role of $Al^{3+}$ in the fast ion-conductor $Li_{7-3x}Al^{3+}{}_xLa_3Zr_2O_{12}$ Garnet," Chem. Mater. 2014, vol. 26, pp. 2617-2623.

Rosero-Navarro et al., "Preparation of $Li_7La_3(Zr_{2-x},Nb_x)O_{12}$ (x= 0-1.5) and $Li_3BO_3/LiBO_2$ composites at low temperatures using a sol-gel process," Solid State Ionics, 2016, vol. 285, pp. 6-12.

Sakamoto et al., "Synthesis of nano-scale fast ion conducting cubic $Li_7La_3Zr_2O_{12}$", Nanotechnology, 2013, vol. 24, 424005, 8 pages.

Sakamoto, Jeff, "Garnet-based ceramic electrolyte: Enabling Li metal anodes and solid state batteries," Beyond Lithium Ion VI, Jun. 4-6, 2013, Boulder, CO., 36 pages.

Sakuda et al., "All-solid-state lithium secondary batteries using $LiCoO_2$ particles with pulsed laser deposition coatings of $Li_2S$—$P_2S_5$ solid electrolytes", J. Power Sources, vol. 196, 2011, pp. 6735-6741.

Sakuda et al., "Interfacial observation between $LiCoO_2$ electrode and $Li_2S$—$P_2S_5$ solid electrolytes of all-solid-state Lithium Secondary Batteries Using Transmission Electron Microscopy", Chem. of Materials, 2010, vol. 22, pp. 949-956; DOI:10.1021/cm901819c.

Sakuda et al., "Evaluation of elastic modulus of $Li_2S$—$P_2S_5$ glassy solid electrolyte by ultrasonic sound velocity measurement and compression test", Journal of the Ceramic Society of Japan 121, 2013, pp. 946-949.

Satyanarayana et al., "Structure and Li+ dynamics of Sb-doped $Li_7La_3Zr_2O_{12}$ fast lithium ion conductors", issued on Phys. Chem. Chem. Phys., 2013, vol. 15, pp. 11327-11335.

Schafbauer et al., "Tape Casting as a Multi Purpose Shaping Technology for Different Applications in Energy Issues", Materials Science Forum, vols. 706-709, 2012, pp. 1035-1040.

Schmidt et al., "In-situ, non-destructive acoustic characterization of solid state electrolyte cells", Journal of Power Sources, 2016, vol. 324, pp. 126-133.

Sharafi et al., Characterizing the Li—$Li_7La_3Zr_2O_{12}$ interface stability and kinetics as a function of temperature and current density, Journal of Power Sources, 2016, vol. 302, pp. 135-139.

Shimonishi et al., "Synthesis of garnet-type $Li_{7-x}La_3Zr_2O_{12-1/2X}$ and its stability in aqueous solutions," Solid State Ionics, 2011, vol. 183, pp. 48-53.

Shin et al., "Synergistic multi-doping effects on the $Li_7La_3Zr_2O_{12}$ solid electrolyte for fast lithium ion conduction," Scientific Reports, 2015, pp. 1-9.

Song et al., "Crystal structure, migration mechanism and electrochemical performance of Cr-stabilized garnet," 2014, vol. 268, pp. 135-139.

Stepina et al., "Ethylene vinylacetate copolymer and nanographite composite as chemical vapour sensor", Functional Materials and Nanotechnologies, 2013; IOP Conf. Series: Materials Science and Engineering 49, 2013, 012017 doi:10.1088/1757-899X/49/1/012017, pp. 1-4.

Suárez et al., "Sintering to Transparency of Polycrystalline Ceramic Materials," Mar. 2, 2012, pp. 527-553: http://www.intechopen.com/books/sintering-of-ceramics-new-emerging-techniques/sintering-to-transparencyof-polycrystalline-ceramic-materials.

Sudo et al., "Interface behavior between garnet-type lithium-conducting solid electrolyte and lithium metal," Solid State Ionics, 2014, vol. 262, pp. 151-154.

Suzuki et al., "Transparent cubic garnet-type solid electrolyte of $Al_2O_3$-doped $Li_7La_3Zr_2O_{12}$," Solid State Ionics, 2015, vol. 278, pp. 172-176.

Suzuki et al., "Development of complex hydride-based all-solid-state lithium ion battery applying low melting point electrolyte", Journal of Power Sources, 2017, vol. 359, pp. 97-103.

Tadanaga et al., "Low temperature synthesis of highly ion conductive $Li_7La_3Zr_2O_{12-Li3}BO_3$ composites," Electrochemistry Communications, 2013, vol. 33, pp. 51-54.

(56) References Cited

OTHER PUBLICATIONS

Takada, "Progress and prospective of solid-state lithium batteries", Acta Materialia 61, 2013, pp. 759-770.
Takeda et al., "High Pressure Form of Fluoride Garnets $Na_3M_2Li_3F_{12}$ (M= & Fe)," Mat. Res. Bull., 1977, vol. 12, No. 7, pp. 689-692.
Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.
Teng, Shiang, et al., "Recent Developments in garnet based solid state electrolytes for thin film batteries," Current Opinion in Solid State and Materials Science, Feb. 2014, vol. 18, No. 18, pp. 29-38.
Thangadurai et al., "Fast Solid-State Li Ion Conducting Garnet-Type Structure Metal Oxides for Energy Storage," J. Phys. Chem. Lett, 2015, vol. 6, pp. 292-299.
Thangadurai et al., "$Li_6ALa_2N\,O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.
Thangadurai et al., "Novel Fast Lithium Ion Conduction in Garnet-Type $Li_5La_3M_2O_{12}$ (M = NB, Ta)," J. Am. Ceram. Soc., 2003, vol. 86, No. 3, pp. 437-440.
Thangadurai et al., "Garnet-type solid-state fast Li ion conductors for Li batteries: critical review", Chemical Society Reviews, 2014, vol. 43, pp. 4714-4727.
Thompson et al., "A Tale of Two Sites: On Defining the Carrier Concentration in Garnet-Based Ionic Conductors for Advanced Li Batteries," Adv. Energy Mater., 2015, 1500096, pp. 1-9.
Toda, S., et al., "Low temperature cubic garnet-type $CO_2$-doped $Li_7La_3Zr_2O_{12}$," Solid State Ionics, 2013, vol. 233, pp. 102-106.
Tong et al., "Highly Conductive Li Garnets by a Multielement Doping Strategy", Inorganic Chemistry, 2015, vol. 54, pp. 3600-3607.
Ulissi, Ulderico et al., "All solid-state battery using layered oxide cathode, lithium-carbon composite anode and thio-LISICON electrolyte," Solid State Ionics, vol. 296, 2016, pp. 13-17.
Wainwright et al., "Forces generated by anode growth in cylindrical $Li/MoS_2$ cells," Journal of Power Sources, 1991, vol. 34, pp. 31-38.
Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.
Wang et al., "Formulation and characterization of ultra-thick electrodes for high energy lithium-ion batteries employing tailored metal foams", J. Power Sources, 2011, vol. 196, pp. 8714-8718.
Wang et al., "The synergistic effects of al and Te on the structure and Li+-mobility of garnet-type solid electrolytes", J. Mater. Chem. A., 2014, vol. 2, pp. 20271-20279.
Wang et al., "Transparent ceramics: Processing, materials and applications," Progress in Solid State Chemistry, 41, 2013, pp. 20-54.

Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, 27, pp. 6650-6659.
Wang, Shutao et al., "Syntheses and structures of lithium zirconates for high-temperature $CO_2$ absorption," J. Mater. Chem. A, 2013, 1, pp. 3540-3550.
Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.
Wilkinson, D.P. et al., "Effects of physical constraints on Li cycability," Journal of Power Sources, 1991, vol. 36, pp. 517-527.
Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.
Wolfenstine et al., "Chemical stability of cubic $Li_7La_3Zr_2O_{12}$ with molten lithium at elevated temperature", J. Mater. Sci., 2013, vol. 48, pp. 5846-5851.
Xie et al., "Lithium Distribution in Aluminum-Free Cubic $Li_7La_3Zr_2O_{12}$", Chem. Mater., 2011, vol. 23, pp. 3587-3589.
Xie et al., "Low-temperature synthesis of $Li_7La_3Zr_2O_{12}$ with cubic garnet-type structure," Materials Research Bulletin, 2012, vol. 47, pp. 1229-1232.
Xu et al., "Multistep sintering to synthesize fast lithium garnets," Journal of Power Sources, 2016, vol. 302, pp. 291-297.
Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J.Physical Chemistry C, 2015, vol. 119, pp. 14947-14953.
Yi et al., "Flame made nanoparticles permit processing of dense, flexible, Li+ conducting ceramic electrolyte thin films of cubic-$Li_7La_3Zr_2O_{12}$ (c-LLZO) ," J. Mater. Chem. A, 2016, vol. 4, pp. 12947-12954.
Yoshima, Kazuomi et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.
Zaiß et al., "Fast ionic conduction in cubic hafnium garnet $Li_7La_3Hf_2O_{12}$," Ionics, Springer-Verlag, 2010, vol. 16, pp. 855-858.
Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.
Zhang et al., "Field assisted sintering of dense Al-substituted cubic phase $Li_7La_3Zr_2O_{12}$ solid electrolytes," Journal of Power Sources, 2014, vol. 268, pp. 960-964.
Zhang et al., "Preparation of cubic $Li_7La_3Zr_2O_{12}$ solid electrolyte using a nano-sized core-shell structured precursor," Journal of Alloys and Compounds, 2015, vol. 644, pp. 793-798.

* cited by examiner

401 →

402 →

SOLID ELECTROLYTE SEPARATOR BONDING AGENT

This application claims priority to, and the benefit of, U.S. Provisional Patent Application No. 62/336,474, filed May 13, 2016, entitled SOLID ELECTROLYTE SEPARATOR BONDING AGENT, and U.S. Provisional Patent Application No. 62/448,294, filed Jan. 19, 2017, entitled SOLID ELECTROLYTE SEPARATOR BONDING AGENT, the entire contents of each of which are herein incorporated by reference in their entirety for all purposes.

BACKGROUND

In a rechargeable $Li^+$ ion battery, $Li^+$ ions move from a negative electrode to a positive electrode during discharge and in the opposite direction during charge. This process produces electrical energy (Energy=Voltage×Current) in a circuit connecting the electrodes, which is electrically insulated from, but parallel to, the $Li^+$ ion conduction path. The battery's voltage (V versus Li) is a function of the chemical potential difference for Li situated in the positive electrode as compared to the negative electrode and is maximized when Li metal is used as the negative electrode. An electrolyte physically separates and electrically insulates the positive and negative electrodes while also providing a conduction medium for $Li^+$ ions. The electrolyte ensures that when Li metal oxidizes, at the negative electrode during discharge (e.g., $Li \leftrightarrow Li^+ + e^-$), and produces electrons, these electrons conduct between the electrodes by way of an external circuit which is not the same pathway taken by the $Li^+$ ions.

Conventional rechargeable batteries use liquid electrolytes to separate the positive and negative electrodes. However, liquid electrolytes suffer from several problems including flammability during thermal runaway, outgassing at high voltages, and chemical incompatibility with lithium metal negative electrodes. As an alternative, solid electrolytes have been proposed for next generation rechargeable batteries. For example, $Li^+$ ion-conducting ceramic oxides, such as lithium-stuffed garnets, have been considered as electrolyte separators. See, for example, US Patent Application Publication No. 2015/0099190, published Apr. 9, 2015, and filed Oct. 7, 2014, titled GARNET MATERIALS FOR LI SECONDARY BATTERIES AND METHODS OF MAKING AND USING GARNET MATERIALS; U.S. Pat. Nos. 8,658,317; 8,092,941; and 7,901,658; also U.S. Patent Application Publication Nos. 2013/0085055; 2011/0281175; 2014/0093785; and 2014/0170504; also Bonderer, et al. "Free-Standing Ultrathin Ceramic Foils," Journal of the American Ceramic Society, 2010, 93(11):3624-3631; and Murugan, et al., *Angew Chem. Int. Ed.* 2007, 46, 7778-7781), the entire contents of each of these publications are incorporated by reference in their entirety for all purposes.

Solid electrolytes should reduce a battery's total weight and volume when paired with a lithium metal anode, when compared to a liquid electrolyte paired with a graphite anode, and thereby should increase its gravimetric and volumetric energy density. Despite these advantages, solid electrolytes are still insufficient in several regards for commercial applications. For example, when a battery with a lithium metal negative electrode charges and discharges, it expands and contracts as the lithium conducts between the electrodes. This expansion and contraction can lead to delamination of a solid electrolyte separator, positioned between a positive and negative electrode, from either or both of the positive and negative electrodes. Moreover, even in the absence of delamination, solid interfaces tend not to perfectly align with each other. If a solid lithium metal negative electrode is laminated to a solid electrolyte, and the solid electrolyte (i.e., separator), on the opposing side, is laminated to a positive electrode, each solid interface (Li-separator & Separator-Cathode) may have insufficient electrical contact due to areas where one solid interface does not perfectly align and contact another solid interface. When solid electrolytes are used to separate solid positive and negative electrodes, gaps or areas of non-contact may build up between the solid interfaces, e.g., the interface of the electrolyte and the positive electrode. Areas of non-contact between the solid electrolyte and the positive electrode result in impedance rises which reduce a battery's power and capacity. To date and the best of Applicant's knowledge, there are no public disclosures of commercially viable solid electrolyte separators which interface with a solid positive electrode with a sufficiently low interfacial resistance suitable for a commercial application.

When, for example, a solid separator such as a lithium-stuffed garnet electrolyte monolith contacts a positive electrode, there may be interfacial impedance between the solid electrolyte and the positive electrode due to poor wetting of the positive electrode, or its catholyte, onto the solid electrolyte surface, low ion-conductivity in either the separator or the electrode, or chemical reactions between the positive electrode and the solid electrolyte which produce side products detrimental to electrochemical performance. To address some of these challenges, certain researchers have attempted to combine liquid and gel electrolytes with lithium-stuffed garnets. See, for example, K. Yoshima, et al., *Journal of Power Sources,* 302 (2016) 283-290. However, no reported methods to date address these challenges for a battery that uses a lithium metal negative electrode. For example, while some researchers combined liquid electrolytes with lithium-stuffed garnets, the electrolytes used were insufficiently dense or of the incorrect form factor to protect a lithium metal negative electrode from exposure to the volatile components of the electrolyte. Also, for example, these electrolytes were insufficiently dense or of the incorrect form factor to protect an electrochemical cell from lithium dendrite growth. As such, the components in the liquid electrolyte would not be separated from a lithium metal negative electrode if one were used with these prior methods.

There is therefore a need for improved materials and methods for bonding electrolyte separators to positive electrodes. What is needed are, for example, new bonding agents for bonding a solid separator, e.g., a lithium-stuffed garnet separator, to a positive electrode in such a way that the bonding agent, the electrolyte or the catholyte in the positive electrode, do not detrimentally react with the Li metal in a lithium metal negative electrode but still provide a conduction medium for $Li^+$ ions to conduct between the electrodes. What is also needed in the relevant field is a material which bonds or adheres, or maintains direct contact between, a solid separator and a positive electrode and also lowers the resistance/impedance at the interface therebetween. The instant disclosure sets forth such materials and methods, in addition to making and using such materials and methods, and other solutions to problems in the relevant field.

BRIEF SUMMARY

In one embodiment, the instant disclosure sets forth an electrochemical stack which includes a lithium metal (Li) negative electrode, a positive electrode, an electrolyte separator in direct contact with the Li metal negative electrode, and a bonding layer comprising a lithium salt, a polymer, and a solvent. In some examples, the bonding layer is a gel electrolyte. The bonding layer directly contacts, and is positioned between, the electrolyte separator and the positive electrode, and the electrolyte separator protects the Li metal negative electrode from exposure to the polymer or to the solvent, or both, in the bonding layer. As described herein, in some examples, the bonding layer lowers the interfacial impedance at the interface between the electrolyte separator and the positive electrode when compared to the electrolyte separator in direct physical contact with the positive electrode. In some examples, the bonding layer lowers the interfacial impedance at the interface between the electrolyte membrane and the positive electrode by a factor of at least 10, at least 100, or at least 1000 with respect to the interfacial impedance at the interface between the electrolyte membrane and the positive electrode when a bonding layer is not positioned between, the electrolyte membrane and the positive electrode.

In a second embodiment, the instant disclosure sets forth a method of making a free standing gel electrolyte, wherein the method includes spin coating solution to form a gel electrolyte onto a solid separator, wherein the solution includes two or more solvents, wherein the two or more solvents have different boiling points, and volatilizing at least one of the two or more solvents to form a porous gel electrolyte on a solid separator.

In a third embodiment, the instant disclosure sets forth a method of making an electrochemical stack having a solid electrolyte separator and a gel electrolyte.

In a fourth embodiment, the instant disclosure sets forth a method of using an electrochemical stack having a solid electrolyte separator and a gel electrolyte.

In a fifth embodiment, the instant disclosure sets forth a phase-inversion gel electrolyte on the surface of a solid separator in contact with a cathode, wherein the gel electrolyte can be cast, bonded, laminated or adhered to a solid separator through spin coating, doctor blading, or other related techniques.

In a sixth embodiment, the instant disclosure sets forth a method of making a phase-inversion gel electrolyte.

In a seventh embodiment, the instant disclosure sets forth a method of making an electrochemical stack having a solid electrolyte separator and a phase-inversion. In some examples, the phase inversion gel is spin-coated on the solid electrolyte separator.

In an eighth embodiment, the instant disclosure sets forth a method of using an electrochemical stack having a solid separator and a phase-inversion gel spin-coated on the electrochemical stack.

BRIEF DESCRIPTION OF THE DRAWINGS

FIG. 2 is a plot of Voltage [V] as a function of Run time [s].

FIG. 3 is a plot of Voltage [V] as a function of Cycle active mass-specific capacity [mAh/g].

Figure 1:
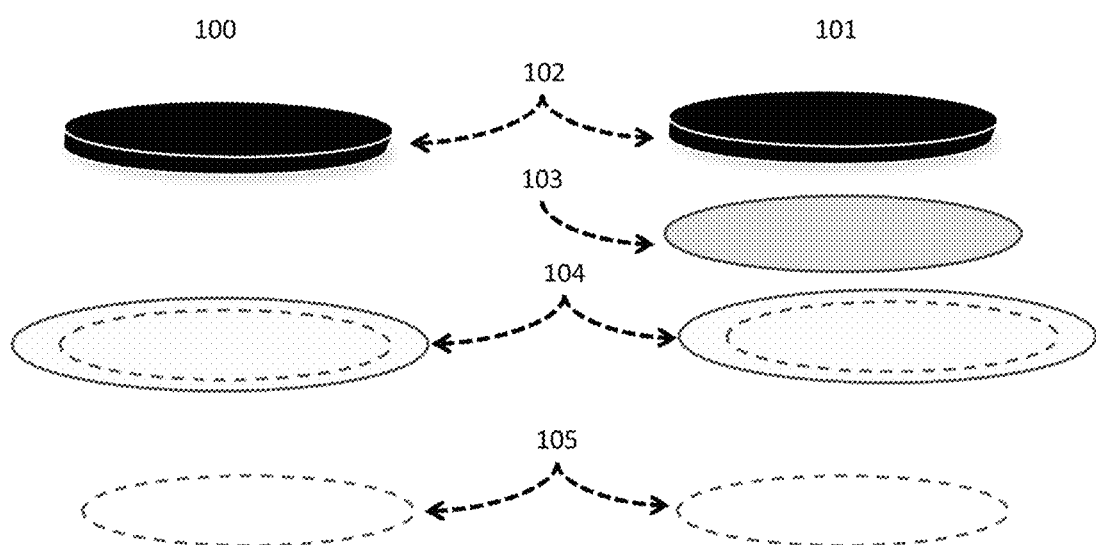
FIG. 1 shows a side view of an example electrochemical stack, 100, with comparison to another example electrochemical stack, 101.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

GENERAL DESCRIPTION

I. Introduction

Set forth herein are electrochemical cells which include a negative electrode current collector, a lithium metal negative electrode, a solid electrolyte membrane (e.g., an electrolyte separator comprising a lithium-stuffed garnet oxide), a bonding agent layer, a positive electrode, and a positive electrode current collector. As used herein, a membrane is a type of separator. In these cells, the lithium metal negative electrode directly contacts and is positioned between the negative electrode current collector and the electrolyte membrane; the electrolyte directly contacts and is positioned between the lithium metal negative electrode and the bonding agent layer; the bonding agent layer directly contacts and is positioned between the electrolyte and the positive electrode; and the positive electrode directly contacts and is positioned between the bonding agent layer and the positive electrode current collector. The bonding agent layer advantageously lowers the interfacial impedance of the oxide-based electrolyte at the positive electrode interface and also assists in the adhesion of the electrolyte to a positive electrode interface. The bonding layer, in some examples, is stable at high voltages (e.g., stable against chemical reaction above 4.0 V, 4.1 V, 4.2 V, 4.3 V, 4.4 V, 4.5 V, or 4.6 V). Also set forth herein are electrochemical cell configurations wherein the bonding layer is physically separated from the lithium metal negative electrode by an oxide such as, but not limited to, a lithium-stuffed garnet, a lithium aluminum titanium phosphate, or a lithium germanium titanium phosphate. In some examples, these oxides are sintered, dense, pinhole, defect-free, or combinations thereof such that neither the solvent nor polymer included in the bonding agent layer directly contacts the lithium metal negative electrode. Also set forth herein are methods of making these bonding agent layers including, but not limited to, methods of preparing and depositing precursor solutions which form these bonding agent layers. Set forth herein, additionally, are methods of using these electrochemical cells. Also, set forth herein are free standing layers of a gel electrolyte which can be included in an electrochemical device or stack described herein as a bonding layer. Also, set forth, herein, is a phase-inversion gel electrolyte which is spin-coated, or otherwise coated to, laminated on, or in contact with the surface of the solid separator which can be included in an electrochemical device or stack.

II. Definitions

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the term, "Ra," is a measure of surface roughness wherein Ra is an arithmetic average of absolute values of sampled surface roughness amplitudes. Surface roughness measurements can be accomplished using, for example, a Keyence VK-X100 instrument that measures surface roughness using a laser. As used herein, the term, "Rt," is a measure of surface roughness wherein Rt is the maximum peak height of sampled surface roughness amplitudes. Disclosed herein are methods of modifying the surface roughness of an electrolyte, which methods include polishing, ablating, exposing to laser, exposing to plasma, exposing to ozone, exposing to a reducing atmosphere at elevate temperatures such as but not limited to 400° C., 500° C., 600° C., 700° C., 800° C., 900° C., 1000° C., 1100° C., 1200° C., 1300° C., or higher, or annealing the surface in order to achieve the desired surface roughness.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the phrases "electrochemical cell" or "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container.

As used herein the phrase "electrochemical stack," refers to one or more units which each include at least a negative electrode (e.g., Li, $LiC_6$), a positive electrode (e.g., Li-nickel-manganese-oxide or $FeF_3$, optionally a gel electrolyte), and a solid electrolyte (e.g., an electrolyte set forth herein). In some examples, between the solid electrolyte and the positive electrode, there is an additional layer comprising a gel electrolyte. An electrochemical stack may include one of these aforementioned units. An electrochemical stack may include several of these aforementioned units arranged in electrical communication (e.g., serial or parallel electrical connection). In some examples, when the electrochemical stack includes several units, the units are layered or laminated together in a column. In some examples, when the electrochemical stack includes several units, the units are layered or laminated together in an array. In some examples, when the electrochemical stack includes several units, the stacks are arranged such that one negative electrode is shared with two or more positive electrodes. Alternatively, in some examples, when the electrochemical stack includes several units, the stacks are arranged such that one positive electrode is shared with two or more negative electrodes. Unless specified otherwise, an electrochemical stack includes one positive electrolyte between the positive electrode and the solid electrolyte.

As used herein, the phrases "gel electrolyte," unless specified otherwise, refers to a suitable $Li^+$ ion conducting gel or liquid-based electrolyte, for example, those set forth in U.S. Pat. No. 5,296,318, entitled RECHARGEABLE LITHIUM INTERCALATION BATTERY WITH HYBRID POLYMERIC ELECTROLYTE, which is incorporated by reference in its entirety for all purposes. A gel electrolyte has lithium ion conductivity of greater than $10^{-5}$ S/cm at room temperature, a lithium transference number between 0.05-0.95, and a storage modulus greater than the loss modulus at some temperature. A gel may comprise a polymer matrix, a solvent that gels the polymer, and a lithium containing salt that is at least partly dissociated into $Li^+$ ions and anions. Herein, in some examples, the gel electrolyte is used as the bonding layer.

As used herein, the phrase "one stage gel electrolyte," refers to an electrolyte made using a single precursor solution which already includes an electrolyte solution and lithium salt and which is cast and allowed to evaporate the higher boiling point solvents.

As used herein, the phrase "two stage gel electrolyte," refers to an electrolyte made using a precursor solution which includes a polymer and a plasticizer. After casting this solution, in a first stage, the plasticizer is either leached out, using a solvent in second stage, or dried; the resulting porosity is refilled by soaking it in an electrolyte solution.

As used herein, the phrase "phase-inversion gel electrolyte", unless specified otherwise, refers to a suitable $Li^+$ ion conducting gel formed by a controlled polymer transformation from a liquid phase to solid phase. The phase inversion gel electrolyte includes a polymer with a solvent, and a second solvent which does not solvate the polymer, and a lithium salt, wherein the concentration of the polymer is 2-10% by volume, wherein the concentration of the lithium salt is 8-12% by volume, and where the composition includes at least 20-40% by porosity by volume. To make a phase-inversion gel electrolyte, the polymer in this case is dissolved in a solvent and non-solvent mixture. A lithium salt is then added. The evaporation of the solvent due to high volatility occurs or is induced, causing the composition to have a higher non-solvent concentration in the mixture. The polymer precipitates and forms a porous membrane, resulting in a phase-inversion gel electrolyte which includes the lithium salt.

As used herein, the phrase "spin-coated" or "spin-casted" refers to a process used to deposit a uniform thin film on a substrate. This can be accomplished by applying a small amount of viscous coating material to the substrate. The substrate is rotated during or after the application of the coating material to form a relatively uniform coating thickness.

As used herein, the phrase "non-solvent" refers to a liquid in which the polymer has little to no solubility. In some examples, the non-solvent is toluene when the polymer is PVDF-HFP. In other examples, the non-solvent is dibutyl phthalate (DBP), glycerol, or carbonate electrolyte solvents such as ethylene carbonate when the polymer is PVDF-HFP.

As used herein, the phrase "solvent" refers, unless specified otherwise, to a solvent which dissolves the polymer used in the gel electrolyte or phase inversion gel. In some examples, the solvent is tetrahydrofuran when the polymer is PVDF-HFP. In other examples, the solvent is dimethylformamide (DMF) or N-methyl-pyrrolidone (e.g., N-methyl-2-pyrrolidone or NMP) when the polymer is PVDF-HFP.

As used herein, the terms "cathode" and "anode" refer to the electrodes of a battery. During a charge cycle in a Li-secondary battery, Li ions leave the cathode and move through an electrolyte, to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode. Unless otherwise specified, the cathode refers to the positive electrode. Unless otherwise specified, the anode refers to the negative electrode.

As used herein, the term "catholyte," refers to a Li ion conductor that is intimately mixed with, or that surrounds, or that contacts the positive electrode active materials and provides an ionic pathway for $Li^+$ to and from the active materials. Catholytes suitable with the embodiments described herein include, but are not limited to, catholytes having the common name Li-stuffed garnets, LPS, LXPS, LATS, or LXPSO, where X is Si, Ge, Sn, As, Al, or also combinations thereof, and the like. Catholytes may also be liquid, gel, semi-liquid, semi-solid, polymer, and/or solid polymer ion conductors known in the art or described herein. Catholytes include those catholytes set forth in US Patent Application Publication No. 2015-0171465, which published on Jun. 18, 2015, entitled SOLID STATE CATHOLYTE OR ELECTROLYTE FOR BATTERY USING LiAMPBSc (M=Si, Ge, AND/OR Sn), filed May 15, 2014, and which is now U.S. Pat. No. 9,172,114, the contents of which are incorporated by reference in their entirety. Catholytes are also found in U.S. Pat. Nos. 9,553,332 and 9,634,354, the contents of which are incorporated by reference in their entirety. Catholytes include those catholytes set forth in US Patent Application Publication No. 2015/0099190, published on Apr. 9, 2015, entitled GARNET MATERIALS FOR LI SECONDARY BATTERIES AND METHODS OF MAKING AND USING GARNET MATERIALS, and filed Oct. 7, 2014, the contents of which are incorporated by reference in their entirety. In some examples, the gel electrolyte (e.g.,) referred to herein is an 80:20 to 50:50 vol. % PVDF-HFP to EC:EMC. Herein, PVDF is polyvinylidene fluoride; HFP is hexafluorophosphate; EC is ethylene carbonate; and EMC is ethyl methyl carbonate.

As used herein, the term "electrolyte," refers to a material that allows ions, e.g., $Li^+$, to migrate therethrough but which does not allow electrons to conduct therethrough. Electrolytes are useful for electrically isolating the cathode and anodes of a rechargeable (i.e., secondary) battery while allowing ions, e.g., $Li^+$, to transmit through the electrolyte.

As used herein, the phrase "$d_{50}$ diameter" or "median diameter ($d_{50}$)" refers to the median size, in a distribution of sizes, measured by microscopy techniques or other particle size analysis techniques, such as, but not limited to, scanning electron microscopy or dynamic light scattering. $D_{50}$ describes a characteristic dimension of particles at which 50% of the particles are smaller than the recited size. As used herein "diameter ($d_{90}$)" refers to the size, in a distribution of sizes, measured by microscopy techniques or other particle size analysis techniques, including, but not limited to, scanning electron microscopy or dynamic light scattering. $D_{90}$ includes the characteristic dimension at which 90% of the particles are smaller than the recited size. As used herein "diameter ($d_{10}$)" refers to the size, in a distribution of sizes, measured by microscopy techniques or other particle size analysis techniques, including, but not limited to, scanning electron microscopy or dynamic light scattering. $D_{10}$ includes the characteristic dimension at which 10% of the particles are smaller than the recited size.

As used herein, the term "rational number" refers to any number which can be expressed as the quotient or fraction (e.g., p/q) of two integers (e.g., p and q), with the denominator (e.g., q) not equal to zero. Example rational numbers include, but are not limited to, 1, 1.1, 1.52, 2, 2.5, 3, 3.12, and 7.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12} \cdot 0.35Al_2O_3$).

As used herein, a "thickness" by which is film is characterized refers to the distance, or median measured distance, between the top and bottom faces of a film. As used herein, the top and bottom faces refer to the sides of the film having the largest surface area.

As used herein, the phrase "density as determined by geometric measurements," refers to measurements of density obtained by physical mass and volume measurements. Density is determined by the ratio of measured mass to the measured volume. Customary techniques including the Archimedes method may be employed for such determinations. Unless stated otherwise, the density as determined by geometric measurements is the Archimedes method.

As used herein, the phrase "density as measured by the Archimedes method," refers to a density inclusive of closed porosity but exclusive of open porosity. The dimensions of a dry part are measured and the volume is calculated and recorded as Va.; the mass of the dry part is measured and recorded as ma. Vacuum infiltration of the part with a solvent such as toluene or IPA is then conducted by, for example, pulling a vacuum on the parts for at least one hour to a pressure less than −20inHg and then submerge the parts in solvent, infiltrate for at least 30 minutes. Next, the vacuum is released, keeping parts submerged in solvent. Then, the surface liquid is wiped off of the part, and record the mass mw of the part when wet. Finally, recording the mass ms of the part when submerged in the cup is performed. The Archimedes bulk density is calculated as $m_d/(m_w-m_s)\rho_s$, where $\rho_s$ is the solvent density, and the open porosity is $(m_w-m_d)/(m_w-m_s)$.

As used herein, the phrase "density as determined by scanning electron microscopy (SEM)," refers to the analysis of scanning electron microscopy (SEM) images. This analysis includes measuring the relative amounts of the electrolyte separator which are porous or vacant with respect to the electrolyte separator which is fully dense. The SEM images useful for this analysis include those obtained by SEM cross-sectional analysis using focused ion beam (FIB) milling.

As used herein, the phrase "porosity as determined by SEM," refers to measurement of density by using an image analysis software. First, a user or software assigns pixels and/or regions of an image as porosity. Second, the area fraction of those regions is summed. Finally, the porosity fraction determined by SEM is equal to the area fraction of the porous region of the image. Herein, porosity by volume is determined by SEM as set forth in this paragraph unless stated otherwise to the contrary.

As used herein, the term "laminating" refers to the process of sequentially depositing a layer of one precursor species, e.g., a lithium precursor species, onto a deposition substrate and then subsequently depositing an additional layer onto an already deposited layer using a second precursor species, e.g., a transition metal precursor species. This laminating process can be repeated to build up several layers of deposited vapor, liquid, or semi-solid phases. As used herein, the term "laminating" also refers to the process whereby a layer comprising an electrode, e.g., positive electrode or cathode active material comprising layer, is contacted to a layer comprising another material, e.g., garnet electrolyte. The laminating process may include a reaction or use of a binder which adheres of physically maintains direct contact between the layers which are laminated.

As used herein, the term "electrolyte," refers to an ionically conductive and electrically insulating material. Electrolytes are useful for electrically insulating the positive and negative electrodes of a secondary battery while allowing for the conduction of ions, e.g., $Li^+$, through the electrolyte. In some of the electrochemical devices described herein, the electrolyte includes a solid film, pellet, or monolith of a $Li^+$ conducting oxide, such as a lithium-stuffed garnet. In some examples, the electrolyte further includes a gel electrolyte which is laminated to or directly contacting the solid film, pellet, or monolith.

As used herein, the phrase "antiperovskite" refers to the family of materials with an antiperovskite crystal structure and the composition $Li_aO_bX_cH_dM_e$ where X is selected from Cl, Br, I, and F and mixtures thereof, and M is selected from Al, Ge, and Ga. In the formula $Li_aO_bX_cH_dM_e$, the subscripts are chosen such that $2<a<4$, $0.7<b<1.3$, $0.7<c<1.3$, $0 \leq d<1$, $0 \leq e<1$.

As used herein, the phrase "lithium stuffed garnet" refers to oxides that are characterized by a crystal structure related to a garnet crystal structure. Electrolytes include those electrolytes set forth in US Patent Application Publication No. 2015-0171465, which published on Jun. 18, 2015, entitled SOLID STATE CATHOLYTE OR ELECTROLYTE FOR BATTERY USING $Li_AMP_BS_C$ (M=Si, Ge, AND/OR Sn), filed May 15, 2014, and which is now U.S. Pat. No. 9,172,114, the contents of which are incorporated by reference in their entirety. Electrolytes are also found in U.S. Pat. Nos. 9,553,332 and 9,634,354, the contents of which are incorporated by reference in their entirety. Electrolytes include those electrolytes set forth in US Patent Application Publication No. 2015/0099190, published on Apr. 9, 2015, entitled GARNET MATERIALS FOR LI SECONDARY BATTERIES AND METHODS OF MAKING AND USING GARNET MATERIALS, and filed Oct. 7, 2014, the contents of which are incorporated by reference in their entirety. This application describes Li-stuffed garnet solid-state electrolytes used in solid-state lithium rechargeable batteries. These Li-stuffed garnets generally having a composition according to $Li_ALa_BM'_CM''_DZr_EO_F$, $Li_ALa_BM'_CM''_DTa_EO_F$, or $Li_ALa_BM'_CM''_DNb_EO_F$, wherein $4<A<8.5$, $1.5<B<4$, $0 \leq C \leq 2$, $0 \leq D \leq 2$; $0 \leq E \leq 2.3$, $10<F<13$, and M' and M" are each, independently in each instance selected from Al, Mo, W, Nb, Sb, Ca, Ba, Sr, Ce, Hf, Rb, or Ta, or $Li_aLa_bZr_cAl_dMe''_eO_f$, wherein $5<a<8.5$; $2<b<4$; $0<c<2.5$; $0 \leq d<2$; $0 \leq e<2$, and $10<f<13$ and Me" is a metal selected from Nb, Ta, V, W, Mo, or Sb and as otherwise described in U.S. Patent Application Publication No. U.S. 2015/0099190. In some examples, A may be about 6.0 or about 6.1 or about 6.2 or about 6.3 or about 6.4 or about 6.5 or about 6.6 or about 6.7 or about 6.8 or about 6.9 or about 7.0 or about 7.1 or about 7.2 or about 7.3 or about 7.4. In some examples, B may be about 2.8 or about 2.9 or about 3.0 or about 3.1 or about 3.2. In some examples, C may be about 0 or about 0.1 or about 0.2 or about 0.3 or about 0.4 or about 0.5 or about 0.6 or about 0.7 or about 0.8 or about 0.9 or about 1.0 or about 1.1 or about 1.2 or about 1.3 or about 1.4 or about 1.5 or about 1.6 or about 1.7 or about 1.8 or about 1.9 or about 2.0. In some examples D may be about 0 or about 0.1 or about 0.2 or about 0.3 or about 0.4 or about 0.5 or about 0.6 or about 0.7 or about 0.8 or about 0.9 or about 1.0 or about 1.1 or about 1.2 or about 1.3 or about 1.4 or about 1.5 or about 1.6 or about 1.7 or about 1.8 or about 1.9 or about 2.0. In some examples, E may be about 1.4 or about 1.5 or about 1.6 or about 1.7 or about 1.8 or about 1.9 or about 2.0 or about 2.1 or about 2.2. In some examples, F may be about 11.0 or about 11.1 or about 11.2 or about 11.3 or about 11.4 or about 11.5 or about 11.6 or about 11.7 or about 11.8 or about 11.9 or about 12.0 or about 12.1 or about 12.2 or about 12.3 or about 12.4 or about 12.5 or about 12.6 or about 12.7 or about 12.8 or about 12.9 or about 13.0. Herein, the subscript values and coefficient values are selected so the compound is charge neutral unless stated otherwise to the contrary. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (subscripts t1+t2+t3=subscript 2) so that the La:(Zr/Nb/Ta) ratio is 3:2. Also, garnets used herein include, but are not limited to, $Li_xLa_3Zr_2O_F+yAl_2O_3$, wherein x ranges from 5.5 to 9; and y ranges from 0 to 1. In these examples, subscripts x, y, and F are selected so that the garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_xLa_3Zr_2O_{12}+yAl_2O_3$. In one embodiment, the Li-stuffed garnet herein has a composition of $Li_7Li_3Zr_2O_{12}$. In another embodiment, the Li-stuffed garnet herein has a composition of $Li_7Li_3Zr_2O_{12}·Al_2O_3$. In yet another embodiment, the Li-stuffed garnet herein has a composition of $Li_7Li_3Zr_2O_{12}·0.22Al_2O_3$. In yet another embodiment, the Li-stuffed garnet herein has a composition of $Li_7Li_3Zr_2O_{12}·0.35Al_2O_3$. In certain other embodiments, the Li-stuffed garnet herein has a composition of $Li_7Li_3Zr_2O_{12}·0.5Al_2O_3$. In another embodiment, the Li-stuffed garnet herein has a composition of $Li_7Li_3Zr_2O_{12}·0.75Al_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrases "garnet precursor chemicals," "chemical precursor to a garnet-type electrolyte," "precursors to garnet" and "garnet precursor materials" refer to chemicals which react to form a lithium stuffed garnet material described herein. These chemical precursors include, but are not limited to lithium hydroxide (e.g., LiOH), lithium oxide (e.g., $Li_2O$), lithium carbonate (e.g., $LiCO_3$), zirconium oxide (e.g., $ZrO_2$), zirconium hydroxide, zirconium acetate, zirconium nitrate, zirconium acetylacetonate, zirconium nitrate x-hydrate, lanthanum oxide (e.g., $La_2O_3$), lanthanum hydroxide (e.g., $La(OH)_3$), lanthanum nitrate, lanthanum acetate, lanthanum acetylacetonate, aluminum oxide (e.g., $Al_2O_3$), aluminum hydroxide (e.g., $Al(OH)_3$), aluminum (e.g., Al), aluminum nitrate (e.g., $Al(NO_3)_3$), aluminum nitrate nonahydrate, boehmite, gibbsite, corundum, aluminum oxyhydroxide, niobium oxide (e.g., $Nb_2O_5$), gallium oxide ($Ga_2O_3$), and tantalum oxide (e.g., $Ta_2O_5$). Other precursors to garnet materials, known in the relevant field to which the instant disclosure relates, may be suitable for use with the methods set forth herein.

As used herein the phrase "garnet-type electrolyte," refers to an electrolyte that includes a lithium stuffed garnet material described herein as the $Li^+$ ion conductor.

As used herein, the phrase "doped with alumina" means that $Al_2O_3$ is used to replace certain components of another material, e.g., a garnet. A lithium stuffed garnet that is doped with $Al_2O_3$ refers to garnet wherein aluminum (Al) substitutes for an element in the lithium stuffed garnet chemical formula, which may be, for example, Li or Zr.

As used herein, the phrase "reaction vessel" refers to a container or receptacle into which precursor chemicals are placed in order to conduct a chemical reaction to produce a product, e.g., a lithium stuffed garnet material.

As used herein, the term "defect" refers to an imperfection or a deviation from a pristine structure such as, but not limited to, a pore, a crack, a separation, a chemical inhomogeneity, or a phase segregation of two or more materials in a solid material. A perfect crystal is an example of a material that lacks defects. A nearly 100% dense electrolyte that has a planar surface, with substantially no pitting, cracks, pores, or divots on the surface, is an example of an electrolyte that is substantially lacking defects. A surface of an electrolyte is substantially lacking defects if the defect density is less than 1 defect per 1 $mm^2$. An electrolyte's bulk is substantially lacking defects if the defect density is less than 1 defect per 1 $mm^3$.

As used herein the term "porous," refers to a material that includes pores, e.g., nanopores, mesopores, or micropores.

As used herein, "flatness" of a surface refers to the greatest normal distance between the lowest point on a surface and a plane containing the three highest points on the surface, or alternately, the greatest normal distance between the highest point on a surface and a plane containing the three lowest points on the surface. It may be measured with an AFM, a high precision optical microscope, or laser interferometry height mapping of a surface.

As used herein the phrase "free standing thin film," refers to a film that is not adhered or supported by an underlying substrate. In some examples, free standing thin film is a film that is self-supporting, which can be mechanically manipulated or moved without need of substrate adhered or fixed thereto. A free standing thin film can be laminated or bonded to a current collector or electrode, but such a free standing thin film is only free standing when not supported by an underlying substrate.

As used here, the phrase "inorganic solid state electrolyte," refers to a material not including carbon which conducts ions (e.g., $Li^+$) but does not conduct electrons. Example inorganic solid state electrolytes include oxide electrolytes and sulfide electrolytes, which are further described in the instant disclosure.

As used here, the phrase "directly contacts," refers to the juxtaposition of two materials such that the two materials contact each other sufficiently to conduct either an ion or electron current. As used herein, direct contact may also refer to two materials in contact with each other and which do not have any other different types of solid or liquid materials positioned between the two materials which are in direct contact.

As used here, the phrase "composite separator" or "composite electrolyte" refer to a composite of a polymer and a solid ion conductor. The solid ion conductor may include any of the ion conductors mentioned herein. The polymer may be an epoxy, a rubber, or any composition mentioned in US Patent Application Publication No. 2017-0005367 A1, entitled COMPOSITE ELECTROLYTES, which was filed as U.S. patent application Ser. No. 15/192,960, filed Jun. 24, 2016, on 16 which is incorporated herein by reference in its entirety for all purposes. Examples composite separators may be found in US Patent Application Publication No. 2017-0005367 A1, entitled COMPOSITE ELECTROLYTES, which was filed as U.S. patent application Ser. No. 15/192,960, filed Jun. 24, 2016. In some examples, the electrolytes herein may include, or be layered with, or be laminated to, or contact a sulfide electrolyte. As used here, the phrase "sulfide electrolyte," includes, but is not limited to, electrolytes referred to herein as LATS, LSS, LTS, LXPS, or LXPSO, where X is Si, Ge, Sn, As, Al. In these acronyms (LSS, LTS, LXPS, or LXPSO), S refers to the element S, Si, or combinations thereof, and T refers to the element Sn. "Sulfide electrolyte" may also include $Li_aP_bS_cX_d$, $Li_aB_b$-$S_cX_d$, $Li_aSn_bS_cX_d$ or $Li_aSi_bS_cX_d$ where X=F, Cl, Br, I, and 10%≤a≤50%, 10%≤b≤44%, 24%≤c≤70%, 0≤d≤18%. Sulfide electrolytes may contain less than 5% or less than 10% oxygen.

In some examples, the sulfide electrolyte layer is a material containing Si, Li, O, P, and S and is referred to herein as a SLOPS material. In some examples, the electrolyte layer is a material containing Si, Li, O, P, and S and is referred to herein as a SLOPS/LSS material. As used herein, LSS includes, unless otherwise specified, a 60:40 molar ratio $Li_2S:SiS_2$.

As used herein, "SLOPS" includes, unless otherwise specified, a 60:40 molar ratio of $Li_2S:SiS_2$ with 0.1-10 mol. % $Li_3PO_4$. In some examples, "SLOPS" includes $Li_{10}Si_4S_{13}$ (50:50 $Li_2S:SiS_2$) with 0.1-10 mol. % $Li_3PO_4$. In some examples, "SLOPS" includes $Li_{26}Si_7S_{27}$ (65:35 $Li_2S:SiS_2$) with 0.1-10 mol. % $Li_3PO_4$. In some examples, "SLOPS" includes $Li_4SiS_4$ (67:33 $Li_2S:SiS_2$) with 0.1-5 mol. % $Li_3PO_4$. In some examples, "SLOPS" includes $Li_{14}Si_3S_{13}$ (70:30 $Li_2S:SiS_2$) with 0.1-5 mol. % $Li_3PO_4$. In some examples, "SLOPS" is characterized by the formula (1−x)(60:40 $Li_2S:SiS_2$)*(x)($Li_3PO_4$), wherein x is from 0.01 to 0.99. As used herein, "LBS-PDX" refers to an electrolyte composition of $Li_2S:B_2S_3:Li_3PO_4$:LiX where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used here, "LSS" refers to lithium silicon sulfide which can be described as $Li_2S$-$SiS_2$, Li-$SiS_2$, Li—S—Si, and/or a catholyte consisting essentially of Li, S, and Si. LSS refers to an electrolyte material characterized by the formula $Li_xSi_yS_z$ where 0.33≤x≤0.5, 0.1≤y≤0.2, 0.4≤z≤0.55, and it may include up to 10 atomic % oxygen. LSS also refers to an electrolyte material comprising Li, Si, and S. In some examples, LSS is a mixture of $Li_2S$ and $SiS_2$. In some examples, the ratio of $Li_2S:SiS_2$ is about 90:10, about 85:15, about 80:20, about 75:25, about 70:30, about 2:1, about 65:35, about 60:40, about 55:45, or about 50:50 molar ratio. LSS may be doped with compounds such as $Li_xPO_y$, $Li_x$-$BO_y$, $Li_4SiO_4$, $Li_3MO_4$, $Li_3MO_3$, $PS_x$, and/or lithium halides such as, but not limited to, LiI, LiCl, LiF, or LiBr, wherein 0<x≤5 and 0<y≤5. LSS electrolytes may contain less than 5% or less than 10% oxygen.

As used here, "LTS" refers to a lithium tin sulfide compound which can be described as $Li_2S:SnS_2:As_2S_5$, $Li_2S$-$SnS_2$, $Li_2S$—SnS, Li—S—Sn, and/or a catholyte consisting essentially of Li, S, and Sn. The composition may be $Li_xSn_yS_z$ where 0.25≤x≤0.65, 0.05≤y≤0.2, and 0.25≤z≤0.65. In some examples, LTS is a mixture of $Li_2S$ and $SnS_2$ in the ratio of about 80:20, about 75:25, about 70:30, about 2:1, or about 1:1 molar ratio. LTS may include up to 10 atomic % oxygen. LTS may be doped with Bi, Sb, As, P, B, Al, Ge, Ga, and/or In and/or lithium halides such as, but not limited to, LiI, LiCl, LiF, or LiBr, As used herein, "LATS" refers to LTS, as used above, and further comprising Arsenic (As). LTS and LATS electrolytes may contain less than 5% or less than 10% oxygen.

As used here, "LXPS" refers to a material characterized by the formula $Li_aMP_bS_c$, where M is Si, Ge, Sn, and/or Al, and where 2≤a≤8, 0.5≤b≤2.5, 4≤c≤12. "LSPS" refers to an electrolyte material characterized by the formula $L_aSiP_bS_c$, where 2≤a≤8, 0.5≤b≤2.5, 4≤c≤12. LSPS refers to an electrolyte material characterized by the formula $L_aSiP_bS_c$, wherein, where 2≤a≤8, 0.5≤b≤4≤c≤12, d<3. In these examples, the subscripts are selected so that the compound is neutrally charged. Exemplary LXPS materials are found, for example, in International Patent Application Publication No. PCT/US2014/038283, filed May 16, 2014 as PCT/US2014/038283, and titled SOLID STATE CATHOLYTE OR ELECTROLYTE FOR BATTERY USING $LI_4MP_bS_C$ (M=Si, Ge, AND/OR Sn), which is incorporated by reference herein in its entirety. Exemplary LXPS materials are found, for example, in U.S. Pat. Nos. 9,172,114; 9,553,332; and 9,634,354, the contents of which are incorporated by reference in their entirety When M is Sn and Si—both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %. "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO," refers to a catholyte material characterized by the formula $Li_aMP_bS_cO_d$, where M is Si, Ge, Sn, and/or Al, and where 2≤a≤8, 0.5≤b≤2.5, 4≤c≤12, d<3. LXPSO refers to LXPS, as defined above, and having oxygen doping at from 0.1 to about 10 atomic %. LPSO refers to LPS, as defined above, and having oxygen doping at from 0.1 to about 10 atomic %.

As used here, "LPS," refers to an electrolyte having Li, P, and S chemical constituents. As used herein, "LPSO," refers to LPS that is doped with or has 0 present. In some examples, "LPSO," is a LPS material with an oxygen content between 0.01 and 10 atomic %. LPS refers to an electrolyte material that can be characterized by the formula $Li_xP_yS_z$ where 0.33≤x≤0.67, 0.07≤y≤0.2 and 0.4≤z≤0.55. LPS also refers to an electrolyte characterized by a product formed from a mixture of $Li_2S:P_2S_5$ wherein the molar ratio is about 10:1, about 9:1, about 8:1, about 7:1, about 6:1 about 5:1, about 4:1, about 3:1, about 7:3, about 2:1, or about 1:1. LPS also refers to an electrolyte characterized by a product formed from a mixture of Li$_2$S:P$_2$S$_5$ wherein the reactant or precursor amount of Li$_2$S is 95 atomic % and P$_2$S$_5$ is 5 atomic %. LPS also refers to an electrolyte characterized by a product formed from a mixture of Li$_2$S:P$_2$S$_5$ wherein the reactant or precursor amount of Li$_2$S is 90 atomic % and P$_2$S$_5$ is 10 atomic %. LPS also refers to an electrolyte characterized by a product formed from a mixture of Li$_2$S:P$_2$S$_5$ wherein the reactant or precursor amount of Li$_2$S is 85 atomic % and P$_2$S$_5$ is 15 atomic %. LPS also refers to an electrolyte characterized by a product formed from a mixture of Li$_2$S:P$_2$S$_5$ wherein the reactant or precursor amount of Li$_2$S is 80 atomic % and P$_2$S$_5$ is 20 atomic %. LPS also refers to an electrolyte characterized by a product formed from a mixture of Li$_2$S:P$_2$S$_5$ wherein the reactant or precursor amount of Li$_2$S is 75 atomic % and P$_2$S$_5$ is 25 atomic %. LPS also refers to an electrolyte characterized by a product formed from a mixture of Li$_2$S:P$_2$S$_5$ wherein the reactant or precursor amount of Li$_2$S is 70 atomic % and P$_2$S$_5$ is 30 atomic %. LPS also refers to an electrolyte characterized by a product formed from a mixture of Li$_2$S:P$_2$S$_5$ wherein the reactant or precursor amount of Li$_2$S is 65 atomic % and P$_2$S$_5$ is 35 atomic %. LPS also refers to an electrolyte characterized by a product formed from a mixture of Li$_2$S:P$_2$S$_5$ wherein the reactant or precursor amount of Li$_2$S is 60 atomic % and P$_2$S$_5$ is 40 atomic %. LPS may also be doped with a lithium halide such as LiF, LiCl, LiBr, or LiI at a 0-40% molar content.

As used here, "LPSI" refers to an electrolyte material characterized by the formula Li$_a$P$_b$S$_c$I$_d$, wherein subscripts a, b, c, and d are selected so that the material is charge neutral, such as that described in International Patent Application No. PCT/US2016/064492, filed Dec. 1, 2016, which is incorporated herein by reference in its entirety for all purposes; also U.S. patent application Ser. No. 15/367,103, filed Dec. 1, 2016, which is incorporated herein by reference in its entirety for all purposes.

As used here, "LBS" refers to an electrolyte material characterized by the formula Li$_a$B$_b$S$_c$ and may include oxygen and/or a lithium halide (LiF, LiCl, LiBr, LiI) at 0-40 mol %. LBS electrolytes may contain less than 5% or less than 10% oxygen.

As used here, "LPSO" refers to an electrolyte material characterized by the formula Li$_x$P$_y$S$_z$O$_w$ where 0.33≤x≤0.67, 0.07≤y≤0.2, 0.4≤z≤0.55, 0≤w≤0.15. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used herein, "LBHI" or "borohydride electrolyte" refers to an electrolyte material with the formula Li$_a$B$_d$H$_c$I$_d$N$_c$, wherein subscripts a, b, c, and d are selected so that the compound is charge neutral, such as that described in U.S. Provisional Patent Application No. 62/411,464, entitled SEPARATORS INCLUDING LITHIUM BOROHYDRIDE AND COMPOSITE SEPARATORS OF LITHIUM-STUFFED GARNET AND LITHIUM BOROHYDRIDE which is incorporated herein by reference.

As used herein, the phrase "wherein the electrolyte separator protects the Li metal negative electrode from exposure to the polymer or to the solvent," refers to the barrier that the separator provides and which prevents polymer or solvent from contacting the Li metal such that the polymer or solvent can chemically react with the Li metal. In some example, the barrier is the seal that the electrolyte separator makes with the Li metal anode.

As used herein, the phrase "wherein the bonding layer lowers the interfacial impedance between the electrolyte separator and the positive electrode than it otherwise would be in the absence of the bonding layer," refers to the observation that when a conventional cathode is pressed onto a garnet surface the total measured cell impedance is very high, whereas when a bonding layer as set forth herein is present and in contact with the cathode, the impedance is reduced. In some examples, the bonding layer lowers the interfacial impedance at the interface between the electrolyte membrane and the positive electrode by a factor of 1, 2, 10, 100, or 1000× with respect to the interfacial impedance at the interface between the electrolyte membrane and the positive electrode when a bonding layer is not positioned between, the electrolyte membrane and the positive electrode.

III. Compositions

In some examples, set forth herein is a free standing film, as defined above, which further includes a gel electrolyte, wherein the gel electrolyte comprises a lithium salt, a polymer, and a solvent.

In some examples, the gel electrolyte includes a lithium salt, a polymer, and a solvent. In some examples, the polymer is selected from the group consisting of polyacrylonitrile (PAN), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxy)ethyl glycidyl ether (PEO-MEEGE), polyethylene oxide 2-methoxyethoxy)ethyl glycidyl poly (allyl glycidyl ether) (PEO-MEEGE-AGE), polysiloxane, polyvinylidene fluoride (PVDF), polyvinylidene fluoride hexafluoropropylene (PVDF-HFP), and rubbers such as ethylene propylene (EPR), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), polyvinylidene fluoride (PVDF), or polyethylene (e.g., low density linear polyethylene).

In certain examples, the polymer in the gel electrolyte is polyacrylonitrile (PAN) or polyvinylidene fluoride hexafluoropropylene (PVDF-HFP). In certain examples, the polymer in the gel electrolyte is a combination of polyacrylonitrile (PAN) and polyvinylidene fluoride hexafluoropropylene (PVDF-HFP). In certain examples, the polymer in the gel electrolyte is PAN, PVDF-HFP, PVDF-HFP and PAN, PMMA, PVC, PVP, PEO, or combinations thereof. In certain examples, the polymer in the gel electrolyte is PAN. In certain examples, the polymer in the gel electrolyte is PVDF-HFP. In certain examples, the polymer in the gel electrolyte is PVDF-HFP. In certain examples, the polymer in the gel electrolyte is PMMA. In certain examples, the polymer in the gel electrolyte is PVC. In certain examples, the polymer in the gel electrolyte is PVP. In certain examples, the polymer in the gel electrolyte is PEO. In certain examples, the lithium salt in the gel electrolyte is a lithium salt is selected from LiPF$_6$, Lithium bis(oxalato) borate (LiBOB), Lithium bis(perfluoroethanesulfonyl)imide (LIBETI), LiTFSi, LiBF$_4$, LiClO$_4$, LiAsF$_6$, LiFSI, LiAsF$_6$, or LiI. In certain examples, the lithium salt in the gel electrolyte is $LiPF_6$. In certain examples, the lithium salt in the gel electrolyte is LiBOB. In certain examples, the lithium salt in the gel electrolyte is LiTFSi. In certain examples, the lithium salt in the gel electrolyte is $LiBF_4$. In certain examples, the lithium salt in the gel electrolyte is $LiClO_4$. In certain examples, the lithium salt in the gel electrolyte is $LiAsF_6$. In certain examples, the lithium salt in the gel electrolyte is LiI. In certain examples, the lithium salt in the gel electrolyte is $LiBF_6$. In certain examples, several lithium salts may be present simultaneously in different concentrations. In some examples, the concentration is about 0.5, about 0.6, about 0.7, about 0.8, about 0.9, about 1.0, about 1.1, about 1.2, about 1.3, about 1.4, about 1.5, about 1.6, about 1.7, about 1.8, about 1.9 or about 2.0M. In certain examples, the gel electrolyte may contain two salts selected from $LiPF_6$, LiBOB, LiTFSi, $LiBF_4$, $LiClO_4$, $LiAsF_6$, LiFSI, $LiAsF_6$, or LiI. In certain examples, the gel electrolyte may contain three salts selected from $LiPF_6$, LiBOB, LiTFSi, $LiBF_4$, $LiClO_4$, $LiAsF_6$, LiFSI, $LiAsF_6$, or LiI.

In certain examples, the lithium salt in the gel electrolyte is a lithium salt is selected from $LiPF_6$, LiBOB, and LFTSi.

In certain examples, the lithium salt in the gel electrolyte is $LiPF_6$ at a concentration of 0.5 M to 2M. In some examples, the concentration is 0.5, 0.6, 0.7, 0.8, 0.9, 1.0, 1.1, 1.2, 1.3, 1.4, 1.5, 1.6, 1.7, 1.8, 1.9 or 2.0M.

In certain examples, the lithium salt in the gel electrolyte is LiTFSI at a concentration of 0.5 M to 2M. In some examples, the concentration is 0.5, 0.6, 0.7, 0.8, 0.9, 1.0, 1.1, 1.2, 1.3, 1.4, 1.5, 1.6, 1.7, 1.8, 1.9 or 2.0M In certain examples, the lithium salt in the gel electrolyte is present at a concentration from 0.01 M to 10 M. In some examples, the concentration is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.3, 3.2, 3.3, 3.4, 3.5, 3.6, 3.7, 3.8, 3.9, 2.0, 0.3, 0.2, 0.3, 0.4, 0.5, 0.6, 0.7, 0.8, 0.9, 3.0, 3.1, 3.2, 3.3, 3.4, 3.5, 3.6, 3.7, 3.8, 3.9, 4.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.8, 8.4, 8.5, 8.6, 8.7, 8.8, 8.9, 9.9, 9.1, 9.2, 9.3, 9.4, 9.5, 9.6, 9.7, 9.8, 9.9, 10.0 M.

In certain examples, the solvent in the gel is selected from ethylene carbonate (EC), diethylene carbonate, diethyl carbonate, dimethyl carbonate (DMC), ethyl-methyl carbonate (EMC), propylmethyl carbonate, nitroethyl carbonate, propylene carbonate (PC), diethyl carbonate (DEC), methyl propyl carbonate (MPC), 2,5-Dioxahexanedioic Acid Dimethyl Ester, tetrahydrofuran (THF), y-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-Tetrafluoro-3-(1,1,2,2-tetrafluoroethoxy) propane (F-EPE), fluorinated cyclic carbonate (F-AEC), dioxolane, prop-1-ene-1,3-sultone (PES), sulfolane, acetonitrile (ACN), succinonitrile (SN), Pimelonitrile, Suberonitrile, propionitrile, Propanedinitrile, glutaronitrile (GLN), adiponitrile (ADN), hexanedinitrile, pentanedinitrile, acetophenone, isophorone, benzonitrile, Methylene methanedisulfonate, dimethyl sulfate, dimethyl sulfoxide (DMSO), ethyl acetate, methyl butyrate, dimethyl ether (DME), diethyl ether, dioxolane, gamma butyl-lactone, Methyl benzoate, 2-methyl-5-oxooxolane-2-carbonitrile, or combinations thereof.

In certain examples, the solvent is selected from methylene carbonate (EC). In certain examples, the solvent is a mixture of EC with sulfolane, EC with EMC, EC with PC, EC with DMC, EC with MPC, EC with DEC, EC with GBL, or EC with PES. The mixture ratio of EC to the other component may be about 8:2, about 7:3, about 6:4, about 5:5, about 4:6, about 3:7, or about 2:8.

In certain examples, the solvent is selected from diethylene carbonate.

In certain examples, the solvent is selected from diethyl carbonate. In certain examples, the solvent is selected from dimethyl carbonate (DMC).

In certain examples, the solvent is selected from ethylmethyl carbonate (EMC).

In certain examples, the solvent is selected from tetrahydrofuran (THF), y-Butyrolactone (GBL).

In certain examples, the solvent is selected from fluoroethylene carbonate (FEC).

In certain examples, the solvent is selected from fluoromethyl ethylene carbonate (FMEC).

In certain examples, the solvent is selected from trifluoroethyl methyl carbonate (F-EMC).

In certain examples, the solvent is selected from fluorinated 3-(1,1,2,2-tetrafluoroethoxy)-1,1,2,2-tetrafluoropropane(F-EPE). F-EPE may be referred to as 1,1,2,2-Tetrafluoro-3-(1,1,2,2-tetrafluoroethoxy)propane.

In certain examples, the solvent is selected from fluorinated cyclic carbonate (F-AEC).

In certain examples, the solvent is selected from propylene carbonate (PC).

In certain examples, the solvent is selected from dioxolane.

In certain examples, the solvent is selected from acetonitrile (ACN).

In certain examples, the solvent is selected from succinonitrile (SN). In certain examples, the solvent is SN mixed with GLN, SN mixed with acetonitrile, SN mixed with butyronitrile, SN mixed with Hexanenitrile, SN mixed with Benzonitrile, SN mixed with PES, or SN mixed with GBL. The mixture ratio of SN to the other component may be about 8:2, about 7:3, about 6:4, about 5:5, about 4:6, about 3:7, or about 2:8.

In certain examples, the solvent is selected from adiponitrile.

In certain examples, the solvent is selected from hexanedinitrile.

In certain examples, the solvent is selected from pentanedinitrile.

In certain examples, the solvent is selected from acetophenone.

In certain examples, the solvent is selected from isophorone.

In certain examples, the solvent is selected from benzonitrile.

In certain examples, the solvent is selected from dimethyl sulfate.

In certain examples, the solvent is selected from dimethyl sulfoxide (DMSO).

In certain examples, the solvent is selected from ethylmethyl carbonate.

In certain examples, the solvent is selected from ethyl acetate.

In certain examples, the solvent is selected from methyl butyrate

In certain examples, the solvent is selected from dimethyl ether (DME).

In certain examples, the solvent is selected from diethyl ether.

In certain examples, the solvent is selected from propylene carbonate.

In certain examples, the solvent is selected from dioxolane.

In certain examples, the solvent is selected from glutaronitrile.

In certain examples, the solvent is selected from gamma butyl-lactone.

In certain examples, the solvent is a 1:1 w/w mixture of EC:PC.

In certain examples, the solvent is PES.

In certain examples, the solvent is present in the bonding layer (e.g., the gel electrolyte which is the bonding layer) as a residual amount. In some examples, the residual amount is the amount of solvent remaining after the bonding layer is dried. In some examples, the residual amount is the amount of solvent remaining after the bonding layer is dried after the bonding layer is made. In some examples, the residual amount is the amount of solvent remaining after the bonding layer is spin-coated onto a substrate and dried. In some examples, the residual amount is the minimum amount of solvent required to solvate the lithium salt. For example, in certain examples, the lithium salt in the gel electrolyte is $LiPF_6$ at a concentration of 0.5 M to 2M. To prepare this gel electrolyte, a solvent such as a combination of EC:DMC in a 1:1 v/v ratio may be used. In this solvent, $LiPF_6$ is dissolved at a concentration of 0.5 M to 2M. Next, the bonding layer is deposited onto a substrate or onto a solid state electrolyte and allowed to dry. Once the evaporation of solvent is no longer appreciable at room temperature, the amount of solvent remaining in the gel is considered the residual amount.

In some examples, the gel may further include additives for the purpose of mitigating gas production during cycling or storage, for improving voltage or thermal stability, or for passivating active materials, current collectors, or other components. Additives are known in the art. Some examples may include vinylene carbonate (VC), methylene methane disulfonate (MMDS), tris(trimethylsilyl) phosphate, fluoroethylene carbonate (FEC), bis(2,2,2-trifluoroethyl) carbonate (TFEC) and/or other compounds known in the art.

In some examples, the gel may further include structural reinforcements such as fibers or particles of a higher modulus material. The higher modulus material may be a ceramic such as $Al_2O_3$, MgO, $SiO_2$, $SiN_x$, wherein x is selected so that the compound is charge neutral, and the like.

In some examples, the water content in the solvents is less than 200 ppm, or less than 150 ppm, or less than 100 ppm, or less than 60 ppm, or less than 50 ppm, or less than 40 ppm, or less than 30 ppm, or less than 20 ppm, or less than 10 ppm.

In yet other examples, the film lowers the interfacial impedance between an electrolyte separator and a positive electrode, when positioned between and directly in contact with an electrolyte separator and a positive electrode.

In some examples, the gel electrolyte is prepared by mixing the components of the gel electrolyte together and spin-casting the mixture onto a substrate. In some examples, the spin-casting is used to prepare a thin film of gel electrolyte. In some examples, the thin film of gel electrolyte is prepared by spin-casting the electrolyte solution at 1000-3000 RPMs. In some examples, the gel is drop-cast onto the substrate. In some examples, the gel is slot-die cast or doctor-bladed onto a substrate. The substrate may be a sacrificial substrate, the separator electrolyte, or the cathode. As used herein, the gel may include a one-stage gel. As used herein, the gel may include a two-stage gel.

IV. Electrochemical Cells

In some examples, set forth herein is an electrochemical stack, including a lithium metal (Li) negative electrode, a positive electrode, and an electrolyte separator in direct contact with the Li metal negative electrode, and a gel electrolyte (also referred to as a bonding layer) comprising a lithium salt, a polymer, and a solvent; wherein the bonding layer directly contacts, and is positioned between, the electrolyte separator and the positive electrode; and wherein the electrolyte separator protects the Li metal negative electrode from exposure to the polymer or to the solvent in the bonding layer.

In some examples, in a fully charged state, the Li negative electrode includes a layer of Li metal having a thickness from 1 nm to 50 µm. In some examples, the Li metal has a thickness from 10 µm to 50 µm. In some examples, the Li metal has a thickness from 25 µm to 50 µm.

In some examples, in a fully discharged state, the Li negative electrode includes a layer of Li metal having a thickness of about 1 nm. In some examples, the Li negative electrode includes a layer of Li metal having a thickness of about 2 nm. In some examples, the Li negative electrode includes a layer of Li metal having a thickness of about 3 nm. In some examples, the Li negative electrode includes a layer of Li metal having a thickness of about 4 nm. In some examples, the Li negative electrode includes a layer of Li metal having a thickness of about 5 nm. In some examples, the Li negative electrode includes a layer of Li metal having a thickness of about 6 nm. In some examples, the Li negative electrode includes a layer of Li metal having a thickness of about 7 nm. In some examples, the Li negative electrode includes a layer of Li metal having a thickness of about 8 nm. In some examples, the Li negative electrode includes a layer of Li metal having a thickness of about 9 nm. In some examples, the Li negative electrode includes a layer of Li metal having a thickness of about 10 nm. In some examples, the Li negative electrode includes a layer of Li metal having a thickness of about 11 nm. In some examples, the Li negative electrode includes a layer of Li metal having a thickness of about 12 nm. In some examples, the Li negative electrode includes a layer of Li metal having a thickness of about 13 nm. In some examples, the Li negative electrode includes a layer of Li metal having a thickness of about 14 nm. In some examples, the Li negative electrode includes a layer of Li metal having a thickness of about 15 nm. In some examples, the Li negative electrode includes a layer of Li metal having a thickness of about 16 nm. In some examples, the Li negative electrode includes a layer of Li metal having a thickness of about 17 nm. In some examples, the Li negative electrode includes a layer of Li metal having a thickness of about 18 nm. In some examples, the Li negative electrode includes a layer of Li metal having a thickness of about 19 nm. In some examples, the Li negative electrode includes a layer of Li metal having a thickness of about 20 nm. In some examples, the Li negative electrode includes a layer of Li metal having a thickness of about 21 nm. In some examples, the Li negative electrode includes a layer of Li metal having a thickness of about 22 nm. In some examples, the Li negative electrode includes a layer of Li metal having a thickness of about 23 nm. In some examples, the Li negative electrode includes a layer of Li metal having a thickness of about 24 nm. In some examples, the Li negative electrode includes a layer of Li metal having a thickness of about 25 nm. In some examples, the Li negative electrode includes a layer of Li metal having a thickness of about 26 nm. In some examples, the Li negative electrode includes a layer of Li metal having a thickness of about 27 nm. In some examples, the Li negative electrode includes a layer of Li metal having a thickness of about 28 nm. In some examples, the Li negative electrode includes a layer of Li metal having a thickness of about 29 nm. In some examples, the Li negative electrode includes a layer of Li metal having a thickness of about 30 nm. In some examples, the Li negative electrode includes a layer of Li metal having a thickness of about 41 nm. In some examples, the Li negative electrode includes a layer of Li metal having a thickness of about 42 nm. In some examples, the Li negative electrode includes a layer of Li metal having a thickness of about 43 nm. In some examples, the Li negative electrode includes a layer of Li metal having a thickness of about 44 nm. In some examples, the Li negative electrode includes a layer of Li metal having a thickness of about 45 nm. In some examples, the Li negative electrode includes a layer of Li metal having a thickness of about 46 nm. In some examples, the Li negative electrode includes a layer of Li metal having a thickness of about 47 nm. In some examples, the Li negative electrode includes a layer of Li metal having a thickness of about 48 nm. In some examples, the Li negative electrode includes a layer of Li metal having a thickness of about 49 nm. In some examples, the Li negative electrode includes a layer of Li metal having a thickness of about 50 nm. In some examples, the Li negative electrode includes a layer of Li metal having a thickness of about 51 nm. In some examples, the Li negative electrode includes a layer of Li metal having a thickness of about 52 nm. In some examples, the Li negative electrode includes a layer of Li metal having a thickness of about 53 nm. In some examples, the Li negative electrode includes a layer of Li metal having a thickness of about 54 nm. In some examples, the Li negative electrode includes a layer of Li metal having a thickness of about 55 nm. In some examples, the Li negative electrode includes a layer of Li metal having a thickness of about 56 nm. In some examples, the Li negative electrode includes a layer of Li metal having a thickness of about 57 nm. In some examples, the Li negative electrode includes a layer of Li metal having a thickness of about 58 nm. In some examples, the Li negative electrode includes a layer of Li metal having a thickness of about 59 nm. In some examples, the Li negative electrode includes a layer of Li metal having a thickness of about 60 nm. In some examples, the Li negative electrode includes a layer of Li metal having a thickness of about 60 nm. In some examples, the Li negative electrode includes a layer of Li metal having a thickness of about 61 nm. In some examples, the Li negative electrode includes a layer of Li metal having a thickness of about 62 nm. In some examples, the Li negative electrode includes a layer of Li metal having a thickness of about 63 nm. In some examples, the Li negative electrode includes a layer of Li metal having a thickness of about 64 nm. In some examples, the Li negative electrode includes a layer of Li metal having a thickness of about 66 nm. In some examples, the Li negative electrode includes a layer of Li metal having a thickness of about 66 nm. In some examples, the Li negative electrode includes a layer of Li metal having a thickness of about 67 nm. In some examples, the Li negative electrode includes a layer of Li metal having a thickness of about 68 nm. In some examples, the Li negative electrode includes a layer of Li metal having a thickness of about 69 nm. In some examples, the Li negative electrode includes a layer of Li metal having a thickness of about 70 nm. In some examples, the Li negative electrode includes a layer of Li metal having a thickness of about 71 nm. In some examples, the Li negative electrode includes a layer of Li metal having a thickness of about 72 nm. In some examples, the Li negative electrode includes a layer of Li metal having a thickness of about 73 nm. In some examples, the Li negative electrode includes a layer of Li metal having a thickness of about 74 nm. In some examples, the Li negative electrode includes a layer of Li metal having a thickness of about 77 nm. In some examples, the Li negative electrode includes a layer of Li metal having a thickness of about 76 nm. In some examples, the Li negative electrode includes a layer of Li metal having a thickness of about 77 nm. In some examples, the Li negative electrode includes a layer of Li metal having a thickness of about 78 nm. In some examples, the Li negative electrode includes a layer of Li metal having a thickness of about 79 nm. In some examples, the Li negative electrode includes a layer of Li metal having a thickness of about 80 nm. In some examples, the Li negative electrode includes a layer of Li metal having a thickness of about 81 nm. In some examples, the Li negative electrode includes a layer of Li metal having a thickness of about 82 nm. In some examples, the Li negative electrode includes a layer of Li metal having a thickness of about 83 nm. In some examples, the Li negative electrode includes a layer of Li metal having a thickness of about 84 nm. In some examples, the Li negative electrode includes a layer of Li metal having a thickness of about 85 nm. In some examples, the Li negative electrode includes a layer of Li metal having a thickness of about 86 nm. In some examples, the Li negative electrode includes a layer of Li metal having a thickness of about 87 nm. In some examples, the Li negative electrode includes a layer of Li metal having a thickness of about 88 nm. In some examples, the Li negative electrode includes a layer of Li metal having a thickness of about 89 nm. In some examples, the Li negative electrode includes a layer of Li metal having a thickness of about 90 nm. In some examples, the Li negative electrode includes a layer of Li metal having a thickness of about 91 nm. In some examples, the Li negative electrode includes a layer of Li metal having a thickness of about 92 nm. In some examples, the Li negative electrode includes a layer of Li metal having a thickness of about 93 nm. In some examples, the Li negative electrode includes a layer of Li metal having a thickness of about 94 nm. In some examples, the Li negative electrode includes a layer of Li metal having a thickness of about 99 nm. In some examples, the Li negative electrode includes a layer of Li metal having a thickness of about 96 nm. In some examples, the Li negative electrode includes a layer of Li metal having a thickness of about 97 nm. In some examples, the Li negative electrode includes a layer of Li metal having a thickness of about 98 nm. In some examples, the Li negative electrode includes a layer of Li metal having a thickness of about 99 nm. In some examples, the Li negative electrode includes a layer of Li metal having a thickness of about 100 nm.

In some examples, in a fully discharged state, the Li negative electrode includes a layer of Li metal having a thickness of about 110 nm. In some examples, the Li negative electrode includes a layer of Li metal having a thickness of about 120 nm. In some examples, the Li negative electrode includes a layer of Li metal having a thickness of about 130 nm. In some examples, the Li negative electrode includes a layer of Li metal having a thickness of about 140 nm. In some examples, the Li negative electrode includes a layer of Li metal having a thickness of about 150 nm. In some examples, the Li negative electrode includes a layer of Li metal having a thickness of about 160 nm. In some examples, the Li negative electrode includes a layer of Li metal having a thickness of about 170 nm. In some examples, the Li negative electrode includes a layer of Li metal having a thickness of about 180 nm. In some examples, the Li negative electrode includes a layer of Li metal having a thickness of about 190 nm. In some examples, the Li negative electrode includes a layer of Li metal having a thickness of about 200 nm. In some examples, the Li negative electrode includes a layer of Li metal having a thickness of about 210 nm. In some examples, the Li negative electrode includes a layer of Li metal having a thickness of about 220 nm. In some examples, the Li negative electrode includes a layer of Li metal having a thickness of about 230 nm. In some examples, the Li negative electrode includes a layer of Li metal having a thickness of about 240 nm. In some examples, the Li negative electrode includes a layer of Li metal having a thickness of about 250 nm. In some examples, the Li negative electrode includes a layer of Li metal having a thickness of about 260 nm. In some examples, the Li negative electrode includes a layer of Li metal having a thickness of about 270 nm. In some examples, the Li negative electrode includes a layer of Li metal having a thickness of about 280 nm. In some examples, the Li negative electrode includes a layer of Li metal having a thickness of about 290 nm. In some examples, the Li negative electrode includes a layer of Li metal having a thickness of about 300 nm. In some examples, the Li negative electrode includes a layer of Li metal having a thickness of about 310 nm. In some examples, the Li negative electrode includes a layer of Li metal having a thickness of about 320 nm. In some examples, the Li negative electrode includes a layer of Li metal having a thickness of about 330 nm. In some examples, the Li negative electrode includes a layer of Li metal having a thickness of about 340 nm. In some examples, the Li negative electrode includes a layer of Li metal having a thickness of about 350 nm. In some examples, the Li negative electrode includes a layer of Li metal having a thickness of about 360 nm. In some examples, the Li negative electrode includes a layer of Li metal having a thickness of about 370 nm. In some examples, the Li negative electrode includes a layer of Li metal having a thickness of about 380 nm. In some examples, the Li negative electrode includes a layer of Li metal having a thickness of about 390 nm. In some examples, the Li negative electrode includes a layer of Li metal having a thickness of about 400 nm. In some examples, the Li negative electrode includes a layer of Li metal having a thickness of about 410 nm. In some examples, the Li negative electrode includes a layer of Li metal having a thickness of about 420 nm. In some examples, the Li negative electrode includes a layer of Li metal having a thickness of about 430 nm. In some examples, the Li negative electrode includes a layer of Li metal having a thickness of about 440 nm. In some examples, the Li negative electrode includes a layer of Li metal having a thickness of about 450 nm. In some examples, the Li negative electrode includes a layer of Li metal having a thickness of about 460 nm. In some examples, the Li negative electrode includes a layer of Li metal having a thickness of about 470 nm. In some examples, the Li negative electrode includes a layer of Li metal having a thickness of about 480 nm. In some examples, the Li negative electrode includes a layer of Li metal having a thickness of about 490 nm. In some examples, the Li negative electrode includes a layer of Li metal having a thickness of about 500 nm. In some examples, the Li negative electrode includes a layer of Li metal having a thickness of about 510 nm. In some examples, the Li negative electrode includes a layer of Li metal having a thickness of about 520 nm. In some examples, the Li negative electrode includes a layer of Li metal having a thickness of about 530 nm. In some examples, the Li negative electrode includes a layer of Li metal having a thickness of about 540 nm. In some examples, the Li negative electrode includes a layer of Li metal having a thickness of about 550 nm. In some examples, the Li negative electrode includes a layer of Li metal having a thickness of about 560 nm. In some examples, the Li negative electrode includes a layer of Li metal having a thickness of about 570 nm. In some examples, the Li negative electrode includes a layer of Li metal having a thickness of about 580 nm. In some examples, the Li negative electrode includes a layer of Li metal having a thickness of about 590 nm. In some examples, the Li negative electrode includes a layer of Li metal having a thickness of about 600 nm. In some examples, the Li negative electrode includes a layer of Li metal having a thickness of about 610 nm. In some examples, the Li negative electrode includes a layer of Li metal having a thickness of about 620 nm. In some examples, the Li negative electrode includes a layer of Li metal having a thickness of about 630 nm. In some examples, the Li negative electrode includes a layer of Li metal having a thickness of about 640 nm. In some examples, the Li negative electrode includes a layer of Li metal having a thickness of about 650 nm. In some examples, the Li negative electrode includes a layer of Li metal having a thickness of about 660 nm. In some examples, the Li negative electrode includes a layer of Li metal having a thickness of about 670 nm. In some examples, the Li negative electrode includes a layer of Li metal having a thickness of about 680 nm. In some examples, the Li negative electrode includes a layer of Li metal having a thickness of about 690 nm. In some examples, the Li negative electrode includes a layer of Li metal having a thickness of about 700 nm. In some examples, the Li negative electrode includes a layer of Li metal having a thickness of about 710 nm. In some examples, the Li negative electrode includes a layer of Li metal having a thickness of about 720 nm. In some examples, the Li negative electrode includes a layer of Li metal having a thickness of about 730 nm. In some examples, the Li negative electrode includes a layer of Li metal having a thickness of about 740 nm. In some examples, the Li negative electrode includes a layer of Li metal having a thickness of about 750 nm. In some examples, the Li negative electrode includes a layer of Li metal having a thickness of about 760 nm. In some examples, the Li negative electrode includes a layer of Li metal having a thickness of about 770 nm. In some examples, the Li negative electrode includes a layer of Li metal having a thickness of about 780 nm. In some examples, the Li negative electrode includes a layer of Li metal having a thickness of about 790 nm. In some examples, the Li negative electrode includes a layer of Li metal having a thickness of about 800 nm. In some examples, the Li negative electrode includes a layer of Li metal having a thickness of about 810 nm. In some examples, the Li negative electrode includes a layer of Li metal having a thickness of about 820 nm. In some examples, the Li negative electrode includes a layer of Li metal having a thickness of about 830 nm. In some examples, the Li negative electrode includes a layer of Li metal having a thickness of about 840 nm. In some examples, the Li negative electrode includes a layer of Li metal having a thickness of about 850 nm. In some examples, the Li negative electrode includes a layer of Li metal having a thickness of about 860 nm. In some examples, the Li negative electrode includes a layer of Li metal having a thickness of about 870 nm. In some examples, the Li negative electrode includes a layer of Li metal having a thickness of about 880 nm. In some examples, the Li negative electrode includes a layer of Li metal having a thickness of about 890 nm. In some examples, the Li negative electrode includes a layer of Li metal having a thickness of about 900 nm. In some examples, the Li negative electrode includes a layer of Li metal having a thickness of about 910 nm. In some examples, the Li negative electrode includes a layer of Li metal having a thickness of about 920 nm. In some examples, the Li negative electrode includes a layer of Li metal having a thickness of about 930 nm. In some examples, the Li negative electrode includes a layer of Li metal having a thickness of about 940 nm. In some examples, the Li negative electrode includes a layer of Li metal having a thickness of about 950 nm. In some examples, the Li negative electrode includes a layer of Li metal having a thickness of about 960 nm. In some examples, the Li negative electrode includes a layer of Li metal having a thickness of about 970 nm. In some examples, the Li negative electrode includes a layer of Li metal having a thickness of about 980 nm. In some examples, the Li negative electrode includes a layer of Li metal having a thickness of about 990 nm. In some examples, the Li negative electrode includes a layer of Li metal having a thickness of about 1000 nm.

In some examples, in a fully discharged state (0% rated SOC), the Li negative electrode includes a layer of Li metal having a thickness of about 1 µm. In some examples, the Li negative electrode includes a layer of Li metal having a thickness of about 2 µm. In some examples, the Li negative electrode includes a layer of Li metal having a thickness of about 3 µm. In some examples, the Li negative electrode includes a layer of Li metal having a thickness of about 4 µm. In some examples, the Li negative electrode includes a layer of Li metal having a thickness of about 5 µm. In some examples, the Li negative electrode includes a layer of Li metal having a thickness of about 6 µm. In some examples, the Li negative electrode includes a layer of Li metal having a thickness of about 7 µm. In some examples, the Li negative electrode includes a layer of Li metal having a thickness of about 8 µm. In some examples, the Li negative electrode includes a layer of Li metal having a thickness of about 9 µm. In some examples, the Li negative electrode includes a layer of Li metal having a thickness of about 10 µm. In some examples, the Li negative electrode includes a layer of Li metal having a thickness of about 11 µm. In some examples, the Li negative electrode includes a layer of Li metal having a thickness of about 12 µm. In some examples, the Li negative electrode includes a layer of Li metal having a thickness of about 13 µm. In some examples, the Li negative electrode includes a layer of Li metal having a thickness of about 14 µm. In some examples, the Li negative electrode includes a layer of Li metal having a thickness of about 15 µm. In some examples, the Li negative electrode includes a layer of Li metal having a thickness of about 16 µm. In some examples, the Li negative electrode includes a layer of Li metal having a thickness of about 17 µm. In some examples, the Li negative electrode includes a layer of Li metal having a thickness of about 18 µm. In some examples, the Li negative electrode includes a layer of Li metal having a thickness of about 19 µm. In some examples, the Li negative electrode includes a layer of Li metal having a thickness of about 20 µm. In some examples, the Li negative electrode includes a layer of Li metal having a thickness of about 21 µm. In some examples, the Li negative electrode includes a layer of Li metal having a thickness of about 22 µm. In some examples, the Li negative electrode includes a layer of Li metal having a thickness of about 23 µm. In some examples, the Li negative electrode includes a layer of Li metal having a thickness of about 24 µm. In some examples, the Li negative electrode includes a layer of Li metal having a thickness of about 25 µm. In some examples, the Li negative electrode includes a layer of Li metal having a thickness of about 26 µm. In some examples, the Li negative electrode includes a layer of Li metal having a thickness of about 27 µm. In some examples, the Li negative electrode includes a layer of Li metal having a thickness of about 28 µm. In some examples, the Li negative electrode includes a layer of Li metal having a thickness of about 29 µm. In some examples, the Li negative electrode includes a layer of Li metal having a thickness of about 30 µm. In some examples, the Li negative electrode includes a layer of Li metal having a thickness of about 41 µm. In some examples, the Li negative electrode includes a layer of Li metal having a thickness of about 42 µm. In some examples, the Li negative electrode includes a layer of Li metal having a thickness of about 43 µm. In some examples, the Li negative electrode includes a layer of Li metal having a thickness of about 44 µm. In some examples, the Li negative electrode includes a layer of Li metal having a thickness of about 45 µm. In some examples, the Li negative electrode includes a layer of Li metal having a thickness of about 46 µm. In some examples, the Li negative electrode includes a layer of Li metal having a thickness of about 47 µm. In some examples, the Li negative electrode includes a layer of Li metal having a thickness of about 48 µm. In some examples, the Li negative electrode includes a layer of Li metal having a thickness of about 49 µm. In some examples, the Li negative electrode includes a layer of Li metal having a thickness of about 50 µm. In some examples, the Li negative electrode includes a layer of Li metal having a thickness of about 51 µm. In some examples, the Li negative electrode includes a layer of Li metal having a thickness of about 52 µm. In some examples, the Li negative electrode includes a layer of Li metal having a thickness of about 53 µm. In some examples, the Li negative electrode includes a layer of Li metal having a thickness of about 54 µm. In some examples, the Li negative electrode includes a layer of Li metal having a thickness of about 55 µm. In some examples, the Li negative electrode includes a layer of Li metal having a thickness of about 56 µm. In some examples, the Li negative electrode includes a layer of Li metal having a thickness of about 57 µm. In some examples, the Li negative electrode includes a layer of Li metal having a thickness of about 58 µm. In some examples, the Li negative electrode includes a layer of Li metal having a thickness of about 59 µm. In some examples, the Li negative electrode includes a layer of Li metal having a thickness of about 60 µm. In some examples, the Li negative electrode includes a layer of Li metal having a thickness of about 60 µm. In some examples, the Li negative electrode includes a layer of Li metal having a thickness of about 61 µm. In some examples, the Li negative electrode includes a layer of Li metal having a thickness of about 62 µm. In some examples, the Li negative electrode includes a layer of Li metal having a thickness of about 63 µm. In some examples, the Li negative electrode includes a layer of Li metal having a thickness of about 64 µm. In some examples, the Li negative electrode includes a layer of Li metal having a thickness of about 66 µm. In some examples, the Li negative electrode includes a layer of Li metal having a thickness of about 66 µm. In some examples, the Li negative electrode includes a layer of Li metal having a thickness of about 67 µm. In some examples, the Li negative electrode includes a layer of Li metal having a thickness of about 68 µm. In some examples, the Li negative electrode includes a layer of Li metal having a thickness of about 69 µm. In some examples, the Li negative electrode includes a layer of Li metal having a thickness of about 70 µm. In some examples, the Li negative electrode includes a layer of Li metal having a thickness of about 71 µm. In some examples, the Li negative electrode includes a layer of Li metal having a thickness of about 72 µm. In some examples, the Li negative electrode includes a layer of Li metal having a thickness of about 73 µm. In some examples, the Li negative electrode includes a layer of Li metal having a thickness of about 74 µm. In some examples, the Li negative electrode includes a layer of Li metal having a thickness of about 77 µm. In some examples, the Li negative electrode includes a layer of Li metal having a thickness of about 76 µm. In some examples, the Li negative electrode includes a layer of Li metal having a thickness of about 77 µm. In some examples, the Li negative electrode includes a layer of Li metal having a thickness of about 78 µm. In some examples, the Li negative electrode includes a layer of Li metal having a thickness of about 79 µm. In some examples, the Li negative electrode includes a layer of Li metal having a thickness of about 80 µm. In some examples, the Li negative electrode includes a layer of Li metal having a thickness of about 81 µm. In some examples, the Li negative electrode includes a layer of Li metal having a thickness of about 82 µm. In some examples, the Li negative electrode includes a layer of Li metal having a thickness of about 83 µm. In some examples, the Li negative electrode includes a layer of Li metal having a thickness of about 84 µm. In some examples, the Li negative electrode includes a layer of Li metal having a thickness of about 85 µm. In some examples, the Li negative electrode includes a layer of Li metal having a thickness of about 86 µm. In some examples, the Li negative electrode includes a layer of Li metal having a thickness of about 87 µm. In some examples, the Li negative electrode includes a layer of Li metal having a thickness of about 88 µm. In some examples, the Li negative electrode includes a layer of Li metal having a thickness of about 89 µm. In some examples, the Li negative electrode includes a layer of Li metal having a thickness of about 90 µm. In some examples, the Li negative electrode includes a layer of Li metal having a thickness of about 91 µm. In some examples, the Li negative electrode includes a layer of Li metal having a thickness of about 92 µm. In some examples, the Li negative electrode includes a layer of Li metal having a thickness of about 93 µm. In some examples, the Li negative electrode includes a layer of Li metal having a thickness of about 94 µm. In some examples, the Li negative electrode includes a layer of Li metal having a thickness of about 99 µm. In some examples, the Li negative electrode includes a layer of Li metal having a thickness of about 96 µm. In some examples, the Li negative electrode includes a layer of Li metal having a thickness of about 97 µm. In some examples, the Li negative electrode includes a layer of Li metal having a thickness of about 98 µm. In some examples, the Li negative electrode includes a layer of Li metal having a thickness of about 99 µm. In some examples, the Li negative electrode includes a layer of Li metal having a thickness of about 100 µm.

In some examples, in a fully charged state (100% rated SOC), the Li negative electrode includes a layer of Li metal having a thickness of about 1 µm. In some examples, the Li negative electrode includes a layer of Li metal having a thickness of about 2 µm. In some examples, the Li negative electrode includes a layer of Li metal having a thickness of about 3 µm. In some examples, the Li negative electrode includes a layer of Li metal having a thickness of about 4 µm. In some examples, the Li negative electrode includes a layer of Li metal having a thickness of about 5 µm. In some examples, the Li negative electrode includes a layer of Li metal having a thickness of about 6 µm. In some examples, the Li negative electrode includes a layer of Li metal having a thickness of about 7 µm. In some examples, the Li negative electrode includes a layer of Li metal having a thickness of about 8 µm. In some examples, the Li negative electrode includes a layer of Li metal having a thickness of about 9 µm. In some examples, the Li negative electrode includes a layer of Li metal having a thickness of about 10 µm. In some examples, the Li negative electrode includes a layer of Li metal having a thickness of about 11 µm. In some examples, the Li negative electrode includes a layer of Li metal having a thickness of about 12 µm. In some examples, the Li negative electrode includes a layer of Li metal having a thickness of about 13 µm. In some examples, the Li negative electrode includes a layer of Li metal having a thickness of about 14 µm. In some examples, the Li negative electrode includes a layer of Li metal having a thickness of about 15 µm. In some examples, the Li negative electrode includes a layer of Li metal having a thickness of about 16 µm. In some examples, the Li negative electrode includes a layer of Li metal having a thickness of about 17 µm. In some examples, the Li negative electrode includes a layer of Li metal having a thickness of about 18 µm. In some examples, the Li negative electrode includes a layer of Li metal having a thickness of about 19 µm. In some examples, the Li negative electrode includes a layer of Li metal having a thickness of about 20 µm. In some examples, the Li negative electrode includes a layer of Li metal having a thickness of about 21 µm. In some examples, the Li negative electrode includes a layer of Li metal having a thickness of about 22 µm. In some examples, the Li negative electrode includes a layer of Li metal having a thickness of about 23 µm. In some examples, the Li negative electrode includes a layer of Li metal having a thickness of about 24 µm. In some examples, the Li negative electrode includes a layer of Li metal having a thickness of about 25 µm. In some examples, the Li negative electrode includes a layer of Li metal having a thickness of about 26 µm. In some examples, the Li negative electrode includes a layer of Li metal having a thickness of about 27 µm. In some examples, the Li negative electrode includes a layer of Li metal having a thickness of about 28 µm. In some examples, the Li negative electrode includes a layer of Li metal having a thickness of about 29 µm. In some examples, the Li negative electrode includes a layer of Li metal having a thickness of about 30 µm. In some examples, the Li negative electrode includes a layer of Li metal having a thickness of about 41 µm. In some examples, the Li negative electrode includes a layer of Li metal having a thickness of about 42 µm. In some examples, the Li negative electrode includes a layer of Li metal having a thickness of about 43 µm. In some examples, the Li negative electrode includes a layer of Li metal having a thickness of about 44 µm. In some examples, the Li negative electrode includes a layer of Li metal having a thickness of about 45 µm. In some examples, the Li negative electrode includes a layer of Li metal having a thickness of about 46 µm. In some examples, the Li negative electrode includes a layer of Li metal having a thickness of about 47 µm. In some examples, the Li negative electrode includes a layer of Li metal having a thickness of about 48 µm. In some examples, the Li negative electrode includes a layer of Li metal having a thickness of about 49

μm. In some examples, the Li negative electrode includes a layer of Li metal having a thickness of about 50 μm. In some examples, the Li negative electrode includes a layer of Li metal having a thickness of about 51 μm. In some examples, the Li negative electrode includes a layer of Li metal having a thickness of about 52 μm. In some examples, the Li negative electrode includes a layer of Li metal having a thickness of about 53 μm. In some examples, the Li negative electrode includes a layer of Li metal having a thickness of about 54 μm. In some examples, the Li negative electrode includes a layer of Li metal having a thickness of about 55 μm. In some examples, the Li negative electrode includes a layer of Li metal having a thickness of about 56 μm. In some examples, the Li negative electrode includes a layer of Li metal having a thickness of about 57 μm. In some examples, the Li negative electrode includes a layer of Li metal having a thickness of about 58 μm. In some examples, the Li negative electrode includes a layer of Li metal having a thickness of about 59 μm. In some examples, the Li negative electrode includes a layer of Li metal having a thickness of about 60 μm. In some examples, the Li negative electrode includes a layer of Li metal having a thickness of about 60 μm. In some examples, the Li negative electrode includes a layer of Li metal having a thickness of about 61 μm. In some examples, the Li negative electrode includes a layer of Li metal having a thickness of about 62 μm. In some examples, the Li negative electrode includes a layer of Li metal having a thickness of about 63 μm. In some examples, the Li negative electrode includes a layer of Li metal having a thickness of about 64 μm. In some examples, the Li negative electrode includes a layer of Li metal having a thickness of about 66 μm. In some examples, the Li negative electrode includes a layer of Li metal having a thickness of about 66 μm. In some examples, the Li negative electrode includes a layer of Li metal having a thickness of about 67 μm. In some examples, the Li negative electrode includes a layer of Li metal having a thickness of about 68 μm. In some examples, the Li negative electrode includes a layer of Li metal having a thickness of about 69 μm. In some examples, the Li negative electrode includes a layer of Li metal having a thickness of about 70 μm. In some examples, the Li negative electrode includes a layer of Li metal having a thickness of about 71 μm. In some examples, the Li negative electrode includes a layer of Li metal having a thickness of about 72 μm. In some examples, the Li negative electrode includes a layer of Li metal having a thickness of about 73 μm. In some examples, the Li negative electrode includes a layer of Li metal having a thickness of about 74 μm. In some examples, the Li negative electrode includes a layer of Li metal having a thickness of about 77 μm. In some examples, the Li negative electrode includes a layer of Li metal having a thickness of about 76 μm. In some examples, the Li negative electrode includes a layer of Li metal having a thickness of about 77 μm. In some examples, the Li negative electrode includes a layer of Li metal having a thickness of about 78 μm. In some examples, the Li negative electrode includes a layer of Li metal having a thickness of about 79 μm. In some examples, the Li negative electrode includes a layer of Li metal having a thickness of about 80 μm. In some examples, the Li negative electrode includes a layer of Li metal having a thickness of about 81 μm. In some examples, the Li negative electrode includes a layer of Li metal having a thickness of about 82 μm. In some examples, the Li negative electrode includes a layer of Li metal having a thickness of about 83 μm. In some examples, the Li negative electrode includes a layer of Li metal having a thickness of about 84 μm. In some examples, the Li negative electrode includes a layer of Li metal having a thickness of about 85 μm. In some examples, the Li negative electrode includes a layer of Li metal having a thickness of about 86 μm. In some examples, the Li negative electrode includes a layer of Li metal having a thickness of about 87 μm. In some examples, the Li negative electrode includes a layer of Li metal having a thickness of about 88 μm. In some examples, the Li negative electrode includes a layer of Li metal having a thickness of about 89 μm. In some examples, the Li negative electrode includes a layer of Li metal having a thickness of about 90 μm. In some examples, the Li negative electrode includes a layer of Li metal having a thickness of about 91 μm. In some examples, the Li negative electrode includes a layer of Li metal having a thickness of about 92 μm. In some examples, the Li negative electrode includes a layer of Li metal having a thickness of about 93 μm. In some examples, the Li negative electrode includes a layer of Li metal having a thickness of about 94 μm. In some examples, the Li negative electrode includes a layer of Li metal having a thickness of about 99 μm. In some examples, the Li negative electrode includes a layer of Li metal having a thickness of about 96 μm. In some examples, the Li negative electrode includes a layer of Li metal having a thickness of about 97 μm. In some examples, the Li negative electrode includes a layer of Li metal having a thickness of about 98 μm. In some examples, the Li negative electrode includes a layer of Li metal having a thickness of about 99 μm. In some examples, the Li negative electrode includes a layer of Li metal having a thickness of about 100 μm.

In some examples, the Li negative electrode includes a layer of Li metal having a thickness from 1 nm to 50 μm in the charged state.

In some examples, the electrolyte separator has a surface roughness Ra or Rt, on at least one surface, from about 0.1 μm to 10 μm. In other examples, the electrolyte separator has a surface roughness, on at least one surface, from about 0.1 μm to 5 μm. In other examples, the electrolyte separator has a surface roughness, on at least one surface, from about 0.1 μm to 2 μm. In some examples, the electrolyte has a surface roughness from about 0.1 μm to 10 μm at the surface that interfaces the electrolyte separator and the Li metal negative electrode.

In some examples, the electrolyte separator has a density greater than 95% of its theoretical density. In other examples, the electrolyte separator has a density greater than 95% of its theoretical density as determined by scanning electron microscopy (SEM).

In certain examples, the electrolyte separator has a density greater than 95% of its theoretical density as measured by the Archimedes method.

In some examples, the electrolyte separator has a surface flatness of 0.1 μm to about 50 μm.

In some examples, the polymer in the bonding layer is selected from the group consisting of polyacrylonitrile (PAN), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxy)ethyl glycidyl ether (PEO-MEEGE), polyethylene oxide 2-methoxyethoxy)ethyl glycidyl poly(allyl glycidyl ether) (PEO-MEEGE-AGE), polysiloxane, polyvinylidene fluoride (PVDF), polyvinylidene fluoride hexafluoropropylene (PVDF-HFP), and rubbers such as ethylene propylene (EPR), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), polyvinylidene fluoride (PVDF), or polyethylene (e.g., low density linear polyethylene). In certain examples, the polymer in the bonding layer is polyacrylonitrile (PAN) or polyvinylidene fluoride hexafluoropropylene (PVDF-HFP). In certain examples, the polymer in the bonding layer is PAN, PVDF-HFP, PVDF-HFP and PAN, PMMA, PVC, PVP, PEO, or combinations thereof.

In some examples, the lithium salt in the bonding layer is selected from $LiPF_6$, LiBOB, LiTFSi, $LiBF_4$, $LiClO_4$, $LiAsF_6$, LiFSI, $LiAsF_6$, $LiClO_4$, LiI, or $LiBF_4$. In certain examples, the lithium salt in the bonding layer is selected from $LiPF_6$, LiBOB, or LFTSi.

In certain examples, the lithium salt in the bonding layer is $LiPF_6$ at a concentration of 0.5 M to 2M. In certain examples, the lithium salt in the bonding layer is LiTFSI at a concentration of 0.5 M to 2M. In certain examples, the lithium salt in the bonding layer is present at a concentration from 0.01 M to 10 M.

In some examples, the solvent in the bonding layer is selected from ethylene carbonate (EC), diethylene carbonate, diethyl carbonate, dimethyl carbonate (DMC), ethyl-methyl carbonate (EMC), tetrahydrofuran (THF), y-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-Tetrafluoro-3-(1,1,2,2-tetrafluoroethoxy)propane (F-EPE), fluorinated cyclic carbonate (F-AEC), propylene carbonate (PC), dioxolane, acetonitrile (ACN), succinonitrile, adiponitrile, hexanedinitrile, pentanedinitrile, acetophenone, isophorone, benzonitrile, dimethyl sulfate, dimethyl sulfoxide (DMSO) ethyl-methyl carbonate, ethyl acetate, methyl butyrate, dimethyl ether (DME), diethyl ether, propylene carbonate, dioxolane, glutaronitrile, gamma butyl-lactone, PES, sulfolane, or combinations thereof. In some examples, the solvent in the bonding layer is the same as the solvent in the catholyte gel.

In other examples, the solvent is a 1:1 w/w mixture of EC:PC.

In yet other examples, the solvent in the bonding layer is present as a residual amount. In some examples, the residual amount is the amount of solvent remaining after the bonding layer is dried. In other examples, the residual amount is the minimum amount of solvent required to solvate the lithium salt.

In some examples, the bonding layer lowers the interfacial impedance between the electrolyte separator and the positive electrode than it otherwise would be in the absence of the bonding layer.

In some examples, the interfacial impedance between the oxide electrolyte separator and the positive electrode is less than 50 $\Omega \cdot cm^2$ at 50° C., when the bonding layer is positioned between and in direct contact with the oxide electrolyte separator and the positive electrode. In some examples, the interfacial impedance between the oxide electrolyte separator and the positive electrode is less than 25 $\Omega \cdot cm^2$ at 50° C. In some examples, the interfacial impedance between the oxide electrolyte separator and the positive electrode is less than 10 $\Omega \cdot cm^2$ at 50° C. In some examples, the interfacial impedance between the oxide electrolyte separator and the positive electrode is less than 5 $\Omega \cdot cm^2$ at 50° C. In some examples, the interfacial impedance between the oxide electrolyte separator and the positive electrode is less than 5 $\Omega \cdot cm^2$ at 30° C. In some examples, the interfacial impedance between the oxide electrolyte separator and the positive electrode is less than 5 $\Omega \cdot cm^2$ at 20° C. In some examples, the interfacial impedance between the oxide electrolyte separator and the positive electrode is less than 5 $\Omega \cdot cm^2$ at 10° C. In some examples, the interfacial impedance between the oxide electrolyte separator and the positive electrode is less than 5 $\Omega \cdot cm^2$ at 0° C.

In some examples, the positive electrode includes a lithium intercalation material, a lithium conversion material, or both a lithium intercalation material and a lithium conversion material. In some examples, the lithium intercalation material is selected from a nickel manganese cobalt oxide $Li(NiCoMn)O_2$, (NMC), a nickel cobalt aluminum oxide (NCA), $Li(NiCoAl)O_2$, a lithium cobalt oxide (LCO), a lithium manganese cobalt oxide (LMCO), a lithium nickel manganese cobalt oxide (LMNCO), a lithium nickel manganese oxide (LNMO), $LiMn_2O_4$, $LiCoO_2$, $LiMn_2\text{-}aNi_aO_4$, wherein a is from 0 to 2, or $LiMPO_4$, wherein M is Fe, Ni, Co, or Mn. In others, the lithium conversion material is selected from the group consisting of $FeF_2$, $NiF_2$, $FeO_xF_{3-2x}$, $FeF_3$, $MnF_3$, $CoF_3$, $CuF_2$ materials, alloys thereof, and combinations thereof. In others, the conversion material is doped with other transition metal fluorides or oxides.

In some examples, the positive electrode further includes a catholyte. In some examples, the catholyte is a gel electrolyte. In some examples, the positive electrode includes a gel catholyte. In some examples, the positive electrode includes a gel catholyte comprising, a solvent selected from the group consisting of ethylene carbonate (EC), propylene carbonate (PC), dimethyl carbonate (DMC), methylene carbonate, and combinations thereof; a polymer selected from the group consisting of PVDF-HFP and PAN; and a salt selected from the group consisting of $LiPF_6$, LiBOB, and LFTSi.

In some examples, the positive electrode further includes a binder polymer selected from the group consisting of polypropylene (PP), atactic polypropylene (aPP), isotactive polypropylene (iPP), ethylene propylene rubber (EPR), ethylene pentene copolymer (EPC), polyethylene oxide (PEO), PEO block copolymers, polyethylene glycol, polyisobutylene (PIB), styrene butadiene rubber (SBR), a polyolefin, polyethylene-co-poly-1-octene (PE-co-PO) copolymer, PE-co-poly(methylene cyclopentane) (PE-co-PMCP) copolymer, stereoblock polypropylenes, polypropylene polymethylpentene copolymer, acrylics, acrylates, polyvinyl butyral, vinyl polymers, cellulose polymers, resins, polyvinyl alcohol, polymethyl methacrylate, polyvinyl pyrrolidone, polyacrylamide, silicone, PVDF, PVDF-HFP, PAN and combinations thereof. In some examples, the binder polymer is the same polymer as that which is used as a polymer in the bonding layer. In some examples, the positive electrode and/or bonding layer may include poly-ethylene carbonate, polyphenylene sulfide, and/or poly-propylene carbonate.

In some examples, the positive electrode includes an electronically conductive source of carbon.

In some examples, the positive electrode includes a solid catholyte and a lithium intercalation material or a lithium conversion material; wherein each of the catholyte and lithium intercalation material or a lithium conversion material independently has a $d_{50}$ particle size from about 0.1 μm to 5 μm.

In some examples, the electrolyte separator is selected from the group consisting of a lithium-stuffed garnet, a sulfide electrolyte doped with oxygen, a sulfide electrolyte comprising oxygen, a lithium aluminum titanium oxide, a lithium aluminum titanium phosphate, a lithium aluminum germanium phosphate, a lithium aluminum titanium oxyphosphate, a lithium lanthanum titanium oxide perovskite, a lithium lanthanum tantalum oxide perovskite, a lithium lanthanum titanium oxide perovskite, an antiperovskite, a LISICON, a LI-S-O-N, lithium aluminum silicon oxide, a Thio-LISICON, a lithium-substituted NASICON, a LIPON, or a combination, mixture, or multilayer thereof. In some examples, the electrolyte separator is an oxide electrolyte separator.

In some examples, the oxide electrolyte separator is a lithium-stuffed garnet.

In some examples, the electrolyte separator is a sulfide electrolyte doped with oxygen, In some examples, the electrolyte separator is a sulfide electrolyte comprising oxygen.

In some examples, the electrolyte separator is a lithium aluminum titanium oxide.

In some examples, the electrolyte separator is a lithium aluminum titanium phosphate.

In some examples, the electrolyte separator is a lithium aluminum germanium phosphate.

In some examples, the electrolyte separator is a lithium aluminum titanium oxy-phosphate.

In some examples, the electrolyte separator is a lithium lanthanum titanium oxide perovskite.

In some examples, the electrolyte separator is a lithium lanthanum tantalum oxide perovskite.

In some examples, the electrolyte separator is a lithium lanthanum titanium oxide perovskite.

In some examples, the electrolyte separator is an antiperovskite.

In some examples, the electrolyte separator is a LISICON.

In some examples, the electrolyte separator is a LI-S-O-N.

In some examples, the electrolyte separator is a lithium aluminum silicon oxide.

In some examples, the electrolyte separator is a Thio-LISICON

In some examples, the electrolyte separator is a lithium-substituted NASICON.

In some examples, the electrolyte separator is a LIPON

In some examples, the lithium lanthanum titanium oxide is characterized by the empirical formula, $Li_{3x}La_{2/3-x}TiO_3$, wherein x is a rational number from 0 to 2/3.

In some examples, the lithium lanthanum titanium oxide is characterized by the empirical formula, $Li_{3x}La_{2/3-x}Ti_jTa_kO_3$, wherein x is a rational number from 0 to 2/3, and wherein subscripts j+k=1.

In some examples, the lithium lanthanum titanium oxide is characterized by a perovskite crystal structure.

In some examples, the antiperovskite is $Li_3OCl$.

In some examples, the LISICON is $Li(Me'x, Me''y)(PO_4)$ wherein Me' and Me'' are selected from Si, Ge, Sn or combinations thereof; and wherein 0≤x≤1; wherein 0≤y≤1, and wherein x+y=1.

In some examples, the LISICON is $Li_{4-x}Ge_{1-x}P_xS_4$ where 0.2≤x≤0.8. In some examples, x is 0.2. In some examples, x is 0.25. In some examples, x is 0.3. In some examples, x is 0.35. In some examples, x is 0.4. In some examples, x is 0.45. In some examples, x is 0.5. In some examples, x is 0.55. In some examples, x is 0.6. In some examples, x is 0.65. In some examples, x is 0.7. In some examples, x is 0.75. In some examples, x is 0.8. In some examples, the Thio-LISICON is $Li_{3.25}Ge_{0.25}P_{0.75}S_4$.

In some examples, the Thio-LISICON is $Li_{4-x}M_{1-x}P_xS_4$ or $Li_{10}MP_2S_{12}$, wherein M is selected from Si, Ge, Sn, or combinations thereof; and wherein 0≤x≤1.

In some examples, the lithium aluminum titanium phosphate is $Li_{1+x}Al_xTi_{2-x}(PO_4)$, wherein 0≤x≤2.

In some examples, the lithium aluminum germanium phosphate is $Li_{1.5}Al_{0.5}Ge_{1.5}(PO_4)$.

In some examples, the LI-S-O-N is $Li_xS_yO_zN_w$, wherein x, y, z, and w, are a rational number from 0.01 to 1.

In some examples, the electrolyte separator is characterized by the chemical formula $Li_xLa_3Zr_2O_h+yAl_2O_3$, wherein 3≤x≤8, 0≤y≤1, and 6≤h≤15; and wherein subscripts x and h, and coefficient y is selected so that the electrolyte separator is charge neutral.

In some examples, the electrolyte separator isolates the positive electrode from the negative electrode by preventing electron transport between the two electrodes.

In some examples, the electrolyte separator has a top or bottom surface that has less than 5 atomic % of an amorphous material comprising carbon and oxygen. In some examples, the amorphous material is lithium carbonate, lithium hydroxide, lithium oxide, lithium peroxide, a hydrate thereof, an oxide thereof, or a combination thereof. In some of these examples, the electrolyte separator has a top or bottom surface which only includes material which is the same as the material in the bulk.

In some examples, the separator is a borohydride electrolyte or an LPSI electrolyte or a composite electrolyte.

In some examples, the bonding layer is characterized by a thickness of about 1 nm to about 5 μm.

In some examples, set forth herein is a bonding layer having a thickness of about 1 nm. In some examples, set forth herein is a bonding layer having a thickness of about 2 nm. In some examples, set forth herein is a bonding layer having a thickness of about 3 nm. In some examples, set forth herein is a bonding layer having a thickness of about 4 nm. In some examples, set forth herein is a bonding layer having a thickness of about 5 nm. In some examples, set forth herein is a bonding layer having a thickness of about 6 nm. In some examples, set forth herein is a bonding layer having a thickness of about 7 nm. In some examples, set forth herein is a bonding layer having a thickness of about 8 nm. In some examples, set forth herein is a bonding layer having a thickness of about 9 nm. In some examples, set forth herein is a bonding layer having a thickness of about 10 nm. In some examples, set forth herein is a bonding layer having a thickness of about 11 nm. In some examples, set forth herein is a bonding layer having a thickness of about 12 nm. In some examples, set forth herein is a bonding layer having a thickness of about 13 nm. In some examples, set forth herein is a bonding layer having a thickness of about 14 nm. In some examples, set forth herein is a bonding layer having a thickness of about 15 nm. In some examples, set forth herein is a bonding layer having a thickness of about 16 nm. In some examples, set forth herein is a bonding layer having a thickness of about 17 nm. In some examples, set forth herein is a bonding layer having a thickness of about 18 nm. In some examples, set forth herein is a bonding layer having a thickness of about 19 nm. In some examples, set forth herein is a bonding layer having a thickness of about 20 nm. In some examples, set forth herein is a bonding layer having a thickness of about 21 nm. In some examples, set forth herein is a bonding layer having a thickness of about 22 nm. In some examples, set forth herein is a bonding layer having a thickness of about 23 nm. In some examples, set forth herein is a bonding layer having a thickness of about 24 nm. In some examples, set forth herein is a bonding layer having a thickness of about 25 nm. In some examples, set forth herein is a bonding layer having a thickness of about 26 nm. In some examples, set forth herein is a bonding layer having a thickness of about 27 nm. In some examples, set forth herein is a bonding layer having a thickness of about 28 nm. In some examples, set forth herein is a bonding layer having a thickness of about 29 nm. In some examples, set forth herein is a bonding layer having a thickness of about 30 nm. In some examples, set forth herein is a bonding layer having a thickness of about 41 nm. In some examples, set forth herein is a bonding layer having a thickness of about 42 nm. In some examples, set forth herein is a bonding layer having a thickness of about 43 nm. In some examples, set forth herein is a bonding layer having a thickness of about 44 nm. In some examples, set forth herein is a bonding layer having a thickness of about 45 nm. In some examples, set forth herein is a bonding layer having a thickness of about 46 nm. In some examples, set forth herein is a bonding layer having a thickness of about 47 nm. In some examples, set forth herein is a bonding layer having a thickness of about 48 nm. In some examples, set forth herein is a bonding layer having a thickness of about 49 nm. In some examples, set forth herein is a bonding layer having a thickness of about 50 nm. In some examples, set forth herein is a bonding layer having a thickness of about 51 nm. In some examples, set forth herein is a bonding layer having a thickness of about 52 nm. In some examples, set forth herein is a bonding layer having a thickness of about 53 nm. In some examples, set forth herein is a bonding layer having a thickness of about 54 nm. In some examples, set forth herein is a bonding layer having a thickness of about 55 nm. In some examples, set forth herein is a bonding layer having a thickness of about 56 nm. In some examples, set forth herein is a bonding layer having a thickness of about 57 nm. In some examples, set forth herein is a bonding layer having a thickness of about 58 nm. In some examples, set forth herein is a bonding layer having a thickness of about 59 nm. In some examples, set forth herein is a bonding layer having a thickness of about 60 nm. In some examples, set forth herein is a bonding layer having a thickness of about 60 nm. In some examples, set forth herein is a bonding layer having a thickness of about 61 nm. In some examples, set forth herein is a bonding layer having a thickness of about 62 nm. In some examples, set forth herein is a bonding layer having a thickness of about 63 nm. In some examples, set forth herein is a bonding layer having a thickness of about 64 nm. In some examples, set forth herein is a bonding layer having a thickness of about 66 nm. In some examples, set forth herein is a bonding layer having a thickness of about 66 nm. In some examples, set forth herein is a bonding layer having a thickness of about 67 nm. In some examples, set forth herein is a bonding layer having a thickness of about 68 nm. In some examples, set forth herein is a bonding layer having a thickness of about 69 nm. In some examples, set forth herein is a bonding layer having a thickness of about 70 nm. In some examples, set forth herein is a bonding layer having a thickness of about 71 nm. In some examples, set forth herein is a bonding layer having a thickness of about 72 nm. In some examples, set forth herein is a bonding layer having a thickness of about 73 nm. In some examples, set forth herein is a bonding layer having a thickness of about 74 nm. In some examples, set forth herein is a bonding layer having a thickness of about 77 nm. In some examples, set forth herein is a bonding layer having a thickness of about 76 nm. In some examples, set forth herein is a bonding layer having a thickness of about 77 nm. In some examples, set forth herein is a bonding layer having a thickness of about 78 nm. In some examples, set forth herein is a bonding layer having a thickness of about 79 nm. In some examples, set forth herein is a bonding layer having a thickness of about 80 nm. In some examples, set forth herein is a bonding layer having a thickness of about 81 nm. In some examples, set forth herein is a bonding layer having a thickness of about 82 nm. In some examples, set forth herein is a bonding layer having a thickness of about 83 nm. In some examples, set forth herein is a bonding layer having a thickness of about 84 nm. In some examples, set forth herein is a bonding layer having a thickness of about 85 nm. In some examples, set forth herein is a bonding layer having a thickness of about 86 nm. In some examples, set forth herein is a bonding layer having a thickness of about 87 nm. In some examples, set forth herein is a bonding layer having a thickness of about 88 nm. In some examples, set forth herein is a bonding layer having a thickness of about 89 nm. In some examples, set forth herein is a bonding layer having a thickness of about 90 nm. In some examples, set forth herein is a bonding layer having a thickness of about 91 nm. In some examples, set forth herein is a bonding layer having a thickness of about 92 nm. In some examples, set forth herein is a bonding layer having a thickness of about 93 nm. In some examples, set forth herein is a bonding layer having a thickness of about 94 nm. In some examples, set forth herein is a bonding layer having a thickness of about 99 nm. In some examples, set forth herein is a bonding layer having a thickness of about 96 nm. In some examples, set forth herein is a bonding layer having a thickness of about 97 nm. In some examples, set forth herein is a bonding layer having a thickness of about 98 nm. In some examples, set forth herein is a bonding layer having a thickness of about 99 nm. In some examples, set forth herein is a bonding layer having a thickness of about 100 nm.

In some examples, set forth herein is a bonding layer having a thickness of about 110 nm. In some examples, set forth herein is a bonding layer having a thickness of about 120 nm. In some examples, set forth herein is a bonding layer having a thickness of about 130 nm. In some examples, set forth herein is a bonding layer having a thickness of about 140 nm. In some examples, set forth herein is a bonding layer having a thickness of about 150 nm. In some examples, set forth herein is a bonding layer having a thickness of about 160 nm. In some examples, set forth herein is a bonding layer having a thickness of about 170 nm. In some examples, set forth herein is a bonding layer having a thickness of about 180 nm. In some examples, set forth herein is a bonding layer having a thickness of about 190 nm. In some examples, set forth herein is a bonding layer having a thickness of about 200 nm. In some examples, set forth herein is a bonding layer having a thickness of about 210 nm. In some examples, set forth herein is a bonding layer having a thickness of about 220 nm. In some examples, set forth herein is a bonding layer having a thickness of about 230 nm. In some examples, set forth herein is a bonding layer having a thickness of about 240 nm. In some examples, set forth herein is a bonding layer having a thickness of about 250 nm. In some examples, set forth herein is a bonding layer having a thickness of about 260 nm. In some examples, set forth herein is a bonding layer having a thickness of about 270 nm. In some examples, set forth herein is a bonding layer having a thickness of about 280 nm. In some examples, set forth herein is a bonding layer having a thickness of about 290 nm. In some examples, set forth herein is a bonding layer having a thickness of about 300 nm. In some examples, set forth herein is a bonding layer having a thickness of about 310 nm. In some examples, set forth herein is a bonding layer having a thickness of about 320 nm. In some examples, set forth herein is a bonding layer having a thickness of about 330 nm. In some examples, set forth herein is a bonding layer having a thickness of about 340 nm. In some examples, set forth herein is a bonding layer having a thickness of about 350 nm. In some examples, set forth herein is a bonding layer having a thickness of about 360 nm. In some examples, set forth herein is a bonding layer having a thickness of about 370 nm. In some examples, set forth herein is a bonding layer having a thickness of about 380 nm. In some examples, set forth herein is a bonding layer having a thickness of about 390 nm. In some examples, set forth herein is a bonding layer having a thickness of about 400 nm. In some examples, set forth herein is a bonding layer having a thickness of about 410 nm. In some examples, set forth herein is a bonding layer having a thickness of about 420 nm. In some examples, set forth herein is a bonding layer having a thickness of about 430 nm. In some examples, set forth herein is a bonding layer having a thickness of about 440 nm. In some examples, set forth herein is a bonding layer having a thickness of about 450 nm. In some examples, set forth herein is a bonding layer having a thickness of about 460 nm. In some examples, set forth herein is a bonding layer having a thickness of about 470 nm. In some examples, set forth herein is a bonding layer having a thickness of about 480 nm. In some examples, set forth herein is a bonding layer having a thickness of about 490 nm. In some examples, set forth herein is a bonding layer having a thickness of about 500 nm. In some examples, set forth herein is a bonding layer having a thickness of about 510 nm. In some examples, set forth herein is a bonding layer having a thickness of about 520 nm. In some examples, set forth herein is a bonding layer having a thickness of about 530 nm. In some examples, set forth herein is a bonding layer having a thickness of about 540 nm. In some examples, set forth herein is a bonding layer having a thickness of about 550 nm. In some examples, set forth herein is a bonding layer having a thickness of about 560 nm. In some examples, set forth herein is a bonding layer having a thickness of about 570 nm. In some examples, set forth herein is a bonding layer having a thickness of about 580 nm. In some examples, set forth herein is a bonding layer having a thickness of about 590 nm. In some examples, set forth herein is a bonding layer having a thickness of about 600 nm. In some examples, set forth herein is a bonding layer having a thickness of about 610 nm. In some examples, set forth herein is a bonding layer having a thickness of about 620 nm. In some examples, set forth herein is a bonding layer having a thickness of about 630 nm. In some examples, set forth herein is a bonding layer having a thickness of about 640 nm. In some examples, set forth herein is a bonding layer having a thickness of about 650 nm. In some examples, set forth herein is a bonding layer having a thickness of about 660 nm. In some examples, set forth herein is a bonding layer having a thickness of about 670 nm. In some examples, set forth herein is a bonding layer having a thickness of about 680 nm. In some examples, set forth herein is a bonding layer having a thickness of about 690 nm. In some examples, set forth herein is a bonding layer having a thickness of about 700 nm. In some examples, set forth herein is a bonding layer having a thickness of about 710 nm. In some examples, set forth herein is a bonding layer having a thickness of about 720 nm. In some examples, set forth herein is a bonding layer having a thickness of about 730 nm. In some examples, set forth herein is a bonding layer having a thickness of about 740 nm. In some examples, set forth herein is a bonding layer having a thickness of about 750 nm. In some examples, set forth herein is a bonding layer having a thickness of about 760 nm. In some examples, set forth herein is a bonding layer having a thickness of about 770 nm. In some examples, set forth herein is a bonding layer having a thickness of about 780 nm. In some examples, set forth herein is a bonding layer having a thickness of about 790 nm. In some examples, set forth herein is a bonding layer having a thickness of about 800 nm. In some examples, set forth herein is a bonding layer having a thickness of about 810 nm. In some examples, set forth herein is a bonding layer having a thickness of about 820 nm. In some examples, set forth herein is a bonding layer having a thickness of about 830 nm. In some examples, set forth herein is a bonding layer having a thickness of about 840 nm. In some examples, set forth herein is a bonding layer having a thickness of about 850 nm. In some examples, set forth herein is a bonding layer having a thickness of about 860 nm. In some examples, set forth herein is a bonding layer having a thickness of about 870 nm. In some examples, set forth herein is a bonding layer having a thickness of about 880 nm. In some examples, set forth herein is a bonding layer having a thickness of about 890 nm. In some examples, set forth herein is a bonding layer having a thickness of about 900 nm. In some examples, set forth herein is a bonding layer having a thickness of about 910 nm. In some examples, set forth herein is a bonding layer having a thickness of about 920 nm. In some examples, set forth herein is a bonding layer having a thickness of about 930 nm. In some examples, set forth herein is a bonding layer having a thickness of about 940 nm. In some examples, set forth herein is a bonding layer having a thickness of about 950 nm. In some examples, set forth herein is a bonding layer having a thickness of about 960 nm. In some examples, set forth herein is a bonding layer having a thickness of about 970 nm. In some examples, set forth herein is a bonding layer having a thickness of about 980 nm. In some examples, set forth herein is a bonding layer having a thickness of about 990 nm. In some examples, set forth herein is a bonding layer having a thickness of about 1000 nm.

In some examples, set forth herein is a bonding layer having a thickness of about 1 µm. In some examples, set forth herein is a bonding layer having a thickness of about 2 µm. In some examples, set forth herein is a bonding layer having a thickness of about 3 µm. In some examples, set forth herein is a bonding layer having a thickness of about 4 µm. In some examples, set forth herein is a bonding layer having a thickness of about 5 µm. In some examples, set forth herein is a bonding layer having a thickness of about 6 µm. In some examples, set forth herein is a bonding layer having a thickness of about 7 µm. In some examples, set forth herein is a bonding layer having a thickness of about 8 µm. In some examples, set forth herein is a bonding layer having a thickness of about 9 µm. In some examples, set forth herein is a bonding layer having a thickness of about 10 µm. In some examples, set forth herein is a bonding layer having a thickness of about 11 µm. In some examples, set forth herein is a bonding layer having a thickness of about 12 µm. In some examples, set forth herein is a bonding layer having a thickness of about 13 µm. In some examples, set forth herein is a bonding layer having a thickness of about 14 µm. In some examples, set forth herein is a bonding layer having a thickness of about 15 µm. In some examples, set forth herein is a bonding layer having a thickness of about 16 µm. In some examples, set forth herein is a bonding layer having a thickness of about 17 µm. In some examples, set forth herein is a bonding layer having a thickness of about 18 µm. In some examples, set forth herein is a bonding layer having a thickness of about 19 µm. In some examples, set forth herein is a bonding layer having a thickness of about 20 µm. In some examples, set forth herein is a bonding layer having a thickness of about 21 µm. In some examples, set forth herein is a bonding layer having a thickness of about 22 µm. In some examples, set forth herein is a bonding layer having a thickness of about 23 µm. In some examples, set forth herein is a bonding layer having a thickness of about 24 µm. In some examples, set forth herein is a bonding layer having a thickness of about 25 µm. In some examples, set forth herein is a bonding layer having a thickness of about 26 µm. In some examples, set forth herein is a bonding layer having a thickness of about 27 µm. In some examples, set forth herein is a bonding layer having a thickness of about 28 µm. In some examples, set forth herein is a bonding layer having a thickness of about 29 µm. In some examples, set forth herein is a bonding layer having a thickness of about 30 µm. In some examples, set forth herein is a bonding layer having a thickness of about 41 µm. In some examples, set forth herein is a bonding layer having a thickness of about 42 µm. In some examples, set forth herein is a bonding layer having a thickness of about 43 µm. In some examples, set forth herein is a bonding layer having a thickness of about 44 µm. In some examples, set forth herein is a bonding layer having a thickness of about 45 µm. In some examples, set forth herein is a bonding layer having a thickness of about 46 µm. In some examples, set forth herein is a bonding layer having a thickness of about 47 µm. In some examples, set forth herein is a bonding layer having a thickness of about 48 µm. In some examples, set forth herein is a bonding layer having a thickness of about 49 µm. In some examples, set forth herein is a bonding layer having a thickness of about 50 µm. In some examples, set forth herein is a bonding layer having a thickness of about 51 µm. In some examples, set forth herein is a bonding layer having a thickness of about 52 µm. In some examples, set forth herein is a bonding layer having a thickness of about 53 µm. In some examples, set forth herein is a bonding layer having a thickness of about 54 µm. In some examples, set forth herein is a bonding layer having a thickness of about 55 µm. In some examples, set forth herein is a bonding layer having a thickness of about 56 µm. In some examples, set forth herein is a bonding layer having a thickness of about 57 µm. In some examples, set forth herein is a bonding layer having a thickness of about 58 µm. In some examples, set forth herein is a bonding layer having a thickness of about 59 µm. In some examples, set forth herein is a bonding layer having a thickness of about 60 µm. In some examples, set forth herein is a bonding layer having a thickness of about 60 µm. In some examples, set forth herein is a bonding layer having a thickness of about 61 µm. In some examples, set forth herein is a bonding layer having a thickness of about 62 µm. In some examples, set forth herein is a bonding layer having a thickness of about 63 µm. In some examples, set forth herein is a bonding layer having a thickness of about 64 µm. In some examples, set forth herein is a bonding layer having a thickness of about 66 µm. In some examples, set forth herein is a bonding layer having a thickness of about 66 µm. In some examples, set forth herein is a bonding layer having a thickness of about 67 µm. In some examples, set forth herein is a bonding layer having a thickness of about 68 µm. In some examples, set forth herein is a bonding layer having a thickness of about 69 µm. In some examples, set forth herein is a bonding layer having a thickness of about 70 µm. In some examples, set forth herein is a bonding layer having a thickness of about 71 µm. In some examples, set forth herein is a bonding layer having a thickness of about 72 µm. In some examples, set forth herein is a bonding layer having a thickness of about 73 µm. In some examples, set forth herein is a bonding layer having a thickness of about 74 µm. In some examples, set forth herein is a bonding layer having a thickness of about 77 µm. In some examples, set forth herein is a bonding layer having a thickness of about 76 µm. In some examples, set forth herein is a bonding layer having a thickness of about 77 µm. In some examples, set forth herein is a bonding layer having a thickness of about 78 µm. In some examples, set forth herein is a bonding layer having a thickness of about 79 µm. In some examples, set forth herein is a bonding layer having a thickness of about 80 µm. In some examples, set forth herein is a bonding layer having a thickness of about 81 µm. In some examples, set forth herein is a bonding layer having a thickness of about 82 µm. In some examples, set forth herein is a bonding layer having a thickness of about 83 µm. In some examples, set forth herein is a bonding layer having a thickness of about 84 µm. In some examples, set forth herein is a bonding layer having a thickness of about 85 µm. In some examples, set forth herein is a bonding layer having a thickness of about 86 µm. In some examples, set forth herein is a bonding layer having a thickness of about 87 µm. In some examples, set forth herein is a bonding layer having a thickness of about 88 µm. In some examples, set forth herein is a bonding layer having a thickness of about 89 µm. In some examples, set forth herein is a bonding layer having a thickness of about 90 µm. In some examples, set forth herein is a bonding layer having a thickness of about 91 µm. In some examples, set forth herein is a bonding layer having a thickness of about 92 µm. In some examples, set forth herein is a bonding layer having a thickness of about 93 µm. In some examples, set forth herein is a bonding layer having a thickness of about 94 µm. In some examples, set forth herein is a bonding layer having a thickness of about 99 µm. In some examples, set forth herein is a bonding layer having a thickness of about 96 µm. In some examples, set forth herein is a bonding layer having a thickness of about 97 µm. In some examples, set forth herein is a bonding layer having a thickness of about 98 µm. In some examples, set forth herein is a bonding layer having a thickness of about 99 µm. In some examples, set forth herein is a bonding layer having a thickness of about 100 µm.

In some examples, the Li negative electrode is characterized by a thickness of about 10 nm to about 50 µm.

In some examples, the oxide separator is characterized by a thickness of about 0.1 µm to about 150 µm. In some examples, oxide separator is characterized by a thickness of about 10 µm to about 50 µm.

In some examples, the bonding layer penetrates into the positive electrode. In other examples, bonding layer penetrates into the positive electrode at least 10% of the thickness of the positive electrode. In other examples, bonding layer penetrates into the positive electrode at least 9% of the thickness of the positive electrode. In other examples, bonding layer penetrates into the positive electrode at least 8% of the thickness of the positive electrode. In other examples, bonding layer penetrates into the positive electrode at least 7% of the thickness of the positive electrode. In other examples, bonding layer penetrates into the positive electrode at least 6% of the thickness of the positive electrode. In other examples, bonding layer penetrates into the positive electrode at least 5% of the thickness of the positive electrode. In other examples, bonding layer penetrates into the positive electrode at least 4% of the thickness of the positive electrode. In other examples, bonding layer penetrates into the positive electrode at least 3% of the thickness of the positive electrode. In other examples, bonding layer penetrates into the positive electrode at least % of the thickness of the positive electrode. In other examples, bonding layer penetrates into the positive electrode at least 1% of the thickness of the positive electrode.

In some examples, the bonding layer contacts the catholyte in the positive electrode. In some examples, the bonding layer does not creep around the electrolyte separator. In some examples, the bonding layer does not include components which volatilize and diffuse around the electrolyte separator to contact the Li metal negative electrode.

In some examples, the solvent in the bonding layer have a vapor pressure less than about 80 Torr at 20° C. In some examples, the solvent in the bonding layer has a boiling point above 80° C. at one atmosphere.

In some examples, the oxide electrolyte separator is free of surface defects. In some examples, the electrolyte separator surface does not intersect a pore of greater than 5 nm.

In some examples, the diameter of the electrolyte separator is greater than the diameter of the lithium metal negative electrode.

In some examples, the diameter of the electrolyte separator is greater than the diameter of the lithium metal negative electrode by a factor of 0.1, 0.2, 0.3, 0.4, 0.5, 0.6. 0.7, 0.8, 0.9, 1, 2.

In some examples, the diameter or area of the electrolyte separator is greater than the diameter or area of the lithium metal negative electrode by a factor of 0.1. In some examples, the diameter or area of the electrolyte separator is greater than the diameter or area of the lithium metal negative electrode by a factor of 0.2. In some examples, the diameter or area of the electrolyte separator is greater than the diameter or area of the lithium metal negative electrode by a factor of 0.3. In some examples, the diameter or area of the electrolyte separator is greater than the diameter or area of the lithium metal negative electrode by a factor of 0.4. In some examples, the diameter or area of the electrolyte separator is greater than the diameter or area of the lithium metal negative electrode by a factor of 0.5. In some examples, the diameter or area of the electrolyte separator is greater than the diameter or area of the lithium metal negative electrode by a factor of 0.6. In some examples, the diameter or area of the electrolyte separator is greater than the diameter or area of the lithium metal negative electrode by a factor of 0.7. In some examples, the diameter or area of the electrolyte separator is greater than the diameter or area of the lithium metal negative electrode by a factor of 0.8. In some examples, the diameter or area of the electrolyte separator is greater than the diameter or area of the lithium metal negative electrode by a factor of 0.9. In some examples, the diameter or area of the electrolyte separator is greater than the diameter or area of the lithium metal negative electrode by a factor of 1. In some examples, the diameter or area of the electrolyte separator is greater than the diameter or area of the lithium metal negative electrode by a factor of 2.

In some examples, the diameter or area of the electrolyte separator is greater than the diameter or area of the lithium metal negative electrode by at least a factor of 0.1. In some examples, the diameter or area of the electrolyte separator is greater than the diameter or area of the lithium metal negative electrode by at least a factor of 0.2. In some examples, the diameter or area of the electrolyte separator is greater than the diameter or area of the lithium metal negative electrode by at least a factor of 0.3. In some examples, the diameter or area of the electrolyte separator is greater than the diameter or area of the lithium metal negative electrode by at least a factor of 0.4. In some examples, the diameter or area of the electrolyte separator is greater than the diameter or area of the lithium metal negative electrode by at least a factor of 0.5. In some examples, the diameter or area of the electrolyte separator is greater than the diameter or area of the lithium metal negative electrode by at least a factor of 0.6. In some examples, the diameter or area of the electrolyte separator is greater than the diameter or area of the lithium metal negative electrode by at least a factor of 0.7. In some examples, the diameter or area of the electrolyte separator is greater than the diameter or area of the lithium metal negative electrode by at least a factor of 0.8. In some examples, the diameter or area of the electrolyte separator is greater than the diameter or area of the lithium metal negative electrode by at least a factor of 0.9. In some examples, the diameter or area of the electrolyte separator is greater than the diameter or area of the lithium metal negative electrode by at least a factor of 1. In some examples, the diameter or area of the electrolyte separator is greater than the diameter or area of the lithium metal negative electrode by at least a factor of 2.

In some examples, the diameter or area of the electrolyte separator is greater than the diameter or area of the positive electrode by a factor of 0.1, 0.2, 0.3, 0.4, 0.5, 0.6. 0.7, 0.8, 0.9, 1, 2.

In some examples, the diameter or area of the electrolyte separator is greater than the diameter or area of the positive electrode by a factor of 0.1. In some examples, the diameter or area of the electrolyte separator is greater than the diameter or area of the positive electrode by a factor of 0.2. In some examples, the diameter or area of the electrolyte separator is greater than the diameter or area of the positive electrode by a factor of 0.3. In some examples, the diameter or area of the electrolyte separator is greater than the diameter or area of the positive electrode by a factor of 0.4. In some examples, the diameter or area of the electrolyte separator is greater than the diameter or area of the positive electrode by a factor of 0.5. In some examples, the diameter or area of the electrolyte separator is greater than the diameter or area of the positive electrode by a factor of 0.6. In some examples, the diameter or area of the electrolyte separator is greater than the diameter or area of the positive electrode by a factor of 0.7. In some examples, the diameter or area of the electrolyte separator is greater than the diameter or area of the positive electrode by a factor of 0.8. In some examples, the diameter or area of the electrolyte separator is greater than the diameter or area of the positive electrode by a factor of 0.9. In some examples, the diameter or area of the electrolyte separator is greater than the diameter or area of the positive electrode by a factor of 1. In some examples, the diameter or area of the electrolyte separator is greater than the diameter or area of the positive electrode by a factor of 2.

In some examples, the diameter or area of the electrolyte separator is greater than the diameter or area of the positive electrode by at least a factor of 0.1. In some examples, the diameter or area of the electrolyte separator is greater than the diameter or area of the positive electrode by at least a factor of 0.2. In some examples, the diameter or area of the electrolyte separator is greater than the diameter or area of the positive electrode by at least a factor of 0.3. In some examples, the diameter or area of the electrolyte separator is greater than the diameter or area of the positive electrode by at least a factor of 0.4. In some examples, the diameter or area of the electrolyte separator is greater than the diameter or area of the positive electrode by at least a factor of 0.5. In some examples, the diameter or area of the electrolyte separator is greater than the diameter or area of the positive electrode by at least a factor of 0.6. In some examples, the diameter or area of the electrolyte separator is greater than the diameter or area of the positive electrode by at least a factor of 0.7. In some examples, the diameter or area of the electrolyte separator is greater than the diameter or area of the positive electrode by at least a factor of 0.8. In some examples, the diameter or area of the electrolyte separator is greater than the diameter or area of the positive electrode by at least a factor of 0.9. In some examples, the diameter or area of the electrolyte separator is greater than the diameter or area of the positive electrode by at least a factor of 1. In some examples, the diameter or area of the electrolyte separator is greater than the diameter or area of the positive electrode by at least a factor of 2.

In some examples, the width or diameter or area of the electrolyte separator is greater than either of the diameter or area of the lithium metal negative electrode or of the positive electrode. In other examples, the width or diameter of the electrolyte separator is greater than the width or diameter of the lithium metal negative electrode. In some other examples, the width or diameter of the electrolyte separator is greater than the width or diameter of the positive electrode. In some examples, the width or diameter of the electrolyte separator is greater than both the width or diameter of the lithium metal negative electrode and positive electrode. In other examples, the electrolyte separator has rounded edges which protect the bonding layer, or its constituent components, from creeping around the electrolyte separator. In yet other examples, the electrolyte separator has coated edges which protect the bonding layer from creeping around the electrolyte separator.

In some examples, the coated edges comprise a coating selected from parylene, epoxy, polypropylene, polyethylene, alumina, $Al_2O_3$, $ZrO_2$, $TiO_2$, $SiO_2$, a binary oxide, a lithium carbonate species, $La_2Zr_2O_7$, or a glass, wherein the glass is selected from $SiO_2$—$B_2O_3$, or $Al_2O_3$. In some examples, the electrolyte separator has tapered edges which protect the bonding layer from creeping around the electrolyte separator. In some examples, the edges of the separator electrolyte have been selectively treated with heat (e.g. laser beam) or chemicals (e.g. plasma, water, acid, etc).

In some examples, set forth herein is an electrochemical stack having an electrolyte separator which has a thickness between about 10 and 20 μm; a bonding layer which has a thickness between about 1 μm and 5 μm; and a positive electrode, exclusive of the current collector, which has a thickness between about 5 μm and 150 μm.

In some examples, set forth herein is an electrochemical stack having an electrolyte separator which has a thickness between about 10 and 50 μm; a bonding layer which has a thickness between about 1 μm and 5 μm; and a positive electrode, exclusive of the current collector, which has a thickness between about 5 μm and 150 μm.

In some examples, set forth herein is an electrochemical stack having an electrolyte separator which has a thickness between about 10 and 100 μm; a bonding layer which has a thickness between about 1 μm and 5 μm; and a positive electrode, exclusive of the current collector, which has a thickness between about 5 μm and 150 μm.

In some examples, set forth herein is an electrochemical cell having a positive electrode, a negative electrode, and an electrolyte between the positive and negative electrode, wherein the electrolyte includes an electrolyte separator or membrane set forth herein.

In some examples, set forth herein is an electrochemical cell having an electrolyte separator set forth herein, wherein the electrochemical cell further includes a gel electrolyte.

In some examples, set forth herein is an electrochemical cell having an electrolyte separator set forth herein, wherein the electrochemical cell further includes a gel electrolyte between the positive electrode active material and the electrolyte separator.

In some examples, the gel electrolyte includes a solvent, a lithium salt, and a polymer.

In some of these examples, the solvent is ethylene carbonate, propylene carbonate, diethylene carbonate, methylene carbonate, or a combination thereof.

In some of these examples, the lithium salt is $LiPF_6$, LiBOB, or LFTSi.

In some of these examples, the polymer is PVDF-HFP.

In some of these examples, the gel includes PVDF with the solvent dioxolane and the salt, lithium bis(trifluoromethane)sulfonimide (LiTFSI), at 1M concentration.

In some examples the polymer is polypropylene (PP), atactic polypropylene (aPP), isotactic polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), poly methyl-methacrylate (and other acrylics), acrylic, polyvinylacetacetal resin, polyvinylbutylal resin, PVB, polyvinyl acetal resin, stereoblock polypropylenes, polypropylene polymethylpentene copolymer, polyethylene oxide (PEO), PEO block copolymers, silicone, or the like.

In some of these examples, the gel acetonitrile as a solvent and a 1M concentration of a lithium salt, such as $LiPF_6$.

In some of these examples, the gel includes a dioxolane solvent and a 1M concentration of a Lithium salt, such as LiTFSI or $LiPF_6$.

In certain examples, the gel includes PVDF polymer, dioxolane solvent and 1M concentration of LiFTSI or $LiPF_6$. In some other examples, the gel includes PVDF polymer, acetonitrile (ACN) solvent and 1M concentration of LiFTSI or $LiPF_6$. In some of these examples, the gel has a EC:PC solvent and a 1M concentration of a lithium salt, such as LiTFSI or $LiPF_6$. In some of these examples, the composite and the gel show a low impedance of about 10 $\Omega cm^2$.

In some examples, the gel is a composite electrolyte which includes a polymer and a ceramic composite with the polymer phase having a finite lithium conductivity. In some examples, the polymer is a single ion conductor (e.g., $Li^+$). In other examples, the polymer is a multi-ion conductor (e.g., $Li^+$ and electrons). The following non-limiting combinations of polymers and ceramics may be included in the composite electrolyte. The composite electrolyte may be selected from polyethyleneoxide (PEO) coformulated with $LiCF_3SO_3$ and $Li_3N$, PEO with $LiAlO_2$ and $Li_3N$, PEO with $LiClO_4$, PEO:$LiBF_4$—$TiO_2$, PEO with $LiBF_4$—$ZrO_2$. In some of these composites, in addition to the polymers, the composite includes an additive selected from $Li_3N$; $Al_2O_3$, $LiAlO_3$; $SiO_2$, SiC, $(PO_4)^{3-}$, $TiO_2$; $ZrO_2$, or zeolites in small amounts. In some examples, the additives can be present at from 0 to 95% w/w. In some examples, the additives include $Al_2O_3$, $SiO_2$, $Li_2O$, $Al_2O_3$, $TiO_2$, $P_2O_5$, $Li_{1.3}Ti_{1.7}Al_{0.3}(PO_4)_3$, or (LTAP). In some of these composite electrolytes, the polymer present is polyvinylidenefluoride at about 10% w/w. In some of these as composite electrolytes, the composite includes an amount of a solvent and a lithium salt (e.g., $LiPF_6$). In some of these composites, the solvent is ethyl carbonate/dimethyl carbonate (EC/DMC) or any other solvent set forth herein. In some examples, the composite includes a solvent useful for dissolving lithium salts. In some of the composite electrolytes set forth herein, the polymer serves several functions. In one instance, the polymer has the benefit of ameliorating interface impedance growth in the solid electrolyte even if the polymer phase conductivity is much lower than the ceramic. In other instances, the polymer reinforces the solid electrolyte mechanically. In some examples, this mechanical reinforcement includes coformulating the solid electrolyte with a compliant polymer such as poly paraphenylene terephthalamide. These polymers can be one of a variety of forms, including a scaffold.

In some examples, set forth is an electrochemical stack including a positive electrode, wherein the positive electrode includes a gel catholyte. In some examples, the gel catholyte includes a solvent selected from the group consisting of ethylene carbonate (EC), propylene carbonate (PC), dimethyl carbonate (DMC), methylene carbonate, and combinations thereof; a polymer selected from the group consisting of PVDF-HFP and PAN; and a salt selected from LiPF$_6$, LiBOB, or LFTSi.

In some examples, including any of the foregoing, the electrochemical stack further includes a solid electrolyte and a bonding layer between the positive electrode and the solid electrolyte. In some examples, the bonding layer is a phase inversion gel electrolyte, as described herein. In certain examples, the positive electrode includes a phase-inversion gel catholyte. In some examples, the phase inversion gel electrolyte is porous. In some examples, the phase inversion gel electrolyte is 10, 20, 30, 40, 50, or 60% by volume porous.

In some examples, including any of the foregoing, set forth is a positive electrode which includes a phase inversion gel catholyte, wherein the phase inversion gel catholyte includes a solvent selected from the group consisting of tetrahydrofuran (THF), ethylene carbonate (EC), propylene carbonate, dimethyl carbonate (DMC), methylene carbonate, and combination thereof; a polymer selected from the group consisting of PVDF-HFP and PAN; and a non-solvent selected from toluene, acetone, and combination thereof; and a salt selected from the group consisting of LiPF$_6$, LiBOB, and LFTSi.

In some examples, including any of the foregoing, set forth is a free standing film of a gel or phase inversion gel electrolyte having an interfacial impedance less than 10 Ωcm$^2$ at 60° C. when the film is positioned between and directly in contact with an electrolyte separator and a positive electrode.

In some examples, including any of the foregoing, set forth is a free standing film which includes a phase inversion gel electrolyte, wherein the gel electrolyte comprises a lithium salt, a polymer. The phase-inversion gel is porous and the porosity can be tuned by, for example, the solvent(s) in the gel and the rates at which the solvent(s) volatize away from the gel. In some examples, the polymer is selected from the group consisting of polyacrylonitrile (PAN), polyvinylidene fluoride hexafluoropropylene (PVDF-HFP), or combination thereof. In certain examples, the lithium salt is selected from LiPF$_6$, LiBOB, LiBF$_4$, LiClO$_4$, LiI, LiFSI, and LTFSI. In certain examples, the lithium salt is LiPF$_6$ at an average concentration of 0.5 M to 2M. In some examples, the lithium salt is LiTESI at an average concentration of 0.5 M to 2M. In certain examples, the lithium salt is present at a concentration from 0.01 M to 10 M. In some examples, the solvent is selected from the group consisting of ethylene carbonate (EC), propylene carbonate, dimethyl carbonate (DMC), EMC, ethyl-methyl sulfone, dinitriles, sulfone, sulfolane, methylene carbonate, and combination thereof. In certain examples, the solvent is a 1:1 w/w mixture of EC:PC. In certain examples, the solvent is present at a residual amount, wherein the residual amount of solvent is the amount remaining after the bonding layer is dried. In certain examples, the residual amount is the minimum amount of solvent required to solvate the lithium salt. In certain examples, the interfacial impedance is less than 10 Ωcm$^2$ at 60° C. when the film is positioned between and directly in contact with an electrolyte separator and a positive electrode.

In some examples herein, set forth is a phase inversion bonding layer, wherein the phase inversion bonding layer has a porosity of at least 10%.

In some examples herein, set forth is a phase inversion bonding layer, wherein the phase inversion bonding layer has a porosity of at least 20%. In some examples herein, set forth is a phase inversion bonding layer, wherein the phase inversion bonding layer has a porosity of at least 30%. In some examples herein, set forth is a phase inversion bonding layer, wherein the phase inversion bonding layer has a porosity of at least 40%. In some examples herein, set forth is a phase inversion bonding layer, wherein the phase inversion bonding layer has a porosity of at least 50%. In some examples herein, set forth is a phase inversion bonding layer, wherein the phase inversion bonding layer has a porosity of at least 60%. In some examples herein, set forth is a phase inversion bonding layer, wherein the phase inversion bonding layer has a porosity of at least 70%.

V. Methods of Making Electrochemical Cells

In some examples, set forth herein is a method for making an electrochemical device, including, providing a positive electrode, providing a free standing film of a gel electrolyte. In some examples a gel electrolyte (referred to as a bonding agent) as set forth herein.

In some examples, the gel electrolyte includes a lithium salt, a polymer, and a solvent. In some examples, the polymer is selected from the group consisting of polyacrylonitrile (PAN), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxy)ethyl glycidyl ether (PEO-MEEGE), polyethylene oxide 2-methoxyethoxy)ethyl glycidyl poly (allyl glycidyl ether) (PEO-MEEGE-AGE), polysiloxane, polyvinylidene fluoride (PVDF), polyvinylidene fluoride hexafluoropropylene (PVDF-HFP), and rubbers such as ethylene propylene (EPR), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), polyvinylidene fluoride (PVDF), or polyethylene (e.g., low density linear polyethylene).

In certain examples, the polymer in the gel electrolyte is polyacrylonitrile (PAN) or polyvinylidene fluoride hexafluoropropylene (PVDF-HFP). In certain examples, the polymer in the gel electrolyte is PAN, PVDF-HFP, PVDF-HFP and PAN, PMMA, PVC, PVP, PEO, or combinations thereof. In certain examples, the lithium salt in the gel electrolyte is a lithium salt selected from LiPF$_6$, LiBOB, LiTFSi, LiBF$_4$, LiClO$_4$, LiAsF$_6$, LiFSI, LiAsF$_6$, LiClO$_4$, LiI, or LiBF$_4$.

In certain examples, the lithium salt in the gel electrolyte is a lithium salt is selected from LiPF$_6$, LiBOB, and LFTSi.

In certain examples, the lithium salt in the gel electrolyte is LiPF$_6$ at a concentration of 0.5 M to 2M. In some examples, the concentration is 0.5, 0.6, 0.7, 0.8, 0.9, 1.0, 1.1, 1.2, 1.3, 1.4, 1.5, 1.6, 1.7, 1.8, 1.9 or 2.0M.

In certain examples, the lithium salt in the gel electrolyte is LiTFSI at a concentration of 0.5 M to 2M. In some examples, the concentration is 0.5, 0.6, 0.7, 0.8, 0.9, 1.0, 1.1, 1.2, 1.3, 1.4, 1.5, 1.6, 1.7, 1.8, 1.9 or 2.0M.

In certain examples, the lithium salt in the gel electrolyte is present at a concentration from 0.01 M to 10 M. In some examples, the concentration is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.3, 3.2, 3.3, 3.4, 3.5, 3.6, 3.7, 3.8, 3.9, 2.0, 0.3, 0.2, 0.3, 0.4, 0.5, 0.6, 0.7, 0.8, 0.9, 3.0, 3.1, 3.2, 3.3, 3.4, 3.5, 3.6, 3.7, 3.8, 3.9, 4.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.8, 8.4, 8.5, 8.6, 8.7, 8.8, 8.9, 9.9, 9.1, 9.2, 9.3, 9.4, 9.5, 9.6, 9.7, 9.8, 9.9, 10.0 M.

In certain examples, the solvent is selected from ethylene carbonate (EC), diethylene carbonate, diethyl carbonate, dimethyl carbonate (DMC), ethyl-methyl carbonate (EMC), tetrahydrofuran (THF), y-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-Tetrafluoro-3-(1,1,2,2-tetrafluoroethoxy)propane (F-EPE), fluorinated cyclic carbonate (F-AEC), propylene carbonate (PC), dioxolane, acetonitrile (ACN), succinonitrile, adiponitrile, hexanedinitrile, pentanedinitrile, acetophenone, isophorone, benzonitrile, dimethyl sulfate, dimethyl sulfoxide (DMSO) ethyl-methyl carbonate, ethyl acetate, methyl butyrate, dimethyl ether (DME), diethyl ether, propylene carbonate, dioxolane, glutaronitrile, gamma butyl-lactone, toluene, or combinations thereof.

In certain examples, the solvent is a 1:1 w/w mixture of EC:PC.

In certain examples, the solvent is present as a residual amount. In some examples, the residual amount is the amount of solvent remaining after the bonding layer is dried. In some examples, the residual amount is the amount of solvent remaining after the bonding layer is spin-coated onto a substrate and dried. In some examples, the residual amount is the minimum amount of solvent required to solvate the lithium salt.

In yet other examples, the film lowers the interfacial impedance between an electrolyte separator and a positive electrode, when positioned between and directly in contact with an electrolyte separator and a positive electrode.

Incorporated herein are methods of making gel electrolytes, such as those in U.S. Pat. No. 5,296,318, entitled RECHARGEABLE LITHIUM INTERCALATION BATTERY WITH HYBRID POLYMERIC ELECTROLYTE.

One Phase Gel Electrolyte

In some examples, set forth herein is a method of making a gel electrolyte. This method, in some examples, includes the following steps.

In some examples, a solvent is provided and mixed with a polymer and a lithium salt. In some examples, the solvent is volatilized to concentrate the polymer and lithium salt.

In some examples, the solvent is selected from ethylene carbonate (EC), diethylene carbonate, diethyl carbonate, dimethyl carbonate (DMC), ethyl-methyl carbonate (EMC), tetrahydrofuran (THF), y-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-Tetrafluoro-3-(1,1,2,2-tetrafluoroethoxy)propane (F-EPE), fluorinated cyclic carbonate (F-AEC), propylene carbonate (PC), dioxolane, acetonitrile (ACN), succinonitrile, adiponitrile, hexanedinitrile, pentanedinitrile, acetophenone, isophorone, benzonitrile, dimethyl sulfate, dimethyl sulfoxide (DMSO) ethyl-methyl carbonate, ethyl acetate, methyl butyrate, dimethyl ether (DME), diethyl ether, propylene carbonate, dioxolane, glutaronitrile, gamma butyl-lactone, or combinations thereof.

In certain examples, the polymer is polyacrylonitrile (PAN) or polyvinylidene fluoride hexafluoropropylene (PVDF-HFP). In certain examples, the polymer in the gel electrolyte is PAN, PVDF-HFP, PVDF-HFP and PAN, PMMA, PVC, PVP, PEO, or combinations thereof. In certain examples, the lithium salt in the gel electrolyte is a lithium salt is selected from $LiPF_6$, LiBOB, LiTFSi, $LiBF_4$, $LiClO_4$, $LiAsF_6$, LiFSI, $LiAsF_6$, $LiClO_4$, LiI, or $LiBF_4$. In certain examples, several lithium salts may be present simultaneously in different concentrations.

Phase Inversion Gel Electrolyte

In some examples, set forth herein is a method of making a phase inversion gel. This method, in some examples, includes the following steps.

In some examples, a polymer is dissolved in a solvent which dissolves the polymer. For example, when the polymer is PVDF-HFP, the solvent may be tetrahydrofuran (THF). In some examples, the ratio of PVDF-HFP:THF is between 0.01 and 10. In some examples, the ratio of PVDF-HFP:THF is 0.01, 0.02, 0.03, 0.04, 0.05, 0.06, 0.07, 0.08, 0.09, 0.1, 0.2, 0.3, 0.4, 0.5, 0. 6, 0.7, 0.8, 0.9, 1, 2, 3, 4, 5, 6, 7, 8, 9, or 10. In some examples, the polymer and solvent are mixed to form a mixture. In some examples, this mixture is heated. In certain examples, the mixture is heated to volatilize the solvent. In some examples, the mixture is stirred. In some examples, the stirring is at 100 revolutions per minute (RPM). In certain examples, a non-solvent is then added. In some of these examples, the non-solvent is toluene when the polymer is PVDF-HFP. In some examples, non-solvent is added to that the weight of the non-solvent with respect to the weight of the PVDF-HFP is 1, 2, 3, 4, 5, 6, 7, 8, 9, or 10 times. For example, the (weight of the non-solvent)/(weight of the polymer) is 1, 2, 3, 4, 5, 6, 7, 8, 9, or 10. In some examples, the mixture with the non-solvent is heated until the solvent evaporates or is reduced to a residual amount. In some examples, the heated mixture is spin-cast onto a substrate to form a film. In some examples, the rate of spin for the spin-coater determines the thickness of the spin-cast film. In some examples, the spin-cast film can be released from the substrate on which it was cast to form a free standing film.

EXAMPLES

Example 1—Making an Electrochemical Stack Having a Bonding Layer

In this example, a free standing gel electrolyte film was first prepared.

A blend of ethylene carbonate (EC) and propylene carbonate (PC) solvents was prepared in a 1:1 w/w ratio. The lithium salt lithium hexafluorophosphate was added to this mixture to achieve a 1M solution. To form the gel solution, 0.8 grams of a PVDF-HFP polymer (Kynar 2801) was mixed 2.8 grams of the lithium hexafluorophosphate solution and 8.5 grams of a solvent, THF (Tetrahydrofuran). The solution was cast via doctor blade onto a glass substrate inside a glove box. The film was allowed to dry in the glove box for 4 hours. The dry film thickness was 45 μm. This dry film was used as the gel electrolyte 103 below.

As shown in FIG. 1, two electrochemical stacks were prepared. The layers were pressed together in the actual electrochemical stack, but in FIG. 1 the layers are separated for illustrative purposes.

In one example, 100, the electrochemical stack, 100, included a positive electrode, 102, having a Ni—Co—Al positive electrode active material, with c65 carbon and a gel catholyte. The gel catholyte included an 80:20 w/w mixture of PVDF-HFP in EC:PC with 1M $LiPF_6$. This stack also included a solid lithium-stuffed garnet, 104, $Li_7La_3Zr_2O_{12}$ 0.35 $Al_2O_3$, 50 μm thick electrolyte separator. Laminated to the bottom of, 104, was lithium metal, 105.

In another example, 101, the electrochemical stack, 101, includes a positive electrode, 102, having an Ni—Co—Al positive electrode active material, with C65 carbon and a gel catholyte. The gel catholyte included an 80:20 w/w mixture of PVDF-HFP in EC:PC with 1M $LiPF_6$. This stack also included a solid lithium-stuffed garnet, 104, $Li_7La_3Zr_2O_{12}Al_2O_3$, 50 μm thick electrolyte separator. Evaporated to the bottom of, 104, was lithium metal, 105. Positioned in between and in direct contact with layers, 102 and 104, was a gel electrolyte, 103. Gel electrolyte/bonding layer, 103, was prepared as noted above.

The combination of a gel and a solid lithium-stuffed garnet was surprisingly stable. Organic solvents typically react with garnet. However, the gel used in this example did not. Typically carbonates react to produce $CO_2$ at high V or high T, and $CO_2$ may react with garnet. This results in an increase in impedance due to the resistive layer formed by the reaction of $CO_2$ and garnet. This effect is exacerbated at higher voltages. For this reason, it is not typical to combine carbonate electrolytes with a garnet. However, the gel used in this example did not appreciably react with garnet as demonstrated by the low impedance observed, even when cycled to high voltages. This was a surprising effect since one might have expected that the organic solvent in the gel would have reacted with the solid lithium-stuffed garnet just as an organic solvent, absent a gel, would have been expected to react. The lack of a reaction between the gel and the lithium-stuffed garnet was possibly due to the slow diffusion of the solvent and salts in the gel. Without being bound by any particular theory, it is also possible that the gel layer inhibits diffusion of $CO_2$ to the garnet interface. If the bonding layer is an electronic insulator, it protects the separator electrolyte from the voltage of the cathode and any undesirable side-reactions that may result due to the high voltage instability of the separator. As a separator used in a lithium metal anode battery must be stable to lithium, there are few candidate separator materials that are simultaneously stable to the high voltage of the positive electrode and the low voltage of the negative electrode. The gel layer may thus enable a larger set of separator materials.

Example 2—Testing an Electrochemical Stack Having a Bonding Layer

Figure 2:
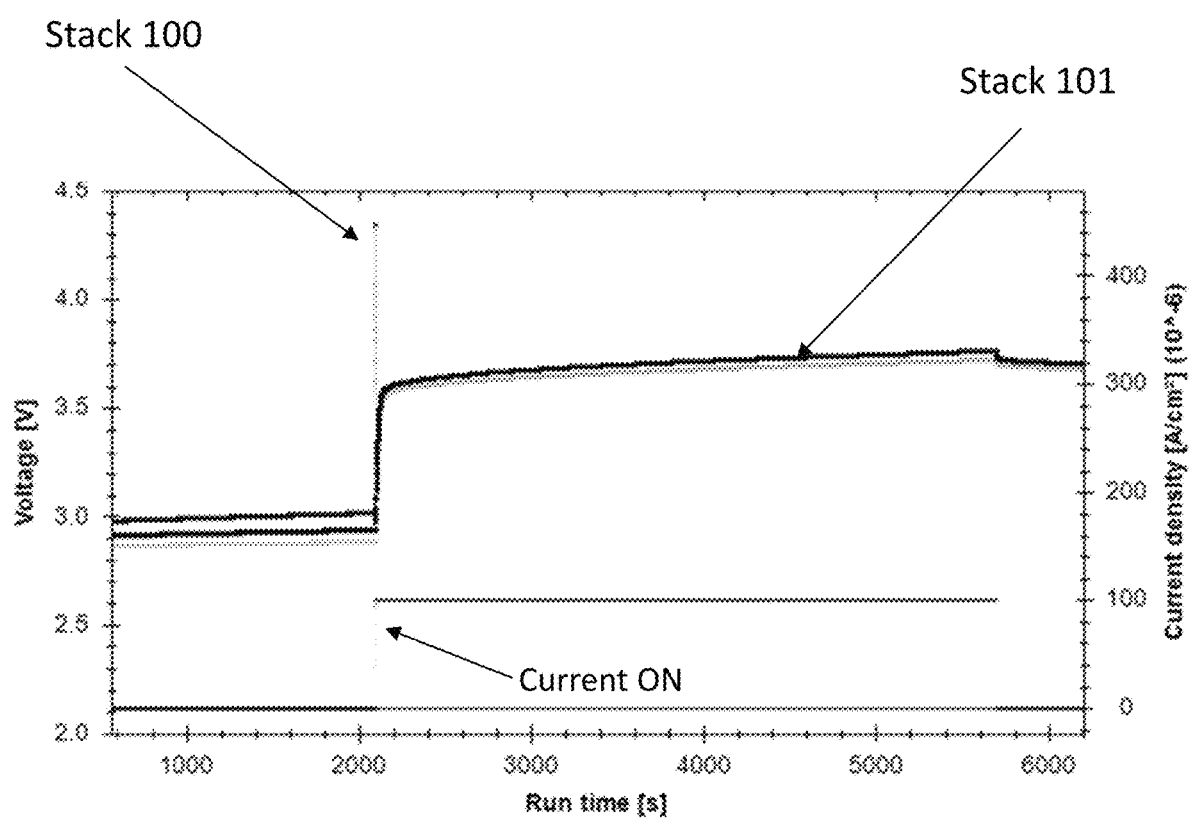
FIG. 2 shows the electrochemical performance of an electrochemical stack as set forth in the electrochemical stack, 100, with comparison to an electrochemical stack as set forth in the electrochemical stack, 101.

Both stacks, 100 and 101, from Example 1 were analyzed to see their voltage response as a function of time for a pulsed current electrochemical test. An OCV step was applied until time approximately 2000 s in the graph, then a current was applied of 0.1 mA/cm² until about time 5600 s, when the OCV was monitored under no applied current. The voltage response to the current step is monitored and shown in FIG. 2. The electrochemical stack, 100, was observed to have an immediate rise in impedance. This indicates too high of an interfacial ASR between the layers in the electrochemical stack. This Example demonstrates that pressing a cathode onto a garnet surface is ineffective and results in a very large impedance. However, when a gel electrolyte is used, and placed between and in direct contact with solid electrolyte and the positive electrode, the interfacial impedance is reduced.

Figure 3:
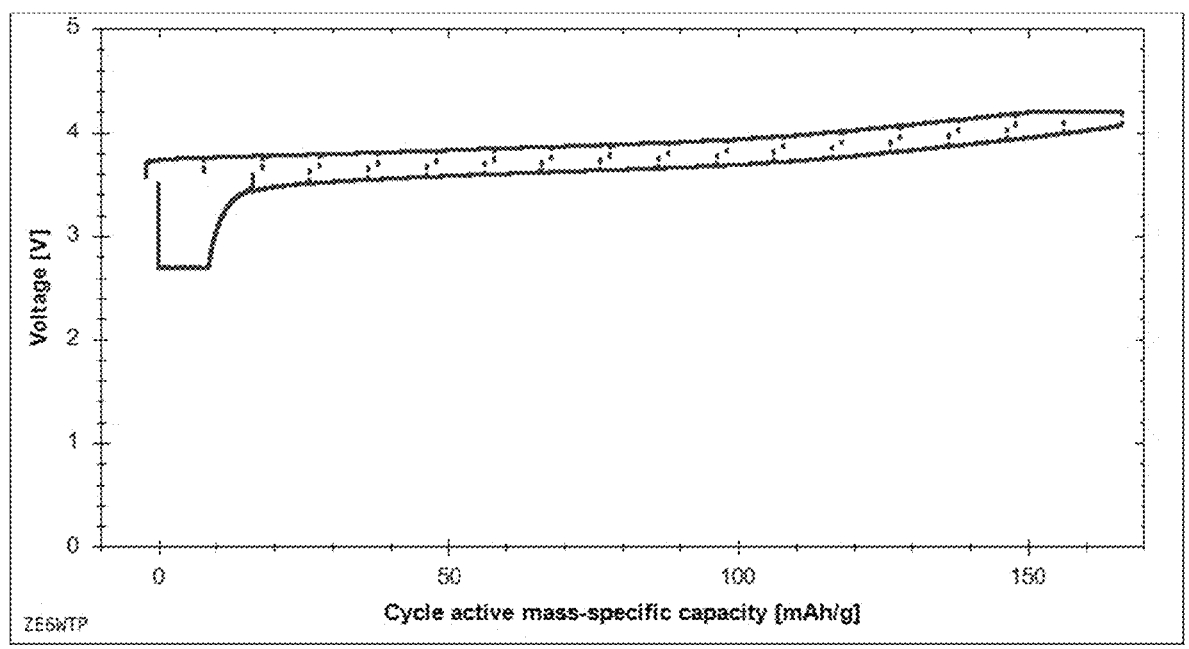
FIG. 3 shows a charge-discharge Galvanostatic Intermittent Titration Technique (GITT) plot for an electrochemical stack as set forth in the electrochemical stack, 101.

FIG. 3 shows a GITT test of pulsed current throughout a full charge and discharge cycle for one cell with a bonding layer when cycled between 2.7-4.2V. Full capacity can be obtained from the cell with a relatively low resistance.

Example 3—Making a Spin Coated Gel Bonding Layer

Figure 4:
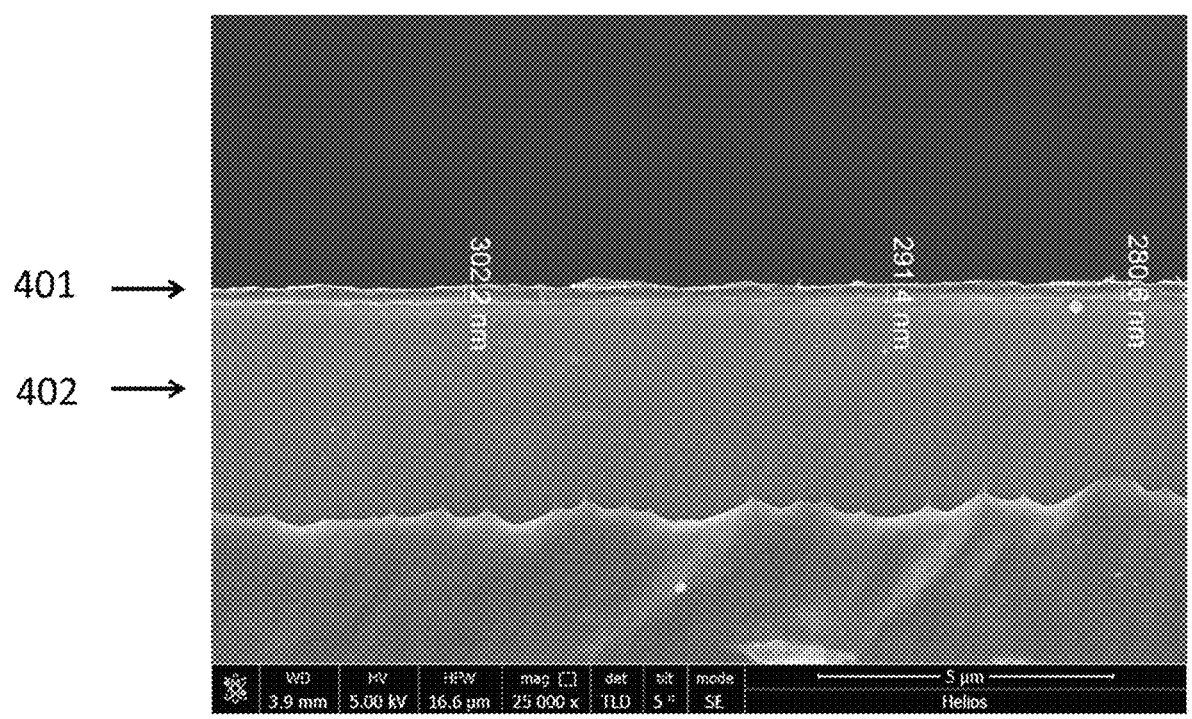
FIG. 4 shows a scanning electron microscopy cross-sectional image of a thin (~0.3 µm) PVDF containing gel electrolyte, 401, on a glass slide, 402. Scale bar is 5 µm.
Figure 5:
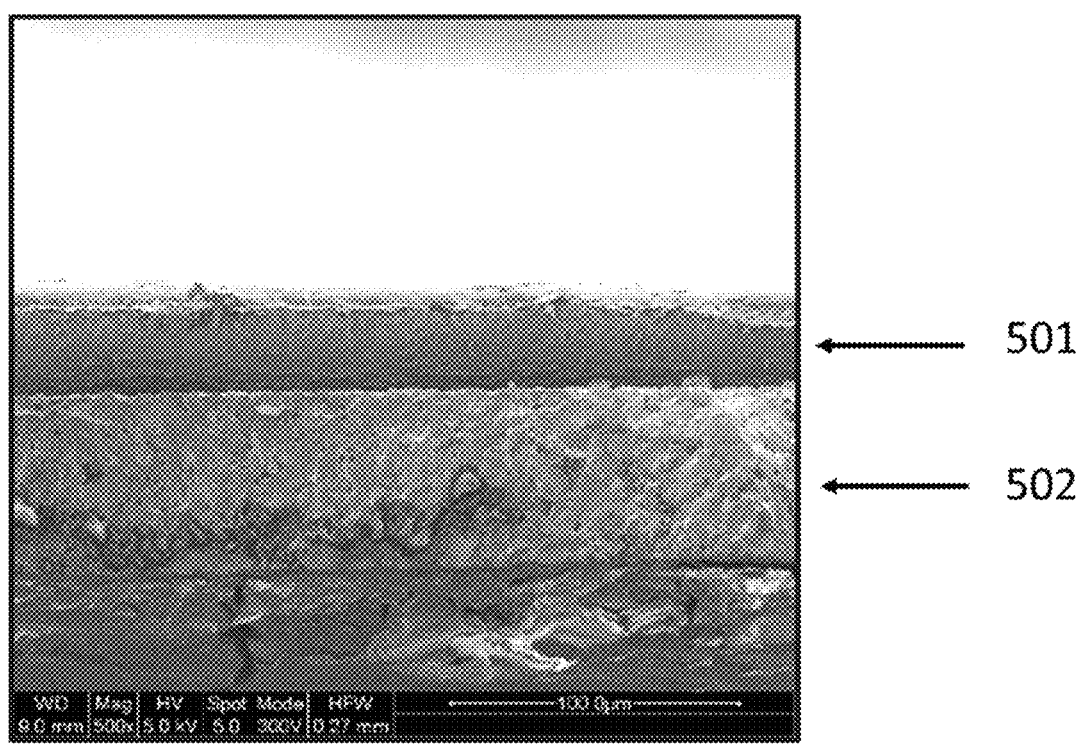
FIG. 5 shows a scanning electron microscopy cross-sectional image of a 47.4% polyacrylonitrile (PAN) gel electrolyte spin-cast onto a garnet separator wherein the PAN gel is spin-cast at 2000 RPM. Scale bar is 100 µm.

A blend of ethylene carbonate (EC) and propylene carbonate (PC) solvents was prepared in a 1:1 w/w ratio. The lithium salt, $LiPF_6$, was added to this mixture to achieve a 1M solution. PAN polymer was mixed with the solution in a measured volume ratio PAN to EC:PC. The solution was spin-cast using a Laurel Technologies, Spincoater for up to 60 seconds to form a film. By varying the spin-cast RPM(s), thicker or thinner free standing films were prepared. The film was allowed to dry at room temperature on a garnet substrate for twenty-four hours. FIG. 4 shows the thickness of a PAN-containing film, which is as a function of the spin-cast RPM. The scale bar in FIG. 4 is 5 μm. Higher RPM results in thinner films. FIG. 5 shows a 47.4% PAN gel electrolyte which was spin-cast at 2000 RPM. The gel electrolyte, 501, is positioned on top of the garnet separator, 502. The scale bar in FIG. 5 is 100 μm.

Figure 6:
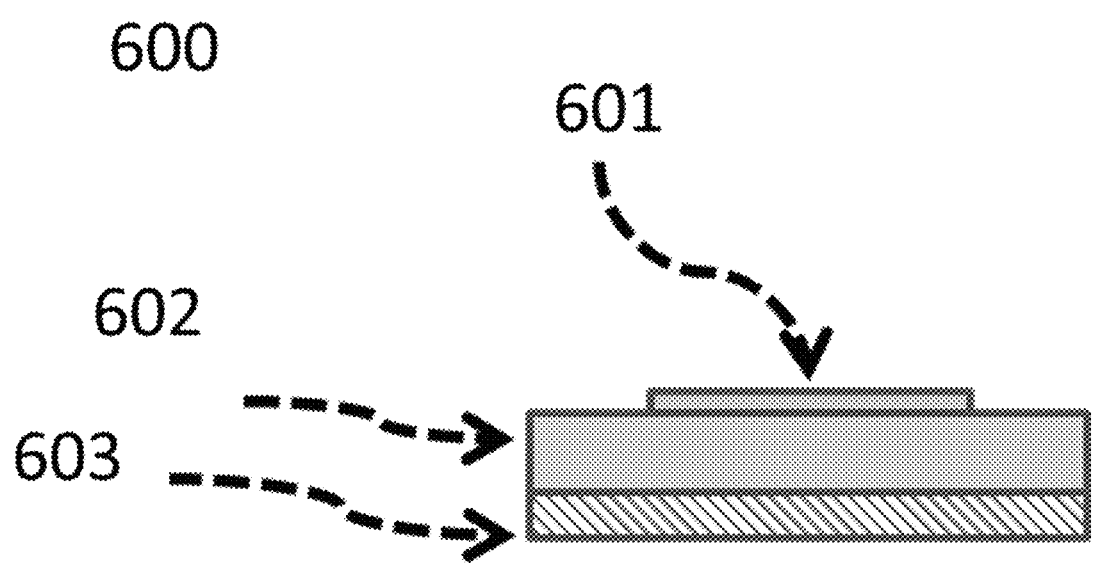
FIG. 6 shows a side view of an example electrochemical test step-up.

Example 4—Testing Individual Electrochemical Layers with Spin Coated Gel Bonding Layer Determination of the interfacial resistance between a bonding layer and a garnet electrolyte requires measurement of a full cell resistance and subtraction of all other resistance components. The following experiments are used to determine the resistance of each layer and interface in a full cell so as to enable calculation of the interfacial resistance between a gel and a garnet separator (ASRB-G). As shown in FIG. 6, an electrochemical stack was provided having Li metal 603, a solid lithium-stuffed garnet, 602, $Li_7La_3Zr_2O_{12}Al_2O_3$, 50 μm thick film, and a lithium metal electrode, 601. This configuration is referred to a symmetric cell Li|garnet|Li cell.

Figure 7:
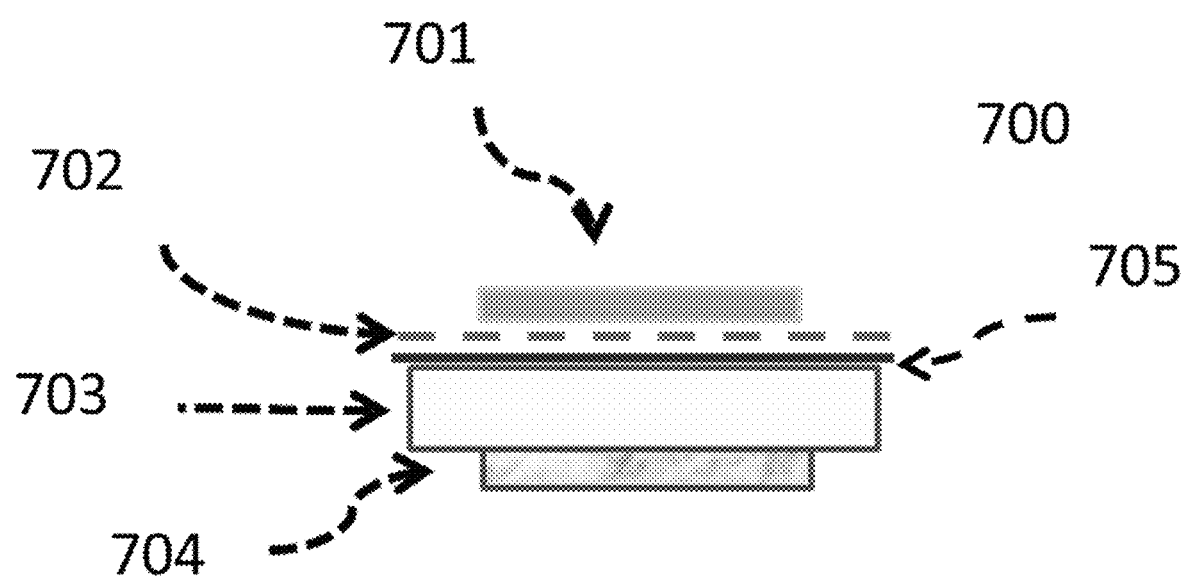
FIG. 7 shows a side view of an example electrochemical test step-up for determining the Area Specific Resistance (ASR) of the gel bonding layer with the garnet electrolyte.

FIG. 7 shows a stack consisting of Li|Garnet|scGel|fsGel|Li-foil which was constructed and measured. Here, scGel refers to the spin-coat prepared gel electrolyte layer, 705 and fsGel refers to the doctor-blade coated free standing gel electrolyte layer, 702. Based on the aforementioned results, the ASR in a stack Li|Garnet|scGel|fsGel|Li-foil=$ASR_{tot}$ was measured.

By determining, the contributions from all other components in the structure Li|Garnet|scGel|fsGel|Li-foil (FIGS. 6 and 7), the resistance of the scGel|Garnet interface was calculated according to $ASR_{I/F,SSE-scGel}$= $ASR_{tot}$-$ASR_{fsGel,bulk}$-$ASR_{SSE,bulk}$-$ASR_{fsGel-Li}$-$ASR_{I/F,SSE-Li}$. In FIG. 7, layer 701 is a Li-foil. Layer 703 is the solid electrolyte separator made of $Li_7La_3Zr_2O_{12}0.35Al_2O_3$. Layer 704 is Li metal. This calculation assumes that the fsGel-scGel ASR is negligible. The ASR of the garnet bulk was found to be 10 Ωcm², the ASR of the garnet-Li interface was 3±2 Ωcm².

In total, three gel electrolytes were prepared with the following compositions: (A) 30% w/w PVDF-HFP in EC:PC; (B) 50% w/w PVDF-HFP in EC:PC; and (C) 18.4% w/w PAN in EC:PC.

Figure 8:
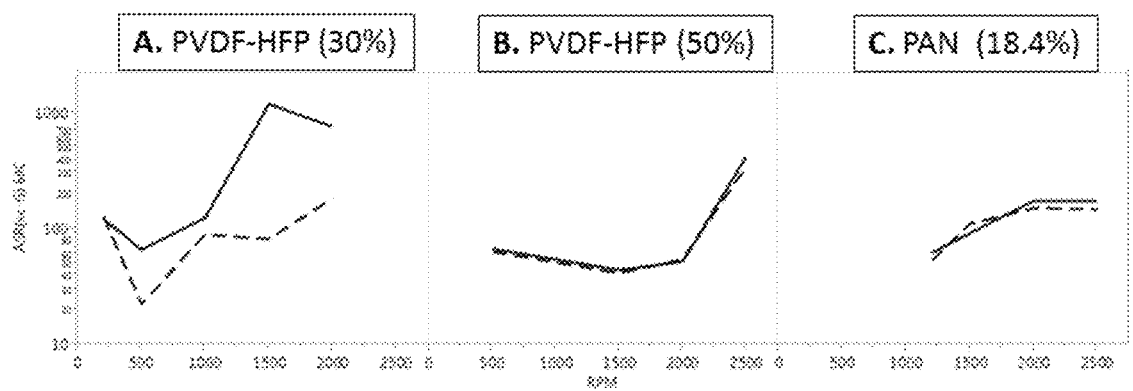
FIG. 8 shows a summary of interfacial ASR for various gel electrolytes as a function of the spin-casting RPM used to prepare the gel electrolyte in an electrochemical cell and as set forth in the electrochemical test step-up in FIG. 7.

The associated ASR of the films at 60° C. is shown as a function of spin-coating RPM in FIG. 8. In the case B. PVDF-HFP (50%) where the spin speed was 1,500 RPM and the spin coated gel thickness was 5.5 µm thick the total ASR for the Li-garnet-gel was 65±12 Ωcm². The ASR of the garnet-gel interface was found to be as low as 22 Ωcm² at 60° C. in this configuration. In full cells, the ASR of the garnet-gel interface was found to be between 1 and 5 Ωcm² at 45° C. This ASR is surprisingly low compared to the cells from Example 1, where a cell with no bonding layer was too resistive to be charged. It is surprising due to the fact that an additional resistive layer may be introduced into the cell and the total cell resistance decreases.

Example 5—Comparing Gel Bonding Layers with Other Materials

A garnet pellet is used to separate two isolated chambers full of liquid electrolyte of EC:PC (1M LiPF$_6$). A Li foil is held in each chamber and a current is passed which causes dissolution of lithium on one electrode and plating of lithium on the other electrode. To pass current, lithium ions must travel through the liquid in the first chamber, pass through the garnet pellet, and finally through the liquid in the other chamber to reach the lithium foil. The voltage drop across the entire cell is measured throughout this process. The impedance of the liquid-garnet interface can be deduced by knowledge of the other sources of voltage drop in the system including the liquid impedance itself and the impedance of the pellet. It was found that the impedance of the Garnet-Liquid electrolyte (labeled "Liquid" in FIG. 9) interface was on the order of 5,000 Ωcm². These results show that a liquid reacts with the Li metal anode and results in a high ASR. The liquid was observed to react with Li metal to form a high impedance layer, such as a lithium carbonate layer.

Figure 9:
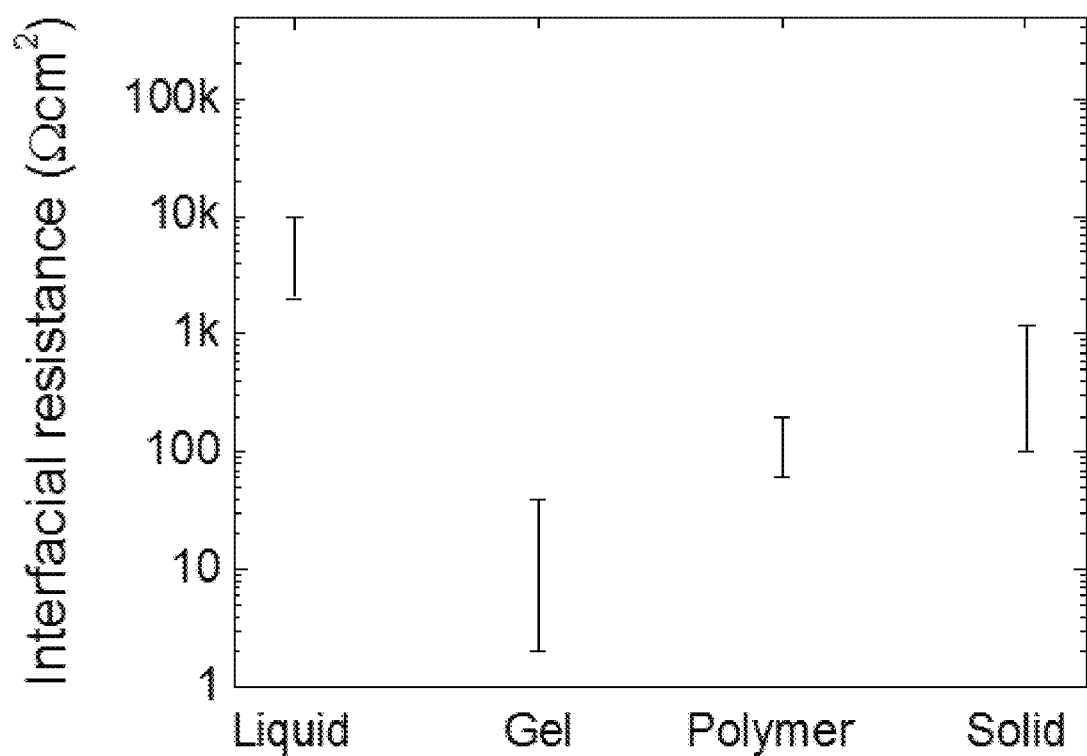
FIG. 9 shows a plot of interfacial impedance ($\Omega \cdot cm^2$) as a function of type of electrolyte material (liquid, gel, polymer, and solid) at 45° C.

The garnet was also paired with a solid (a lithium-phosphorus-sulfide electrolyte) or polymer bonding layer (PEO with LiClO$_4$) in an electrochemical stack with the same configuration as FIG. 7. The garnet oxide interfacial impedance was also rather high, e.g., 60-202 Ωcm² at 60° C., as shown in FIG. 9, to the detriment of any device which includes this pair. These results show that gels, as compared to liquids, solids, or polymers pair with garnet electrolyte separators to protect the Li metal negative electrode and provide a low ASR interface.

Gel electrolytes usually have a lower ionic conductivity than a liquid electrolyte. Thus, by pairing a gel electrolyte with a garnet, as opposed to a liquid electrolyte, one would expect that the total ASR would be higher for the gel-electrolyte-garnet as compared to the liquid-electrolyte-garnet. However, the results herein demonstrate surprisingly that the gel-electrolyte-garnet has lower ASR, than the corresponding liquid-electrolyte-garnet.

Figure 14:
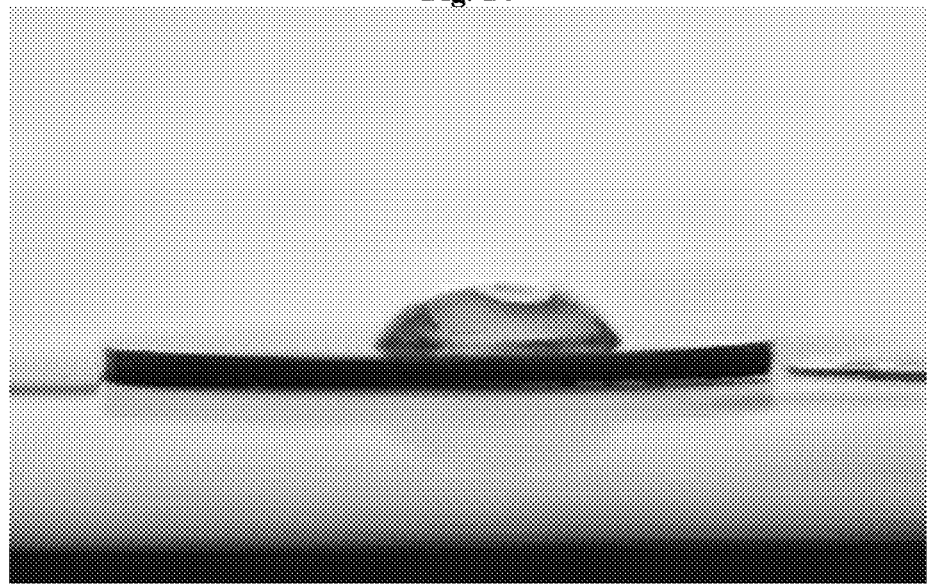
FIG. 14 shows the results of a contact angle measurement from Example 5.

As shown in FIG. 9, the gel electrolyte resulted in a surprisingly lower interfacial ASR than either of the liquid, polymer, or solid electrolytes. One interpretation of the surprisingly lower interfacial ASR of a gel as compared to a liquid is that a gel enforces wetting of the interface, whereas many liquids do not easily wet the separator interface. A wettability measurement is shown in FIG. 14, showing a large contact angle between the separator and electrolyte.

Example 6—Making a Phase Inversion Gel Bonding Layer

Figure 10:
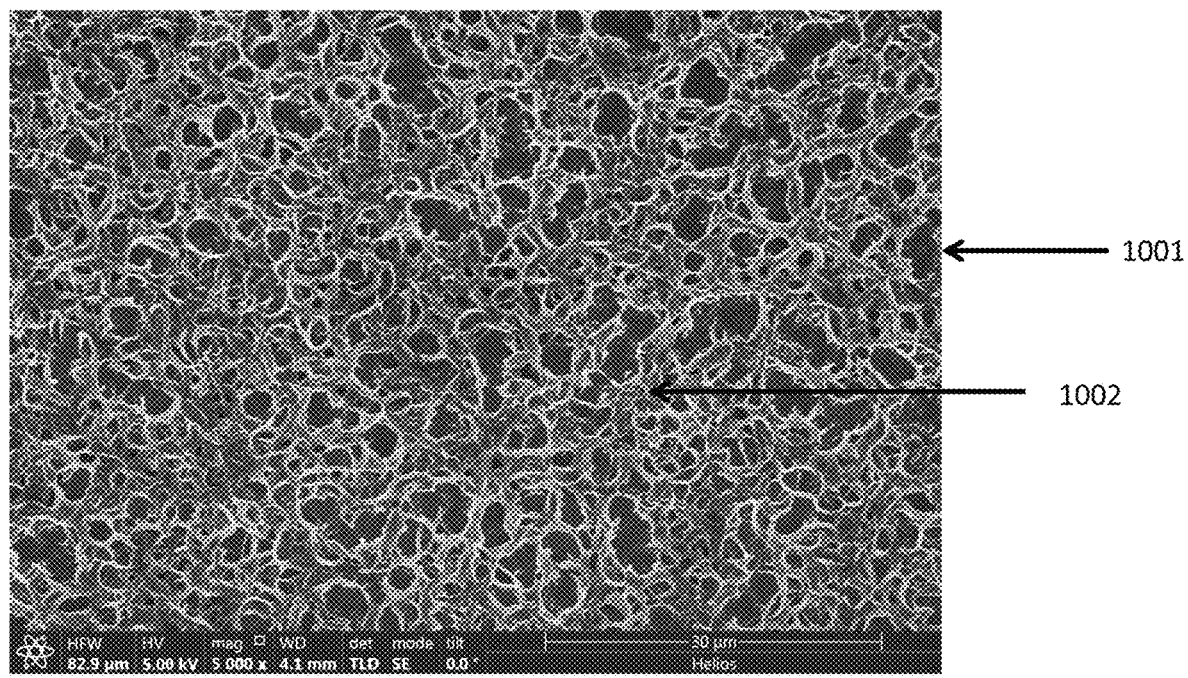
FIG. 10 shows a plain view of the phase inversion spin-coated gel, showing porous morphology on a cross-sectional thickness of one micron. The scale bar is 10 µm.
Figure 11:
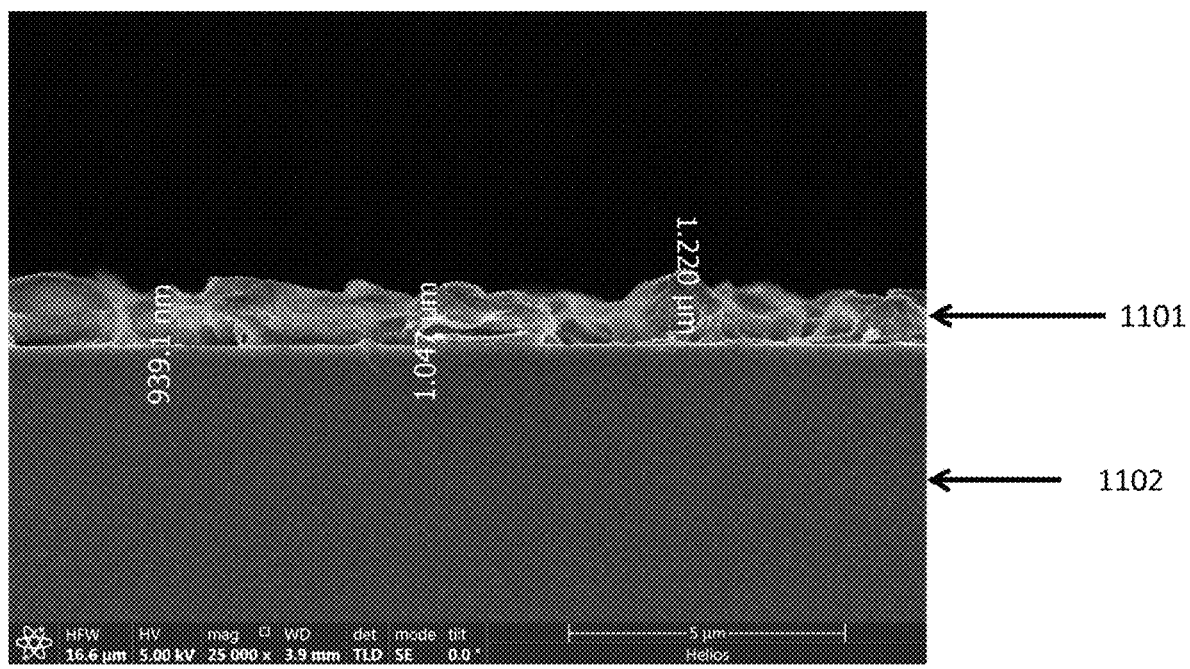
FIG. 11 shows a cross-section (left-side scanning electron microscope images (SEM) of the phase inversion spin-coated gel, showing porous morphology on a cross-sectional thickness of one micron. The scale bar is 5 µm.
Figure 12:
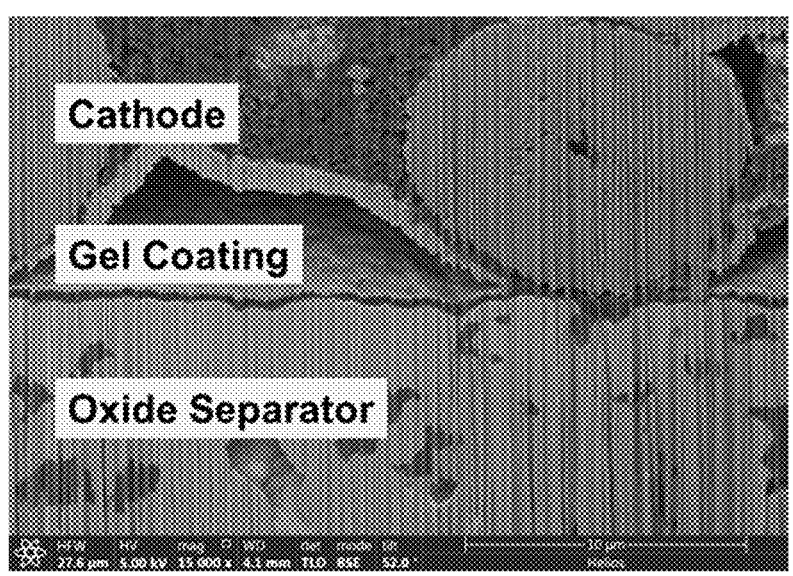
FIG. 12 shows a focused ion beam (FIB) scanning electron microscopy cross-sectional image of a full cell cross section with a cathode in contact with PVDF-HFP phase inversion spin coated gel electrolyte onto a garnet separator where in the gel is spin-coated at 1200 RPM. Scale bar is 10 µm.

PVDF-HFP polymer was dissolved in Tetrahydrofuran (THF) in a ratio of PVDF-HFP:THF=0.05:1 heated on a hot-plate to 80° C. and stirred at 100 rpm till the polymer dissolves. Then the non-solvent toluene was added drop-wise to the solution in a ratio of such that the weight of toluene added is 3.5 times PVDF-HFP. The solution was spin-cast using a spin-coater from Laurel Technologies up to 60 seconds. The spin-coater RPM can be adjusted to obtain gel films of different thicknesses. Higher RPM results in thinner films. FIG. 10 shows the plan view and FIG. 11 shows a cross-section of the phase-inversion gel (thickness 1 micron) spin coated on Si wafer, at a speed of 1200 rpm. In FIG. 10, the porous space is shown in black and labeled as 1001. The polymer matrix (i.e., network) is shown in gray and labeled as 1002. The full-cell stack cross-section is as shown in FIG. 11. In FIG. 11, the phase-inversion gel electrolyte is labeled as 1101 and is positioned on top of a silicon substrate. The silicon substrate is labeled as 1102.

Example 7—Testing the Individual Electrochemical Layer after Phase Inversion Gel Bonding The conductivity of the gel was evaluated by creating a "sandwich" of a thick, free standing version of the gel (100 microns thick) soaked in electrolyte EC:EMC with 1M LiPF$_6$, in between two stainless steel spacers and assembling this sandwich in a coin cell. At 45° C., the resistance of this stack is 2-2.5Ω, amounting to a total ASR of 4 Ω-cm². The bulk resistance of a 1 micron thick gel is expected to be 100 times less, accounting for a small impedance contribution in a full stack.

Example 8—Testing the Bonding Layer after Phase Inversion Gel Bonding in a Stack The spin-coated gel on garnet was assembled against another spin-coated gel on garnet to create a sandwich with two spin coated gels in between two garnet pellets. The pellets are coated with 2 or 30 µm evaporated lithium on the other side. This stack was assembled in a coin cell stack such that the gel is under the same pressure as it would be under a full cell stack. Electrochemical Impedance Spectroscopy response of this stack is shown in FIG. 13.

Figure 13:
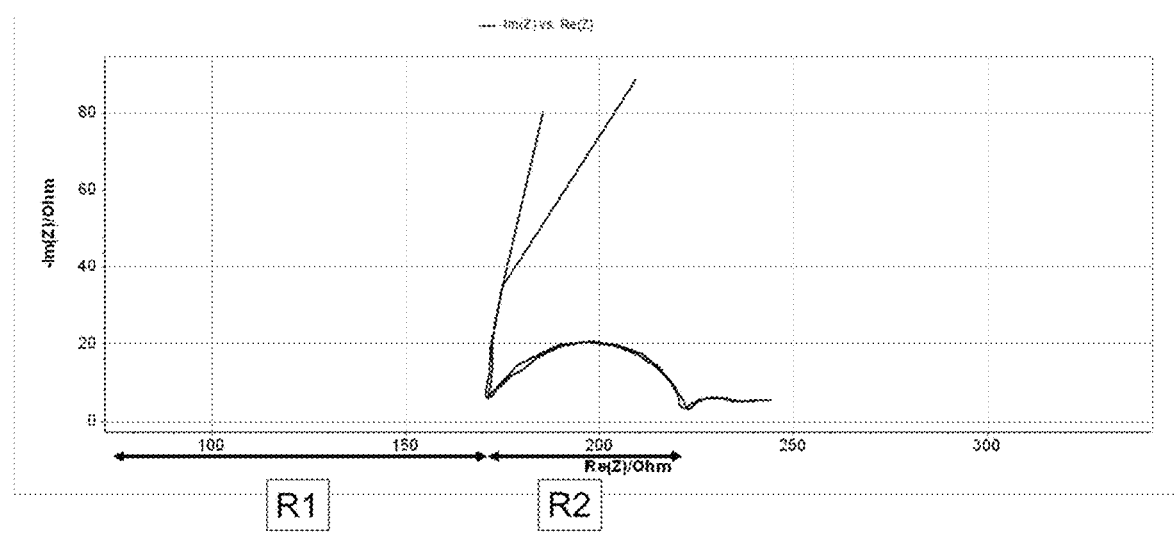
FIG. 13 shows Electrochemical Impedance Spectrum (EIS) of the phase-inversion spin coated gel sandwiched between two oxide separator pellets in a symmetric cell.

There were two parallel resistive-capacitative (RC) responses observed in this system: the first corresponds to bulk impedance of the two garnet pellets, marked by R1 in FIG. 13. The second semi-circle corresponds to the resistive capacitative (RC) response of two garnet-gel interfaces. The impedance corresponding to the x-intercept of these semi-circles was interpreted as $R_{bulk,garnet}$ and $R_{garnet-gel\ interface}$ respectively. The area specific resistance of the interface was determined by dividing R2 by two (since there are two interfaces) and multiplying with the electrode area (0.636 cm²). The interfacial impedance between gel and garnet was found to be less than 2 Ωcm² at 45° C. and less than 5 Ωcm² at 20° C.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the

What is claimed is:

1. An electrochemical stack, comprising:
a lithium metal (Li) negative electrode, a positive electrode, an electrolyte separator film comprising a lithium-stuffed garnet, and a bonding layer; wherein the bonding layer comprises a lithium salt, a polymer, and a solvent;
   wherein the polymer in the bonding layer is selected from PAN, PVDF-HFP, PVDF-HFP and PAN, PMMA, PVC, PVP, PEO, polyethylene carbonate, polyphenylene sulfide, polypropylene carbonate, and a combination thereof; and
   wherein the bonding layer is characterized by a thickness about 1 nm to about 5 µm;
   wherein the electrolyte separator film is characterized by a thickness of about 0.1 µm to about 100 µm;
   wherein the electrolyte separator has a density greater than 95% of its theoretical density as determined by scanning electron microscopy;
   wherein the electrolyte separator film is in direct contact with the Li metal negative electrode; and
   wherein the bonding layer directly contacts, and is positioned between, the electrolyte separator film and the positive electrode; wherein the electrolyte separator has a surface directly contacting the lithium metal, wherein the surface only includes material which is the same as the material in a bulk of the electrolyte separator.

2. The electrochemical stack of claim 1, wherein the Li negative electrode comprises a layer of Li metal having a thickness from 1 nm to 30 µm in the fully discharged state.

3. The electrochemical stack of claim 1, wherein the Li metal negative electrode comprises a layer of Li metal having a thickness from 1 µm to 50 µm in the fully charged state.

4. The electrochemical stack of claim 1, wherein the electrolyte separator film has a surface flatness of 0.1 µm to about 50 µm.

5. The electrochemical stack of claim 1, wherein the polymer in the bonding layer is polyacrylonitrile (PAN) or polyvinylidene fluoride hexafluoropropylene (PVDF-HFP).

6. The electrochemical stack of claim 4, wherein the electrolyte separator is nearly 100% dense electrolyte and has a planar surface.

7. The electrochemical stack of claim 1, wherein the lithium salt in the bonding layer is selected from the group consisting of $LiPF_6$, LiBOB, LiBETI, LiTFSI, $LiBF_4$, $LiClO_4$, $LiAsF_6$, LiFSI, LiI, $LiBF_4$, and a combination thereof.

8. The electrochemical stack of claim 1, wherein the solvent in the bonding layer is selected from the group consisting of ethylene carbonate (EC), diethylene carbonate or diethyl carbonate (DC), dimethyl carbonate (DMC), ethyl-methyl carbonate (EMC), tetrahydrofuran (THF), γ-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane(F-EPE), fluorinated cyclic carbonate (F-AEC), propylene carbonate (PC), dioxolane, acetonitrile (ACN), succinonitrile, adiponitrile, hexanedinitrile, pentanedinitrile, acetophenone, isophorone, benzonitrile, dimethyl sulfate, prop-1-ene-1,3-sultone (PES), dimethyl sulfoxide (DMSO), ethyl-methyl carbonate, ethyl acetate, methyl butyrate, dimethyl ether (DME), diethyl ether, propylene carbonate, dioxolane, glutaronitrile, gamma butyl-lactone, and combinations thereof.

9. The electrochemical stack of claim 8, wherein the amount of solvent in the bonding layer is the minimum amount of solvent required to solvate the lithium salt.

10. The electrochemical stack of claim 1, wherein the interfacial impedance between the electrolyte separator film and the positive electrode is less than 50 $\Omega \cdot cm^2$ at 50° C.

11. The electrochemical stack of claim 1, wherein the positive electrode further comprises a catholyte.

12. The electrochemical stack of claim 11, wherein the catholyte is a gel electrolyte; wherein the positive electrode comprises a gel catholyte which has the same composition as the bonding layer.

13. The electrochemical stack of claim 11, wherein the positive electrode comprises a gel catholyte comprising:
   a solvent selected from the group consisting of ethylene carbonate (EC), propylene carbonate (PC), dimethyl carbonate (DMC), methylene carbonate, and combinations thereof;
   a polymer selected from the group consisting of PVDF-HFP, PAN, and combinations thereof; and
   a salt selected from the group consisting of $LiPF_6$, LiBOB, and LiTFSI.

14. The electrochemical stack of claim 1, wherein the bonding layer does not comprise components which volatilize and diffuse around the electrolyte separator film to contact the Li metal negative electrode.

* * * * *